US006243386B1

(12) United States Patent
Chan et al.

(10) Patent No.: US 6,243,386 B1
(45) Date of Patent: *Jun. 5, 2001

(54) FIBRE CHANNEL LEARNING BRIDGE, LEARNING HALF BRIDGE, AND PROTOCOL

(75) Inventors: Kurt Chan, Roseville; Alistair D. Black, Los Gatos, both of CA (US)

(73) Assignee: Gadzoox Networks, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/395,644

(22) Filed: Sep. 14, 1999

Related U.S. Application Data

(63) Continuation of application No. 08/786,891, filed on Jan. 23, 1997, now Pat. No. 5,978,379.

(51) Int. Cl.[7] .................................................. H04L 12/42
(52) U.S. Cl. ........................................... 370/403; 370/401
(58) Field of Search .................................. 370/401, 402, 370/400, 403, 404, 405, 406, 408, 468; 359/109, 117, 115; 709/249, 250, 251, 253

(56) References Cited

U.S. PATENT DOCUMENTS 5,848,251 * 12/1998 Lomelino et al. .
5,978,379 * 12/1998 Chan et al. ........................... 370/403

* cited by examiner

Primary Examiner—Huy D. Vu
(74) Attorney, Agent, or Firm—Ronald C. Fish; Falk & Fish

(57) ABSTRACT

A learning half bridge and bridge for a Fibre Channel Arbitrated Loop and switching protocol. A half bridge can be coupled to a local loop segment and a remote loop segment. The half bridge includes transmit and receive ports implementing predetermined switching and conflict resolution rules and a memory storing a forwarding table. Typically the switching rules are implemented using state machines. The state machines implement a switching protocol that controls transitions between states which control switching connections, writing of data to memory and reading of data from memory and preemption of conflicting OPN primitives. Each half bridge includes a local return segment that can be switched by the state machines to bypass the remote loop segment if both the source node and destination node are on the local loop segment so as to make the local loop segment a complete Fibre Channel Arbitrated Loop. Each half bridge learns the locations of nodes by watching the direction of flow, the loop segment from which certain primitives arrived and sequence of OPN, RRDY and CLS primitives propagating on the loop segments and records data in the forwarding table in memory reflecting the locations of nodes about which conclusions have been drawn in accordance with learning rules. A learning bridge is comprised of two half bridges having their remote loop segments cross coupled. Full bridges can be combined with accelerated or nonaccelerated hubs. Conflicting OPNs are preempted using a highest priority address rule.

9 Claims, 20 Drawing Sheets

FULL BRIDGE BLOCK DIAGRAM

FRAMES AND FILL WORDS

| PRIMITIVE SIGNAL | MEANING | ORDERED SET | | |
| --- | --- | --- | --- | --- |
| ARB (x) | ARBITRATE | K28.5 | D20.4 | AL_PA | AL_PA |
| ARB(F0) | ARBITRATE (F0) | K28.5 | D20.4 | D16.7 | D16.7 |
| OPNyx | OPEN FULL-DUPLEX | K28.5 | D17.4 | AL_PD | AL_PS |
| OPNyy | OPEN HALF-DUPLEX | K28.5 | D17.4 | AL_PD | AL_PD |
| OPNfr | OPEN BROADCAST | K28.5 | D17.4 | D31.7 | D31.7 |
| OPNyr | OPEN MULTICAST | K28.5 | D17.4 | AL_PD | D31.7 |
| CLS | CLOSE | K28.5 | D5.4 | D21.5 | D21.5 |
| MRKtx | MARK | K28.5 | D31.2 | MK_TP | AL_PS |

: FC-AL PRIMITIVE SIGNALS

FIG. 3
PRIOR ART

PHYSICAL ARBITRATED LOOP WITH FOUR NODES

FC-AL TENANCY

HALF BRIDGE BLOCK DIAGRAM

FULL BRIDGE BLOCK DIAGRAM

FIBRE CHANNEL LEARNING BRIDGE, LEARNING HALF BRIDGE, AND PROTOCOL

This is a continuation of prior U.S. patent application Ser. No. 08/786,891, filed Jan. 23, 1997, entitled FIBRE CHANNEL LEARNING BRIDGE, LEARNING HALF BRIDGE, AND PROTOCOL, now U.S. Pat. No. 5,978,379.

FIELD OF USE

The invention is an improvement on the Fibre Channel Arbitrated Loop (hereafter sometimes referred to as FC-AL) protocol as defined by ANSI standard X3.272-199x revision 4.5. The inventions are an FC-AL Learning Half Bridge" (hereafter just half bridge) and an FC-AL Learning Bridge (hereafter just bridge), which consists of two half-bridges connected together as a single package. The teachings of the invention allow the partitioning of a long or heavily populated FC-AL into multiple shorter or lightly populated loop segments so that:
1) concurrent conversations can take place on the multiple loop segments for loops with multiple SCSI Initiators or for multiple networking nodes.
2) long latencies such as those associated with long fiber optic cables can be avoided for conversations among loop segment neighbors.

BACKGROUND OF THE INVENTION

Since traffic on a physical loop flows through all nodes on the loop, including the connecting fiber or copper links, the two primary sources of latency on an arbitrated loop come from:
a) link propagation latency due to link length;
b) node latency, which is a maximum of 6 Fibre Channel (hereafter FC) 40 bit words, or 240 bits.

These latencies have been demonstrated to be the primary cause of degraded performance for applications such as implementing a higher layer SCSI protocol over a Fibre Channel Arbitrated Loop protocol.

FIG. 1 shows an FC-AL node with a 6-word FIFO designated by reference number 3. It has a TX port 1 and a RX port 2. Each FC unencoded 8-bit character is translated to 10 bits when encoded on the serial link via the 8-bit to 10-bit encoding as defined by the Fibre Channel Physical and Signalling Interface (FC-PH) standard, ANSI X3.230-199x. There are four characters per FC word. The 6 FC word FIFO is the cause of the 6 word delay between the time an FC word arrives on RX port 2 and is retransmitted on TX port 1.

FIG. 2 shows the relationship between data frames and primitives. A primitive (sometimes also referred to as a command herein) is a FC word which occupies the interframe spaces, and has special meaning for flow control and loop management.

The primitives relevant to the invention are shown in FIG. 3. The ARB and OPN primitives contain addressing information. The ARB contains the address of the arbitrating node designated in FIG. 3 as AL_PA. The AL_PA is duplicated in the fourth character. The OPN primitive contains the destination node address (AL_PD) in the third character and the source node address (AL_PS) in the fourth character. Fill words are ARB primitives or IDLE primitives which are used by FC-AL nodes to perform loop signalling. Therefore, all fill words are primitives, but not all primitives are fill words.

FIG. 4 shows a four-node Fibre Channel Arbitrated Loop having the prior art unaccelerated architecture. The output of one node is connected to the input of the subsequent node, and so on. The sum of the latencies of the nodes (each node's 6 word delay) plus the inter-node link propagation delays is referred to as the "system latency."

FIG. 5 shows a "loop tenancy," which is the hanshaking protocol (a protocol is a set of rules for communicating) which defines the traffic which occurs between nodes to acquire control of an FC-AL to allow two nodes to communicate and which occurs before the loop is relinquished by these two nodes so that other nodes can communicate. In other words, a loop tenancy protocol is carried out so that a source node and a destination node can acquire the loop for their exclusive use in a data transfer operation. Each node has a priority ranking which is used during a process called arbitration. Arbitration is a process to decide which of 2 or more nodes which are simultaneously requesting control of the loop will get control of the loop. In the loop tenancy protocol shown in FIG. 5, an arbitration occurs, followed by an open primitive (hereafter referred to as an OPN primitive or simply an OPN) which is transmitted by the winning node. An OPN primitive is addressed to a specific node (the destination node) which returns an RRDY primitive when it is ready to receive data. Receipt of the RRDY by the source node which initiated the OPN is followed by transmission of one or more data frames from the source node to the destination node. Transfer of data is followed by transmission of a close primitive (hereafter a CLS primitive or simply a CLS) which can be transmitted by either node. When the source node receives a CLS from the destination node (or transmits a CLS to the destination node), it relinquishes control of the loop.

There follows a more detailed discussion of each phase of the prior art loop tenancy protocol.

Arbitration or ARB Primitives:

A node knows when it has won arbitration when it sees an inbound ARB primitive containing it's own AL_PA priority ranking. Algebraically small AL_PAs are higher priority than algebraically large AL_PAs. If a port wishes to arbitrate and it receives a lower priority arbitration, it substitutes its own ARB, i.e., it transmits an ARB with its own AL_PA. If it receives a higher priority ARB, it passes that higher priority ARB. Open or OPN Primitives:

OPNs are passed by a receiving port if the destination address does not match the AL_PA of the receiving port. Permission to Send or RRDY Primitives:

RRDYs are returned by the OPN recipient, i.e., the destination node having the AL_PA which matches the AL_PD in an OPN primitive. Each RRDY received by the OPN initiator, i.e., the source node, gives the OPN initiator permission to transmit one data frame. In the zero BB_Credit model, the OPN initiator may not transmit data until one or more RRDYs are received.

Close or CLS Primitive:

A CLS primitive may be initiated by either the source or destination node. If a node receives a CLS and did not originate a CLS, it must forward it. If both nodes originate a CLS simultaneously, since there is no addressing in a CLS, both nodes will believe the incoming CLS from the other node was their CLS, and both will close the loop concurrently.

Peformance:

FIG. 6 shows a series of loop tenancies which make up the protocol of a higher layer SCSI Write operation superimposed upon a lower layer FC-AL protocol. There are four FC-AL loop tenancies in a SCSI write operation: one for sending the write command, one for acknowledging receipt of the write command by a disk drive, one for sending the actual write data, and one for acknowledging receipt of the write data by the disk drive. Each ARB and CLS must be passed through every node on the FC-AL in the prior art FC-AL protocol, while each data frame and OPN primitive must be passed through, on the average, half the nodes on the loop (since data frames and OPN primitives are not propagated by the destination node).

With 4 loop tenancies and an average of 3 round trips per tenancy, there are 12 round trips per SCSI write command. Multiply this by the number of nodes on the loop and again by 6 words delay per node to get 72×N word delays pur SCSI write command where N is the number of nodes on the FC-AL.

For a fully configured, two-initiator loop (2 initiators or servers, and 62 disk drives per initiator, where each initiator and disk drive is a node), the above delay or loop latency calculation becomes 72×126=9072 word delays, or 9072× 40=363 kbit delays per SCSI write command. At 1.062 Gbits/sec, this equals about 341 microseconds of link overhead per SCSI write command.

For disk drives which have around 500 microseconds of controller software and hardware overhead, having a fixed 341 microsecond delay due just to FC-AL overhead significantly reduces the number of SCSI operations per second per arbitrated loop.

Therefore, a need has arisen for a bridge product which can reduce loop latency as well as reduce contentions for the loop in an FC-AL protocol network.

SUMMARY OF THE INVENTION

According to the teachings of the invention, a FC bridge consisting two half bridges is provided which can couple a local FC-AL to a remote FC-AL such that concurrent conversations can be occurring on the two local FC-ALs coupled by a bridge under certain circumstances. Each half bridge is connected to a local return FC-AL segment and a local FC-AL loop segment. The half bridge looks at the destination address of local OPNs, and, if the destination node is on local FC-AL segment, the half bridge couples the local return FCAL segment to the local FC-AL loop segment to make a complete FC-AL thereby bypassing the remote half bridge.

The bridges are learning bridges and start out with blank tables which cause connections within the bridge such that the local FC-AL and remote FC-AL are coupled together as one big, unaccelerated FC-AL. The bridge monitors loop traffic and starts building tables using destination addresses in OPN primitives that traverse the various loops. The tables are built by drawing inferences about the locations of nodes having the destination address in each OPN primitive from the type of primitives that arrive, from which loop segments these primitives arrive, and in which order the primitives arrive, the tables being built and operation of the bridge being controlled by one or more state machines according to predetermined switching and state transition rules described below.

More precisely, a learning bridge for accelerating operations on a Fibre Channel Arbitrated Loop can be made according to the teachings of the invention. The learning bridge selectively couples first and second local loop segments to form a single Fibre Channel Arbitrated Loop in certain circumstances and two isolated independently functioning Fibre Channel Arbitrated Loops in other circumstances.

The full learning bridge is comprised of a first half bridge coupled to a first local loop segment and a second half bridge coupled to the first half bridge and coupled to a second local loop segment. Each half bridge has a local return segment which can be switched by the half bridge so as to be coupled to the local loop segment coupled to that half bridge so as to convert each local loop segment into a complete Fibre Channel Arbitrated Loop. Each local loop segment has one or more nodes thereon each of which has a unique address which is a destination address when data is being transmitted to that node and which is a source address when data is being transmitted from that node to some other node. The learning bridge has switching means for learning the locations of the destination addresses of nodes on the first and second local loop segments by watching OPN, RRDY and CLS primitives propagating between the first and second local loop segments coupled to the bridge and recording data in a forwarding table stored in memory which indicates whether each destination address whose location has been learned is associated with a node on the first local loop segment or the second local loop segment. The switching means draws conclusions as to the locations of source nodes by watching primitive traffic on said first and second local loop segments and switching the local return segments appropriately to make the first local loop segment a complete Fibre Channel Arbitrated Loop when the nodes having the source address and destination address of a transaction are both located on the first local loop segment. Likewise, the switching means switches said local return segments inside the half bridges appropriately to make said second local loop segment a complete Fibre Channel Arbitrated Loop when the source address and destination address of the nodes involved in the transaction are both located on the second local loop segment.

Because the two loop segments can have concurrent transactions in a bridged environment, arbitration can be won on either or both loop segments independently and also simultaneously, regardless of whether or not the destination node is local or remote. The process of arbitration does not communicate destination addresses in the ARB primitives, and, therefore, a preemption decision cannot be made in the arbitration phase of the FC-AL communication. Preemption occurs when arbitration is won on both loop segments, followed by conflicting OPNs. Conflicting is defined in terms of any of the 6 cases identified below where preemption is found to be necessary. The only case where preemption does not occur in the case where concurrent arbitrations on the local and remote loops (hereafter sometimes call the left and right loop segments) have been won is where the destination nodes are both local, i.e., on the same loop segment as the source nodes trying to open them so that the OPN traffic does not cross the bridge. Therefore, bridges are best configured such that the majority of traffic between nodes is kept local such that it does not have to cross the bridge thereby making best use of the possibility of concurrent traffic on each of the remote and local loops.

Special rules are used to handle the case conflicting OPNs arriving at a half bridge. There are several cases where preemption is necessary in a top level of FC-AL bridging. All cases are stated below in terms of local and remote OPNs relative to the left half bridge, but the same cases and preemptive processing occur at the right half bridge.

Case 1: a local OPN at the left half bridge is forwarded to the right half bridge followed by receipt at the left half bridge of a different remote OPN. In this case, conflicting OPNs make preemption of one of them necessary. The preemption decision is based upon a comparison of the addresses of the conflicting OPNs. Half duplex OPNs are converted to pseudo-full duplex OPNs before the preemption address comparison is done. If the address comparison indicates that the local OPN of the left half bridge is higher priority than the remote OPN received at the left half bridge, the remote OPN is discarded by the left bridge and the right half bridge sends out a preemptive CLS to close the source node which generated the lower priority remote OPN. If the remote OPN at the left half bridge is higher priority, the left half bridge transmits a preemptive CLS on it local loop to close the node which generated the lower priority local OPN. The left half bridge then arbitrates for control of the left half bridge local loop using ARB(0). Any ARB fill words coming in from the right half bridge are converted to ARB(0) by the left half bridge during this process. Arbitration is won by the left half bridge when it sees ARB(0) return to it. When arbitration is won by the left half bridge, the remote OPN is transmitted by the left half bridge out onto the left half bridge local loop. The right half bridge, which independently does its own comparison, concludes that the lower priority OPN forwarded to it by the left half bridge must be discarded.

Case 2: a local OPN for the left half bridge has been forwarded across the local bypass to the left half bridge TX port when, later, a different remote OPN arrives at the TX port of the left half bridge. This situation is resolved by an automatic preemption of the remote OPN by the left half bridge sending out a preemptive CLS to the right half bridge since the local loop is busy.

Case 3: a remote OPN is received at the left half bridge simultaneously with receipt at the left half bridge of a local OPN. This situation is resolved by examining the addresses of the two OPNs and sending a preemptive CLS to close the source node of the lower priority OPN, the preemptive CLS being transmitted by the half bridge coupled to the local loop coupled to the source node of the lower priority OPN. Following the preemption, if the local OPN is higher priority, the memory is accessed to determine whether the destination address of the winning local OPN is local or remote, and the local OPN is forwarded via the appropriate path to its destination.

Case 4: a remote OPN is received by the left half bridge followed by receipt of a different local OPN. When the remote OPN is received, the TX port starts to arbitrate for the local loop. If a local OPN is received before arbitration is won by the TX port, the remote OPN is too late because the local loop is considered to be busy as soon as arbitration is won by the source node which generated the local OPN. Therefore, the remote OPN is preempted by transmission of a preemptive CLS from the left half bridge to the right half bridge, and the left half bridge then discards the remote OPN.

Case 5 (no preemption necessary): a local OPN is received at the left half bridge and is forwarded to the right half bridge, whereupon it is returned to the left half bridge. When a local OPN is returned from the right half bridge, the left half bridge must identify the fact that the remote OPN just received is the same OPN as the local OPN previously forwarded to the right half bridge. This is done by comparing addresses. When case 5 arises, the returning remote OPN is forwarded transparently onto the local loop without arbitration and all subsequent traffic is forwarded by the left half bridge transparently onto the local loop until the loop tenancy is done, and a new local or remote OPN is detected.

Case 6 (no preemption necessary): a remote OPN is received, forwarded locally and returns. Upon detection of the identical OPN, the arbitration process started by the left half bridge TX port is stopped, and the left half bridge goes into a transparent mode where all fill words, data and primitives coming from the right half bridge are passed transparently through the local loop and forwarded back to the right half bridge where they either reach a destination node or are forwarded to the source node. If the destination node is present on the local loop of the right half bridge, it responds with an RRDY or CLS which is forwarded to the source node on the same local loop. If an RRDY was sent, the source node responds with a frame of data which is then forwarded to the left half bridge and transparently passed therethrough, through the left half bridge local loop and back to the right half bridge where it is transparently forwarded to the destination node. This process is continued until the loop tenancy is completed. The right half bridge learns the location of the destination node, so the next time a right half bridge trys to open the same destination node, the local bypass path will be used and the left half bridge will be omitted from the loop tenancy.

In the event that a half bridge needs to make a preemption decision, the decision is based on a combination of the destination and source addresses in the OPN primitive with the destination address being the most significant 10-bit word of a 20-bit value in the OPN. The highest priority address is determined per the FC-AL arbitration rule that the lower algebraic value is the higher priority. If the destination addresses are different, the OPN with the higher priority destination address wins. If the destination addresses are identical, the OPN with the higher priority source address wins. The combined destination plus source address are guaranteed to be different for full duplex OPNs and also guaranteed to be different for half duplex OPNs using the half-to-full duplex OPN conversion method described below which forms part of the teachings of the invention. Preemption is carried out by the half bridges by sending out a preemptive CLS primitive to the source node which initiated the losing OPN.

The half bridges use hex 00 addresses which generate ARB(0) current fill words (sometimes referred to herein as CFW) to arbitrate for their local loop segments. This is the highest priority address, so in the case of concurrent arbitrations by a node on the local loop and the half bridge, the half bridge is guaranteed to win.

A combination of a first-come-first-served and a highest priority address rules can be used to resolve preemption situations. In fact, case 2 above of the preferred embodiment is actually a first-come-first-served rule. For example, to handle the situation wherein two OPN commands are received at a half bridge within a short time from a source node on the local loop segment and a source node on a remote loop segment, each half bridge implements several rules. First, if a half bridge receives an OPN from a source node or initiator on its local loop segment destined for a node on the remote loop segment followed by receipt of a different remote OPN from a source node on a remote loop segment which is received before the local OPN was forwarded to the remote half bridge, a first-come, first-served rule can be followed instead of the address comparision described above for case 3 (case 3 is intended to cover all cases wherein a remote OPN is received before the memory access is complete and the local OPN is forwarded). In the first-come-first-served embodiment, the half bridge sends a CLS command out to the remote loop segment followed by the OPN command from the source node on the local loop segment. The CLS command propagates past the destination node for the OPN from the local loop node and closes the source node on the remote loop segment. The following OPN then arrives at the destination node and results in transmission by the destination node of either an RRDY or a CLS command. A similar first-come, first-served rule could be followed in the reverse situation when an OPN arrives at a half bridge first from a node on the remote loop and then later from a node on the local loop although this would involve somehow causing the local source node to give up control of the local loop even though it had won arbitration just after the remote OPN arrived and the ensuing arbitration by the TX port was successfully concluded. This particular case might not be supported by the FC-AL standard. In this case, if it is possible, the half bridge sends a CLS command out on the local loop segment and forwards the OPN received from the remote loop segment on the local loop segment following transmission of the CLS.

FC-AL bridges according to the teachings of the invention do not support a mode of behavior known as nonzero buffer to buffer credit . This portion of the FC-AL standard permits nodes to transmit data without having received any RRDY primitives from the destination node. In alternative embodiments, nonzero buffer to buffer credit behavior could be supported by adding buffer memory to store the data frames until the destination node indicated by RRDYs that it was ready to receive the frames of data stored in the buffer.

If a bridge according to the teachings of the invention were inserted into a Fibre Channel Arbitrated Loop to divide it into two equal segments, with one initiator or server and 62 disk drives per segment, not only would node latency be halved (to 170 microseconds) compared to the prior art, but contention between the loop devices would be also halved.

Conversion of Half-duplex OPN to Full-duplex For Determining Preemption Priority There are two types of OPN primitives in FC-AL: a half-duplex OPN which only specifies the destination address, and a full-duplex OPN which specifies both the source and destination address. These primitives are denoted OPN(AL_PD,AL_PD) and OPN(AL_PD,AL_PS) respectively.

In order for a comparison to be made between two arriving OPNs at a half bridge for preemption, both the source and destination addresses must be compared. However, it is possible that two concurrent half-duplex OPNs specifying the same destination address could exist in a half bridge. It is not possible for two concurrent full-duplex OPNs specifying the same source and destination to exist, since loop initialization causes the bridge to join it's two loop segments and form one large loop for the purposes of unique address resolution, and so duplicate source addresses cannot occur.

A half-duplex-to-full-duplex conversion rule is used in the case where half duplex OPNs are received with destination nodes having equal priority and unknown source nodes. In this tie-breaking method, a locally administered management address of each half bridge which is set upon initial configuration of the system is used as the source address. That is, during configuration each half bridge of a pair of half bridges which make a full bridge is given a high or low priority and assigned an address of either hex F7 or hex F8. Every half-duplex OPN sent from one half bridge to the other is converted to a vendor-unique full-duplex OPN before or after storage in the latch of the RX port or TX port which received it. The modified half-duplex OPN is changed so that the source address is equal to hex F7 if the priority is high, and F8 if the priority is low. This allows for tie-breaking by the normal operation of the preemption rules in the case of the arrival of concurrent half-duplex OPNs or one half-duplex OPN and a concurrently arriving full-duplex OPN. In other words, the substitution of predetermined reserved source addresses F7 or F8 in half-duplex OPNs in the absence of full-duplex OPNs, which contain unique source addresses, allows the normal preemption rules to be used to resolve concurrent OPN situations where one or both of the concurrent OPNs are half-duplex and do not contain the source address.

Hex F7 and hex F8 addresses are chosen because they are among the 6 unused neutral-disparity addresses available in the FC-AL standard, and make comparison economical since the same circuitry is used to test half-duplex OPNs and full-duplex OPNs for preemption. With this scheme, all OPNs should be unique, regardless of whether or not full or half-duplex is used. If a bridge encounters a non-unique (duplicate) OPN, it shall discard it. This would only happen if two low priority bridges or two high priority bridges were inadvertently misconfigured.

Whenever a half-duplex OPN is received at an RX port of a half bridge, it is automatically converted to a pseudo-full-duplex OPN in the latch circuitry in the RX port by substituting hex F7 of F8 for the source address. No half-duplex OPNs are allowed to be transferred between two half bridges. Instead, when the half bridge forwards an OPN to a remote half bridge, it leaves any pseudo-full-duplex OPNs in the pseudo-full-duplex state.

RRDY Management

In the case of a full-duplex OPN, it is possible that RRDY primitives will arrive directly behind the OPN. The bridge is not allowed to discard the RRDYs, but since all RRDY primitives are identical (there is no addressing in an RRDY) it is not necessary to buffer them. Therefore, the TX and RX ports have RRDY counters which are armed by receipt of a full-duplex OPN, and increment on each received RRDY. The bridge discards each RRDY which it counts. When the OPN is forwarded, the number of counted RRDYs are synthesized and the counter self-decrements for each transmitted RRDY. When the counter reaches zero, RRDYs are no longer transmitted or counted (until the next full-duplex OPN followed by RRDYs arrives) and all traffic including RRDYs are allowed to flow through transparently.

Learning Rules

The FC-AL bridge learns by inspecting OPN, CLS and RRDY primitives in certain conditions. Initially both half bridges join their local loop segments together to form one large loop until each half bridge has learned which nodes are located on their local loop segments. Learning occurs as follows.

Case (1) remote OPN (AL_PD, AL PS) arrives at pin 2 of a TX port, is forwarded to pin 3 of the TX port for transmission on the local loop and an RRDY or CLS returns to pin 1 of the RX port from the local loop: In this case, it is known that the destination node is on the local loop, so the memory location corresponding to the destination node address is written with data indicating the node is local to this half bridge Case (2) local OPN (AL_PD, AL_PS) arrives at pin 1 of the RX port from the local loop segment and is forwarded to pin 2 for transmission to the remote half bridge. An RRDY or CLS returns to pin 2 of the TX port: In this case, it is known that the destination node is remote to this half bridge so the memory of this half bridge is written with data which reflects this fact.

Figure 1:
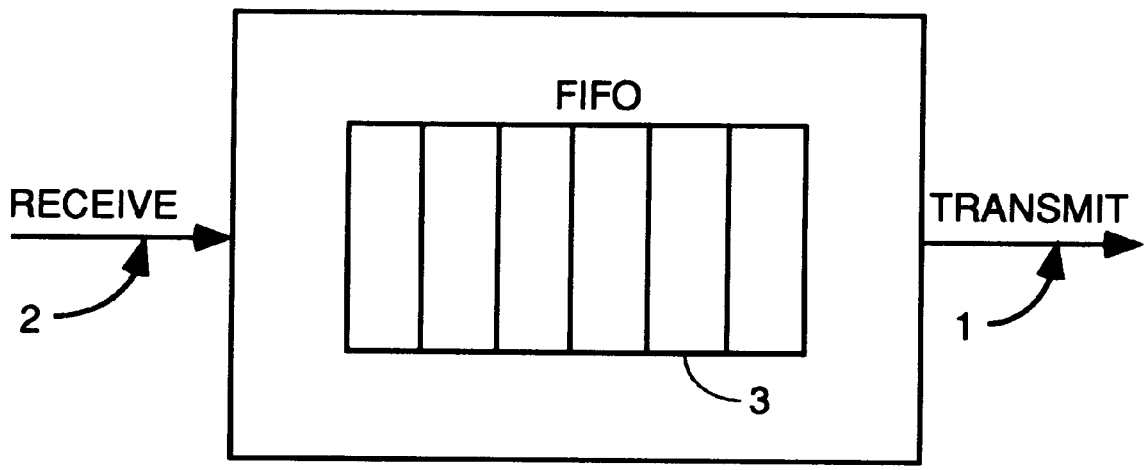
FIG. 1 is a diagram of a prior art Fibre Channel Arbitrated Loop Node having a 6 word FIFO buffer that causes a 6 word delay in propagation of primitives and data frames through such a node.
Figure 2:
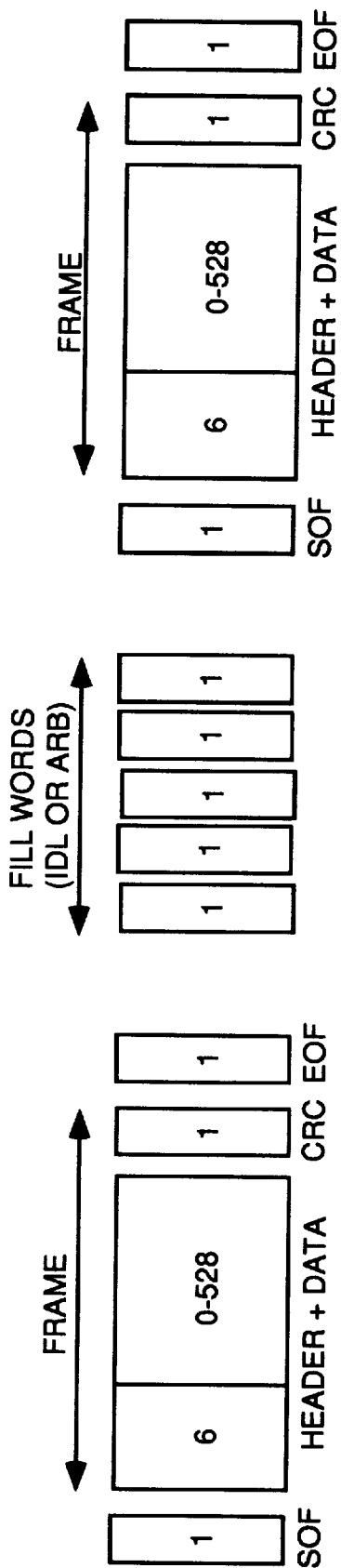

FIG. 2 is a diagram of the relationship between data frames and fill words in a prior art Fibre Channel Arbitrated Loop architecture.

FIG. 3 is a table listing the types of primitives in the Fibre Channel Arbitrated Loop protocol, their meanings and their respective data structures.

Figure 4:
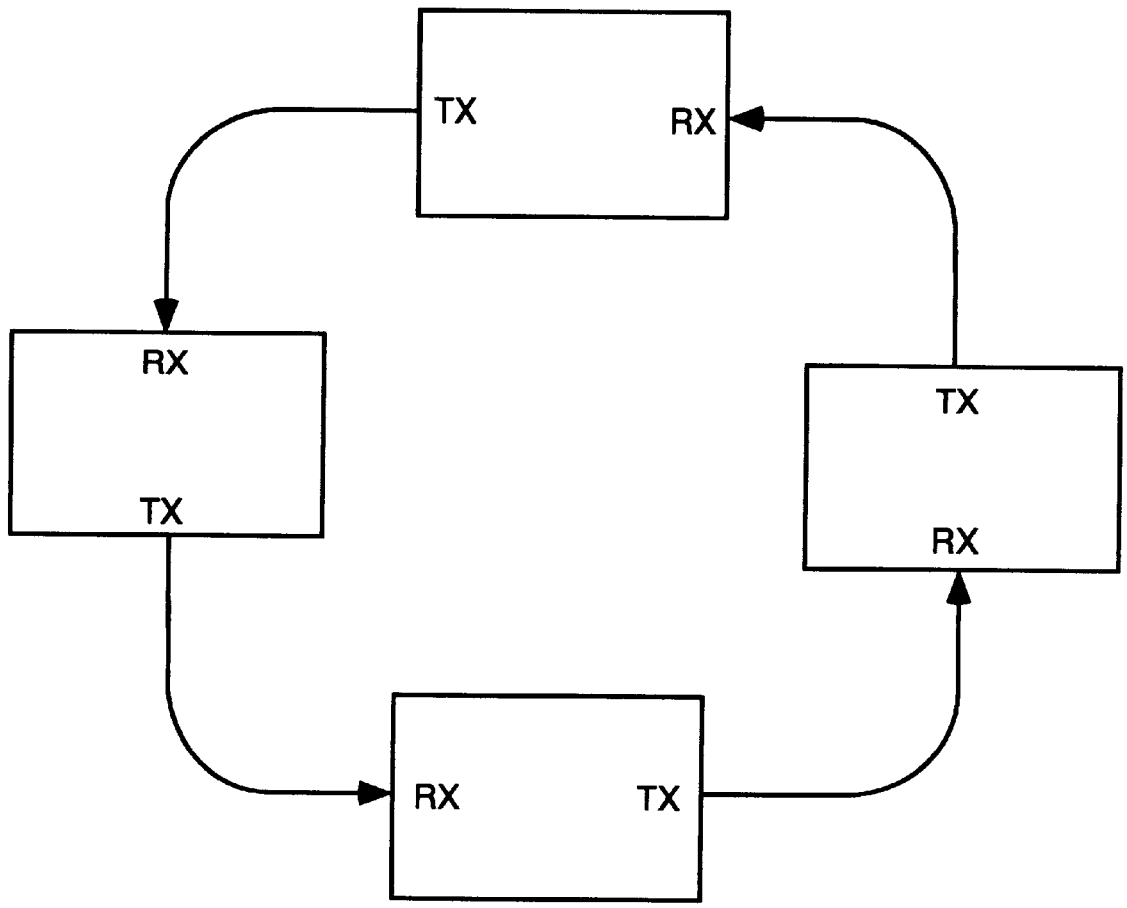

FIG. 4 is a diagram of a conventional four node Fibre Channel Arbitrated Loop architecture.

Figure 5:
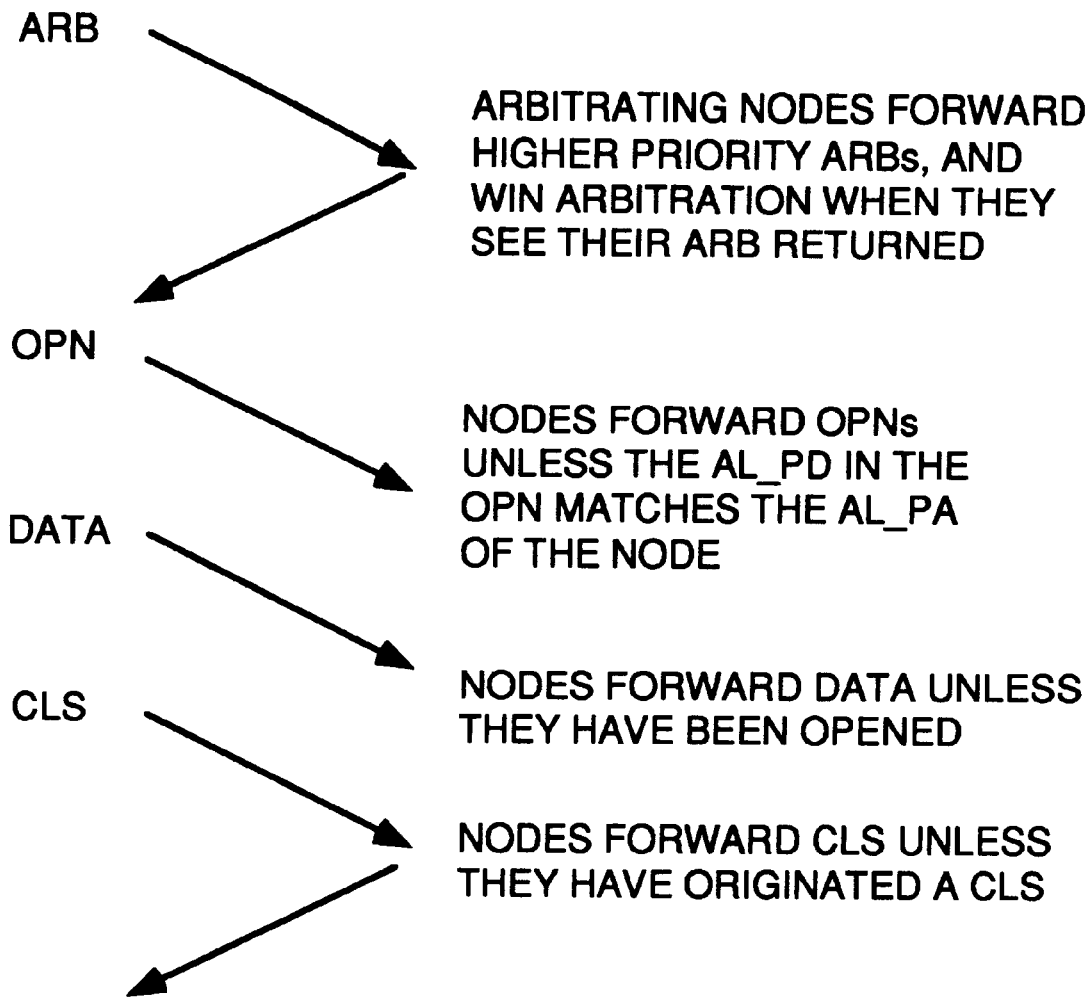

FIG. 5 is a diagram showing the steps in a conventional Fibre Channel Arbitrated Loop tenancy to achieve control of the loop.

Figure 6:
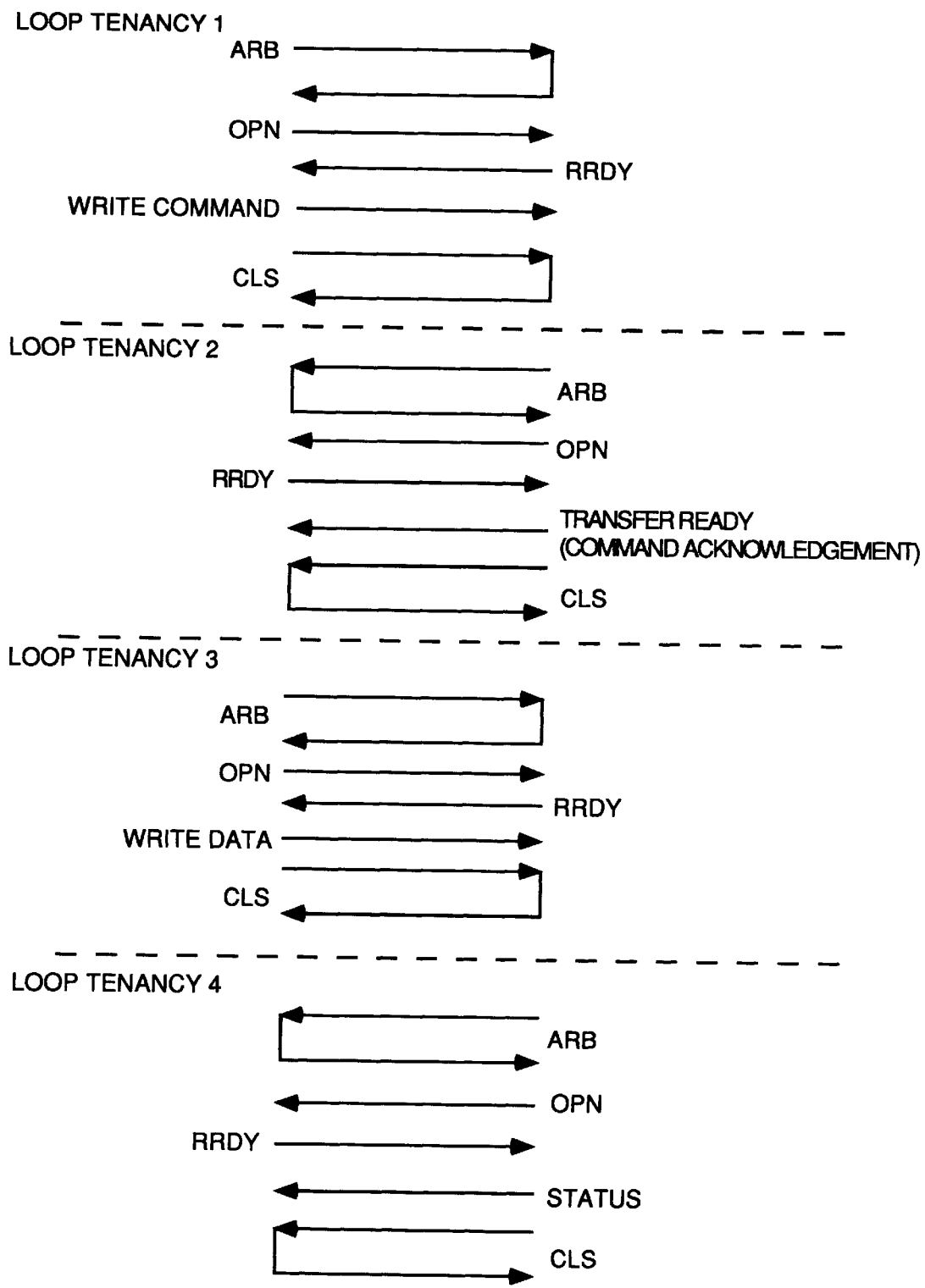

FIG. 6 is a diagram showing the steps required to carry out all the required loop tenancies necessary to implement a SCSI protocol write command when implemented using et Fibre Channel Arbitrated Loop protocol.

Figure 7:
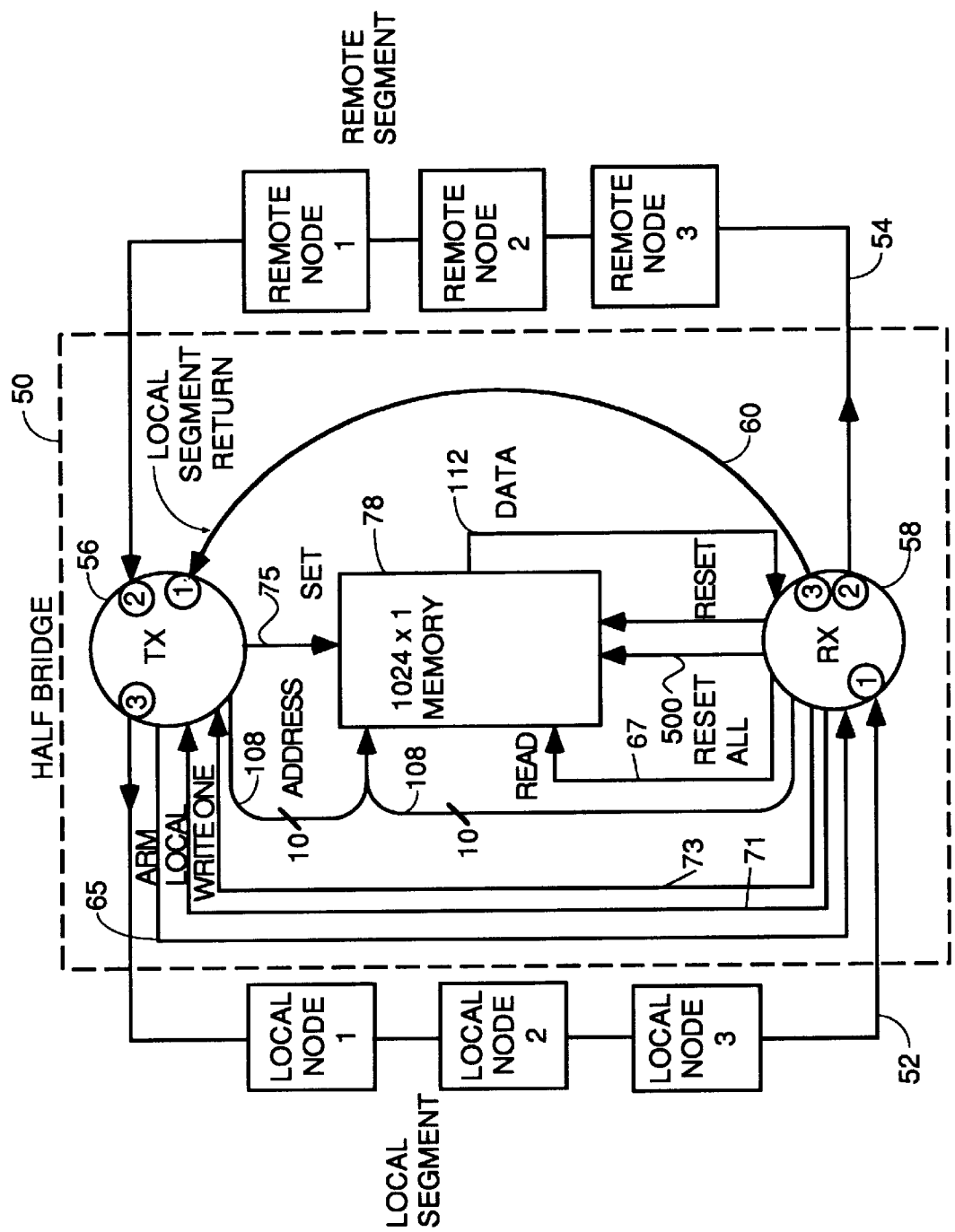

FIG. 7 is a diagram showing the structure of one embodiment of a half bridge according to teachings of the invention.

Figure 8:
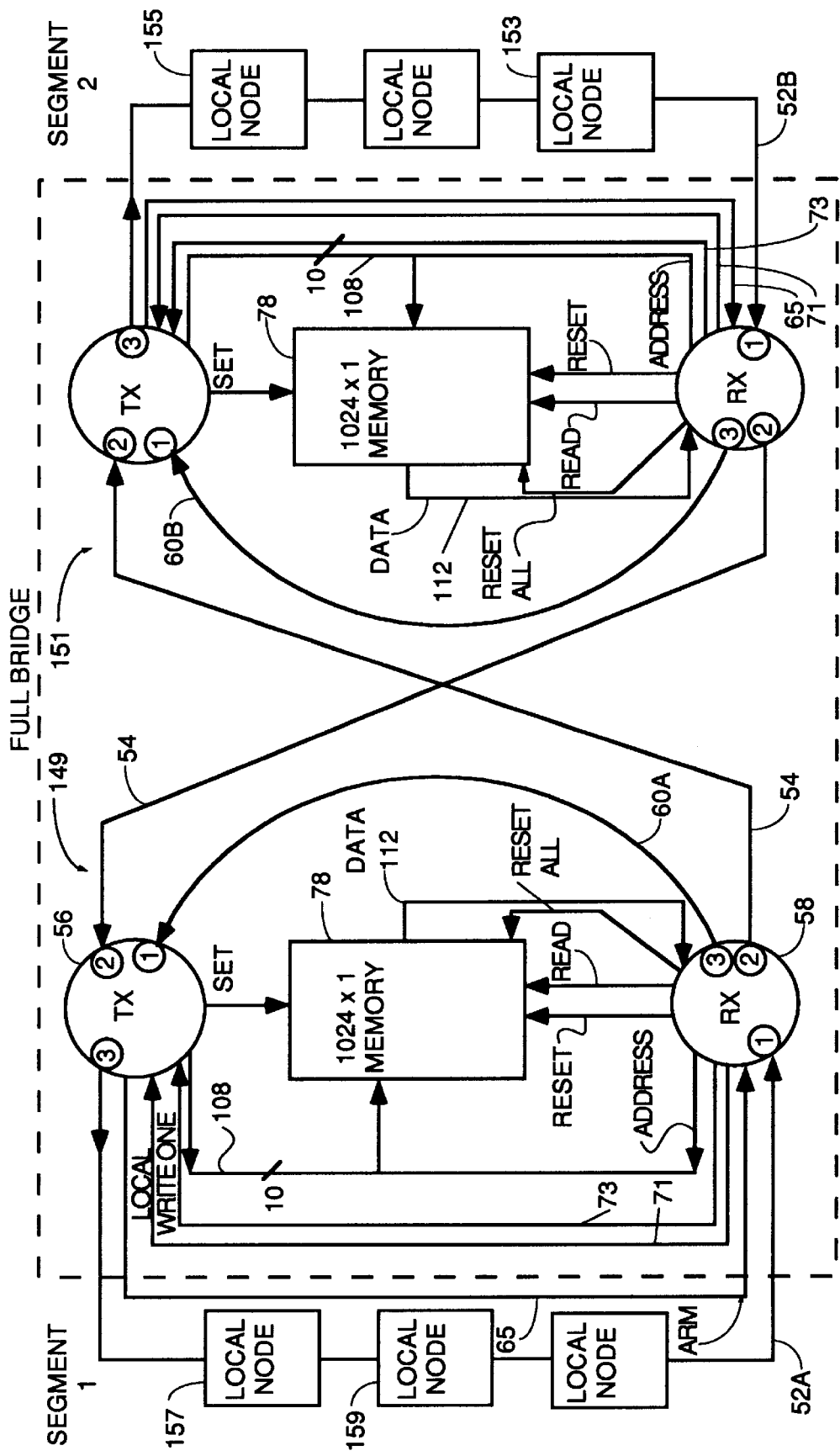

FIG. 8 is a diagram showing how two half bridges according to the first embodiment of the teachings of the invention can be cross connected internally to make a full bridge.

Figure 9:
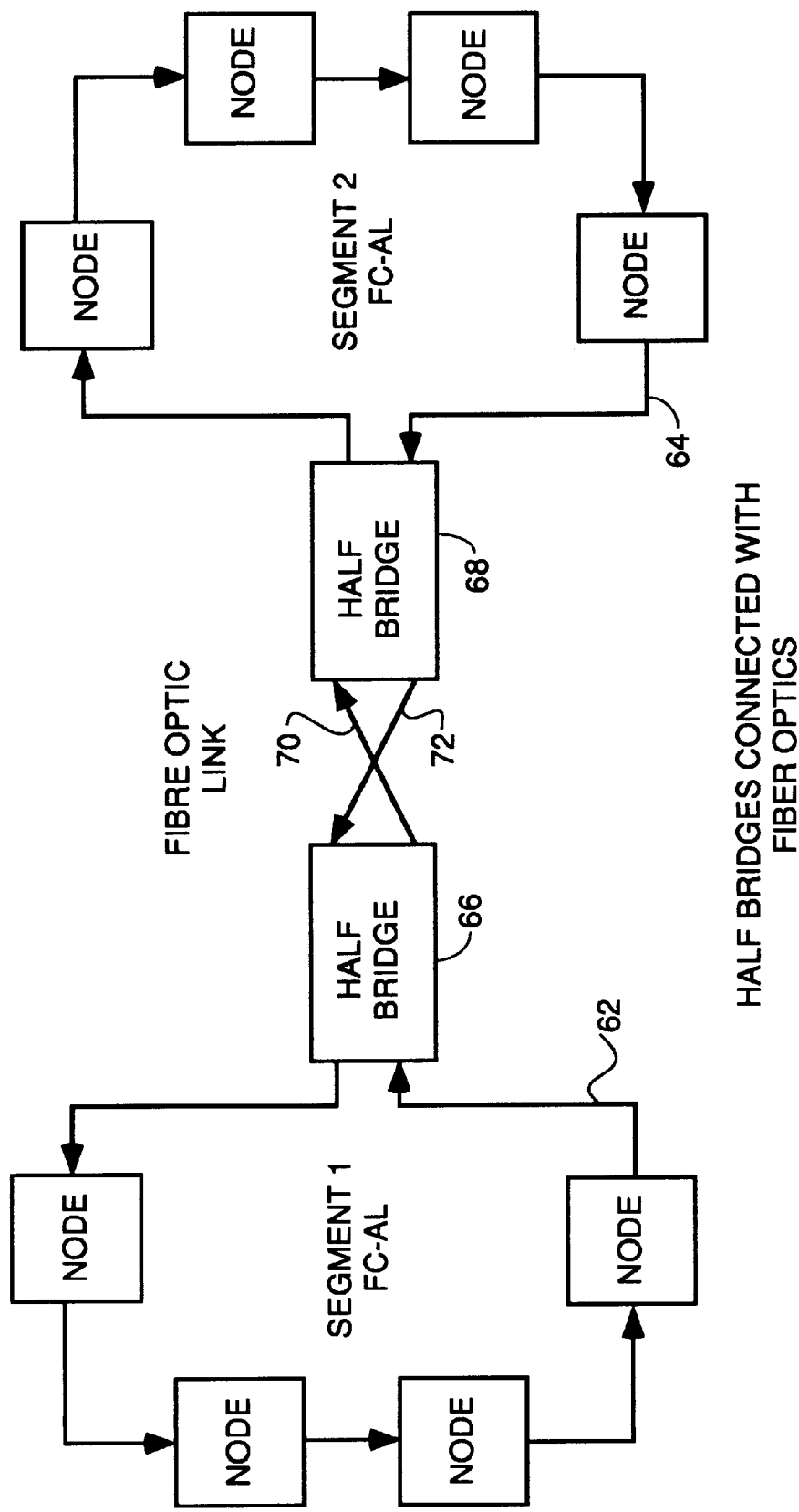

FIG. 9 is a diagram showing how two half bridges constructed according to any embodiment of the teachings of the invention may be connected together to link two Fibre Channel Arbitrated Loops and achieve acceleration over a single FC-AL having the same number of nodes as the two smaller FC-ALs linked by the two half bridges.

Figure 10:
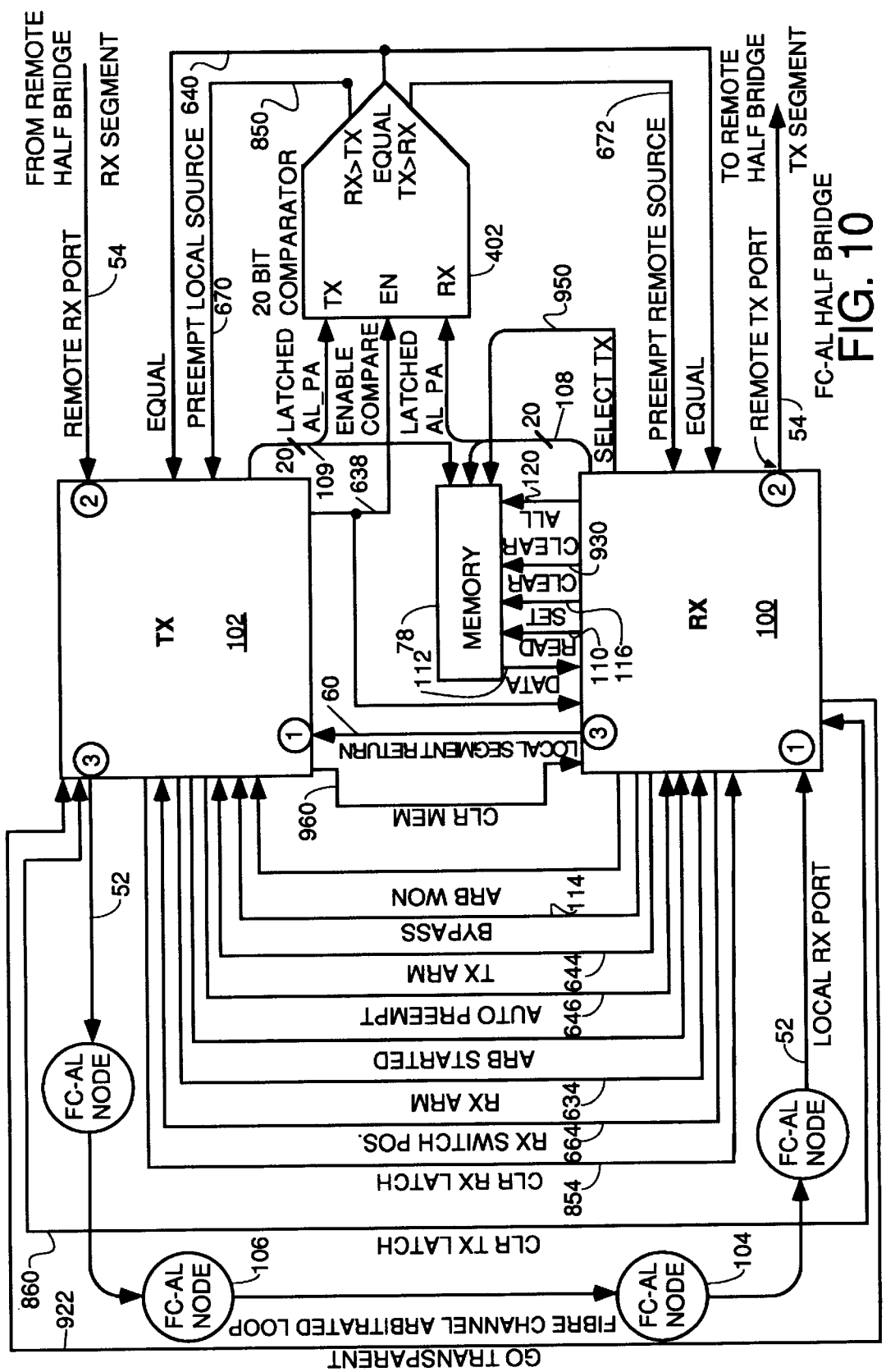

FIG. 10 is a diagram showing the internal construction of a half bridge according to the preferred embodiment of the invention.

Figure 11:
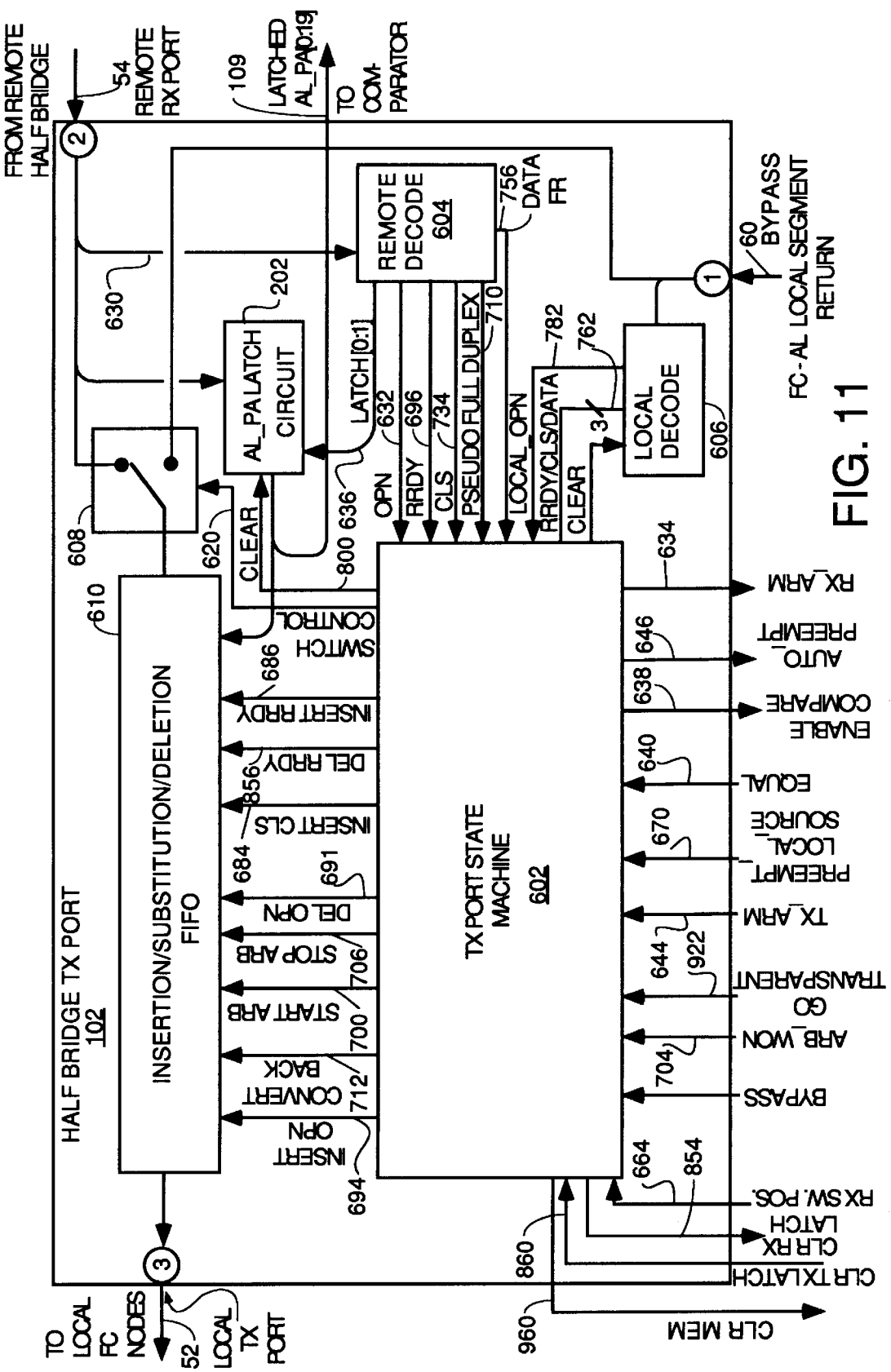

FIG. 11 is a diagram showing the internal construction of a TX port of a half bridge according to the preferred embodiment of the invention.

Figure 12:
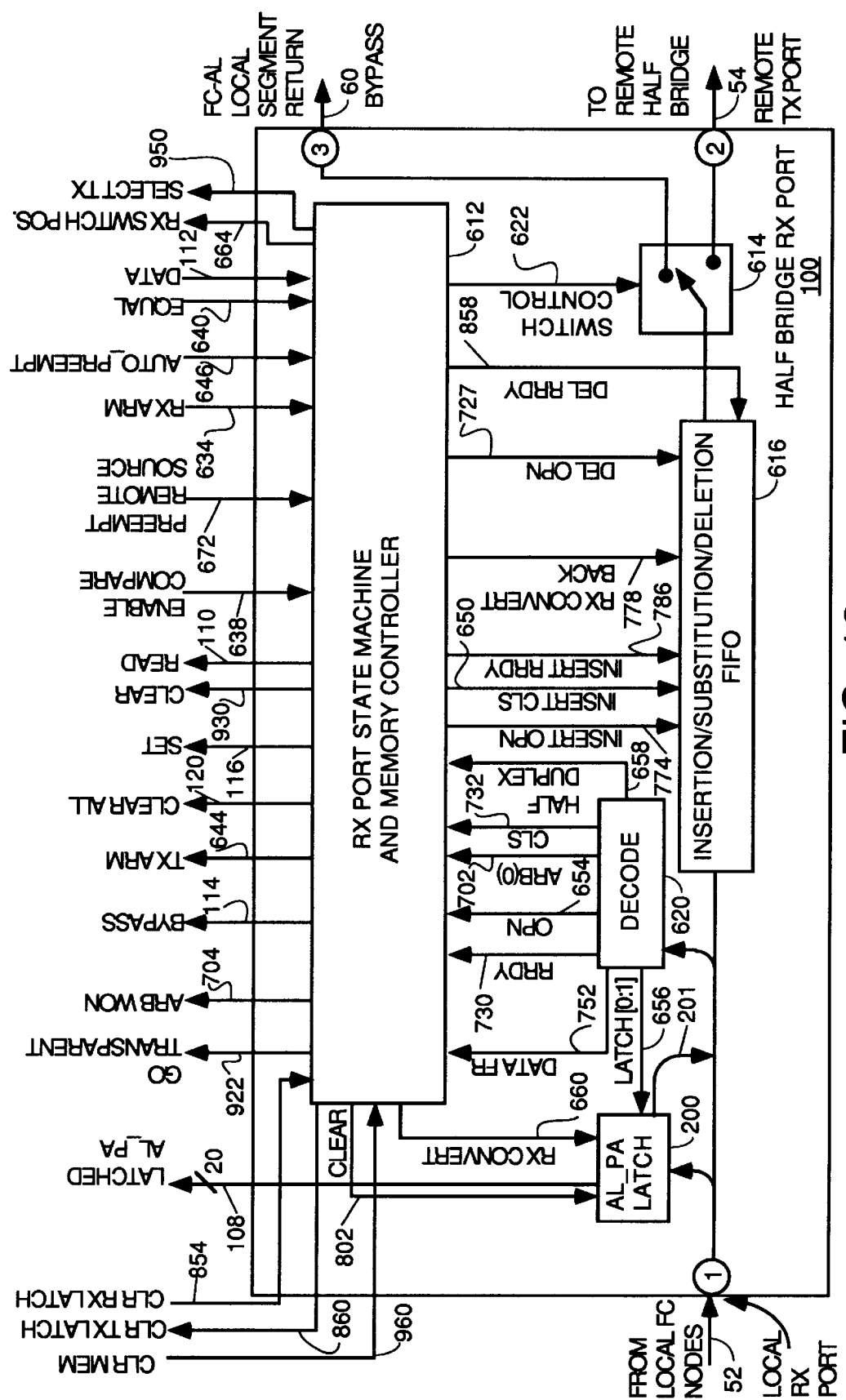

FIG. 12 is a diagram showing the internal construction of an RX port of a half bridge according to the preferred embodiment of the invention.

FIG. 13, comprised of FIGS. 13A through 13G is a flow chart showing processing by the TX and RX ports of a half bridge according to the preferred embodiment of the invention to carry out bridging, learning and conflicting OPN preemption decisions.

Figure 13A:
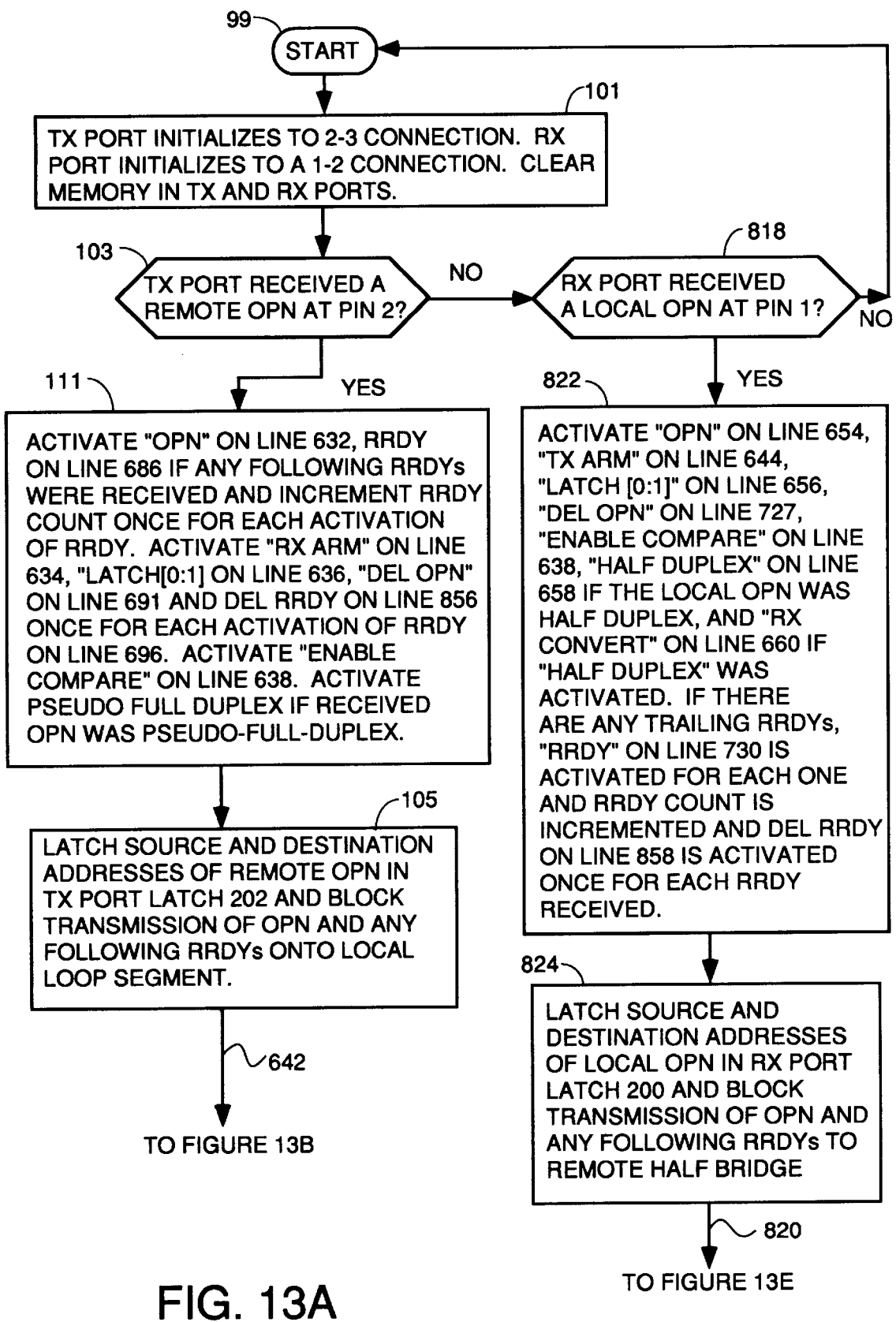
Figure 13B:
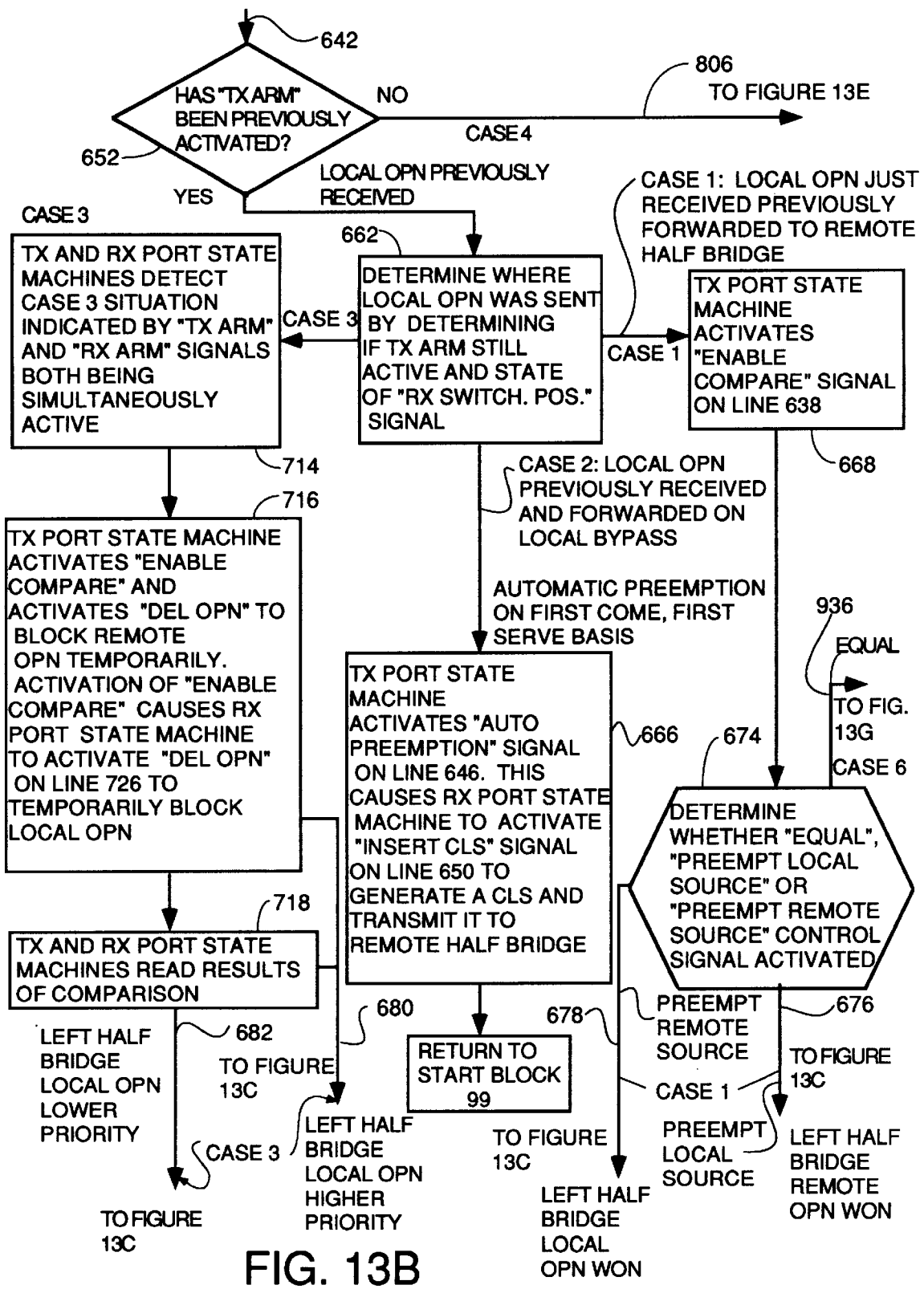
Figure 13C:
Figure 13D:
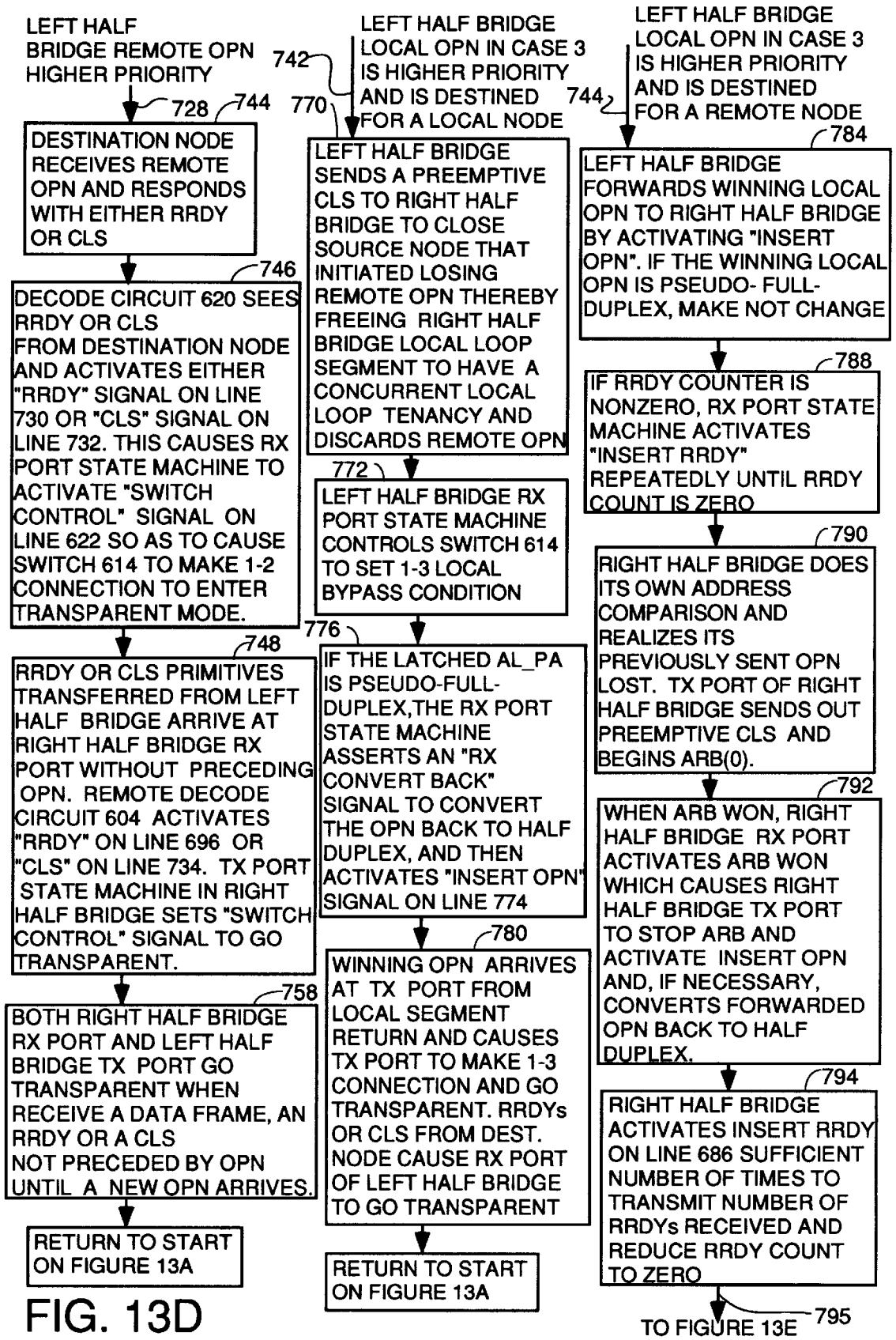
Figure 13E:
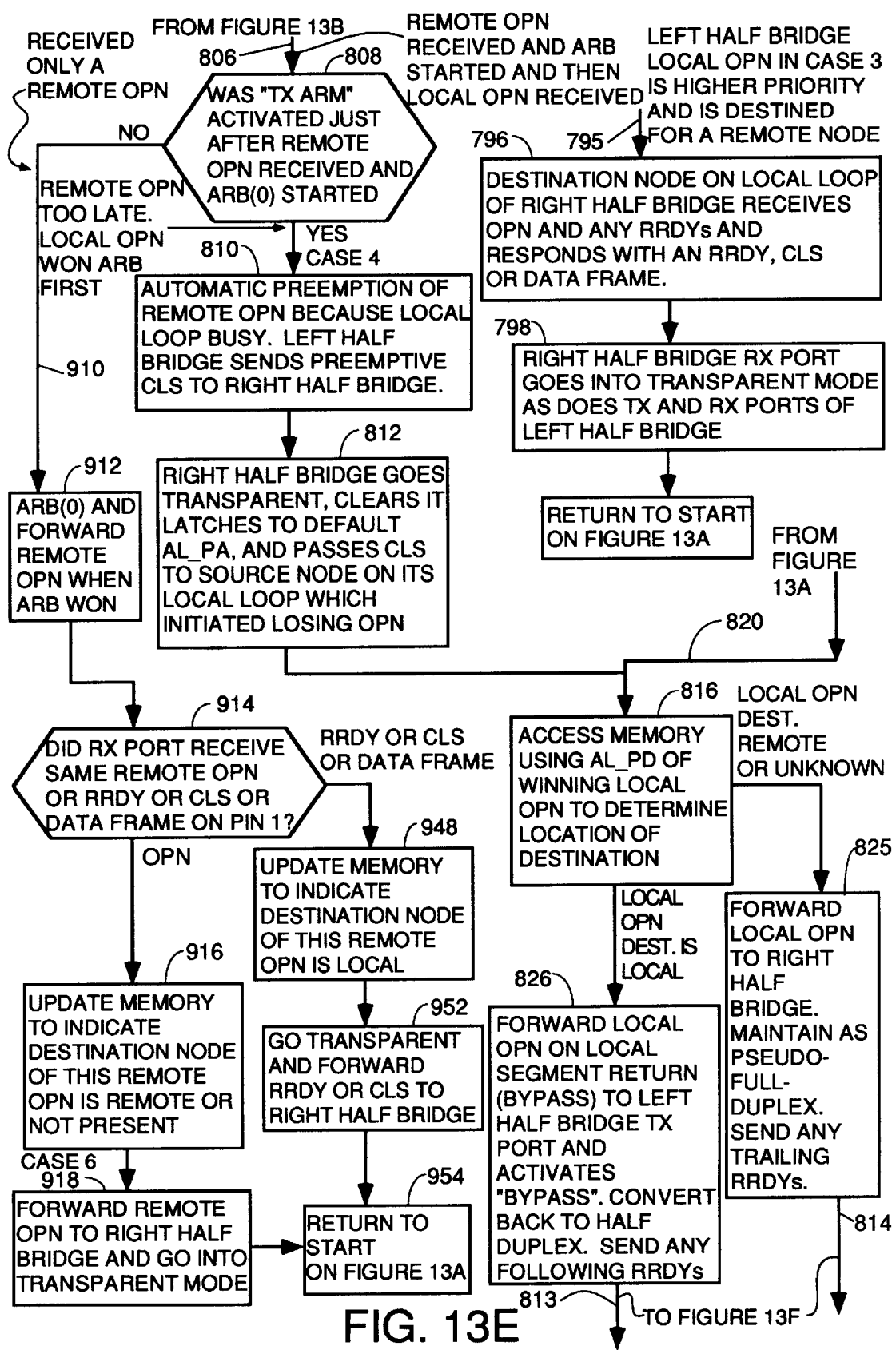
Figure 13F:
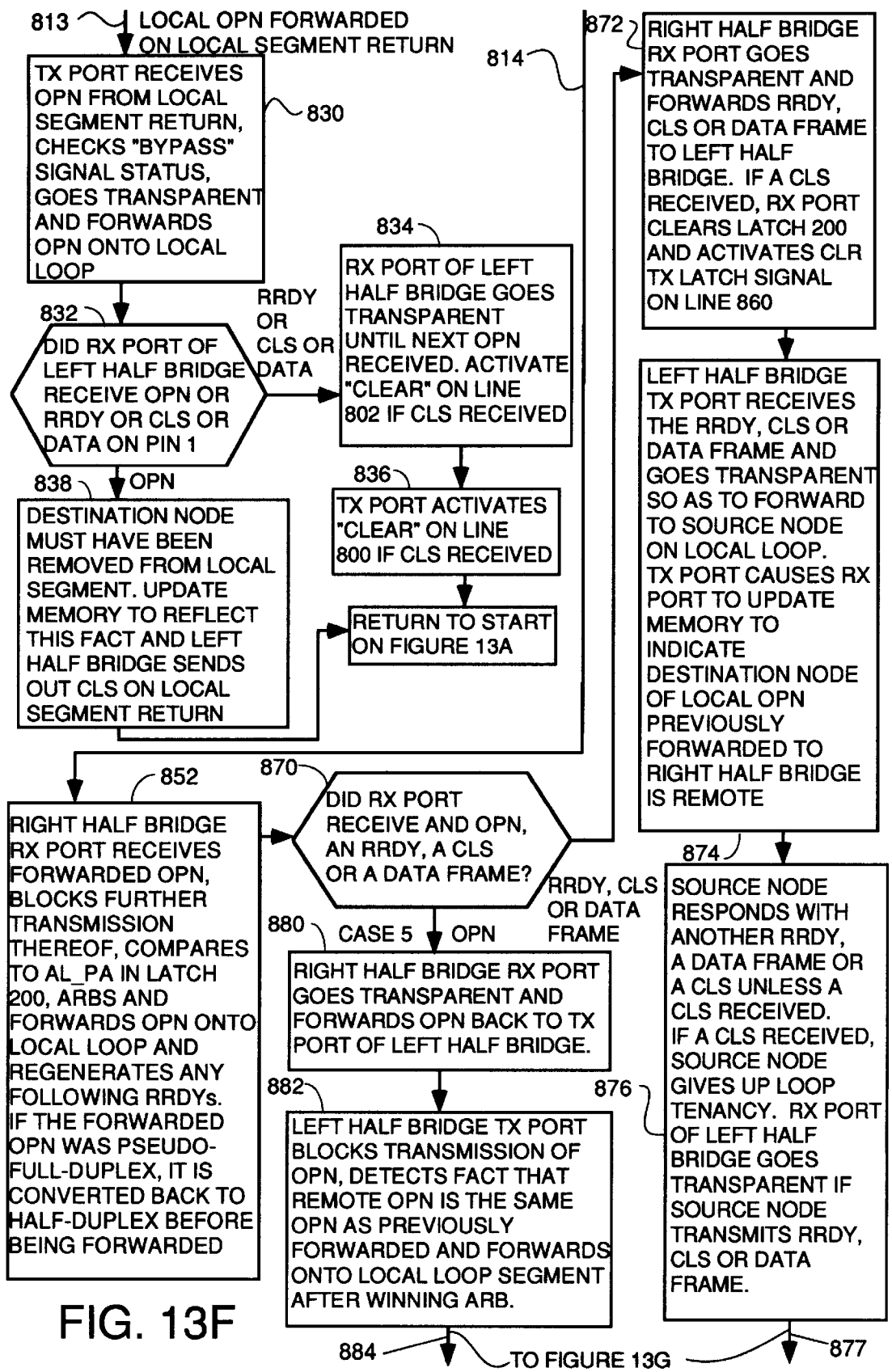
Figure 13G:
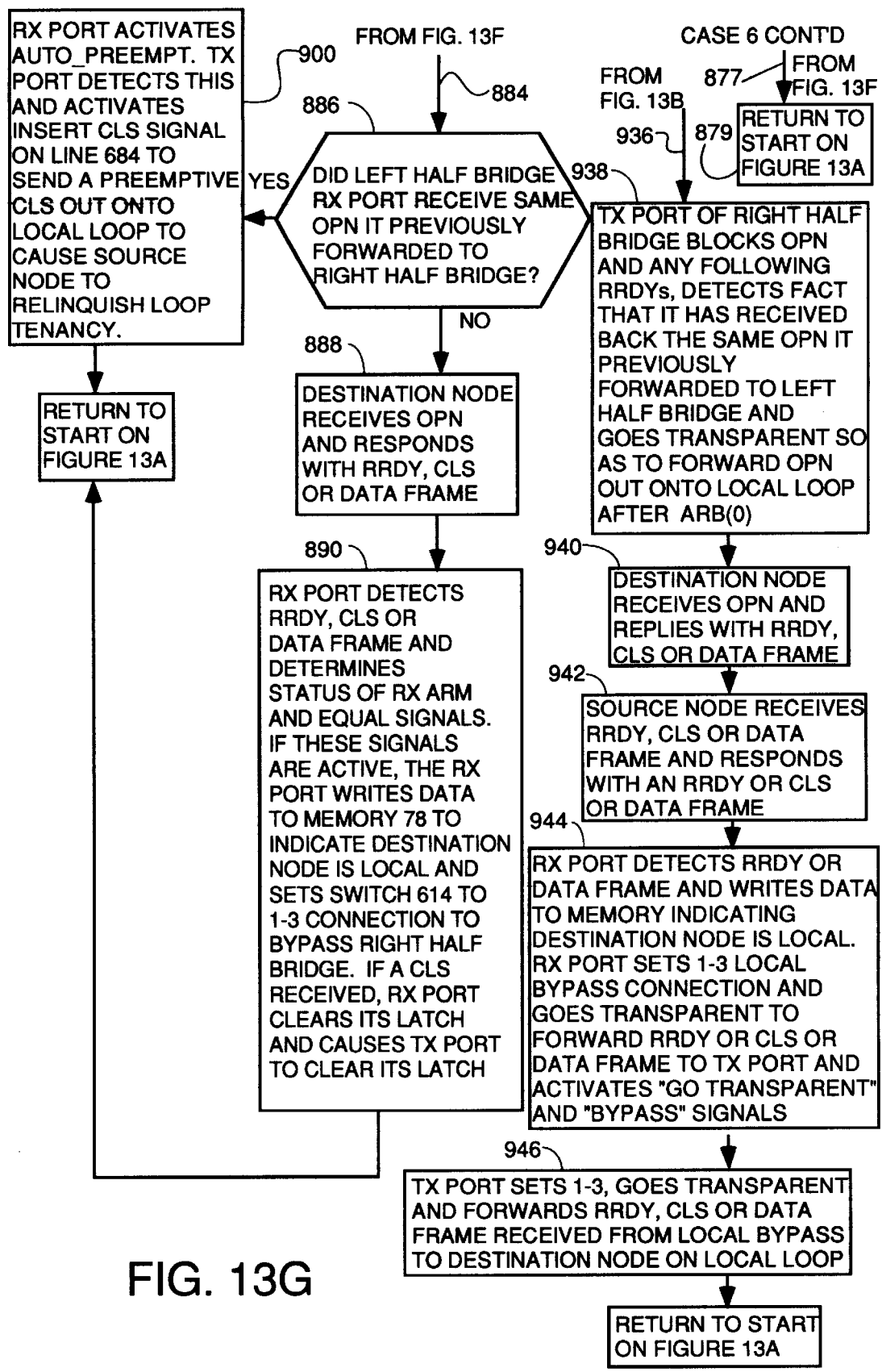
Figure 14:
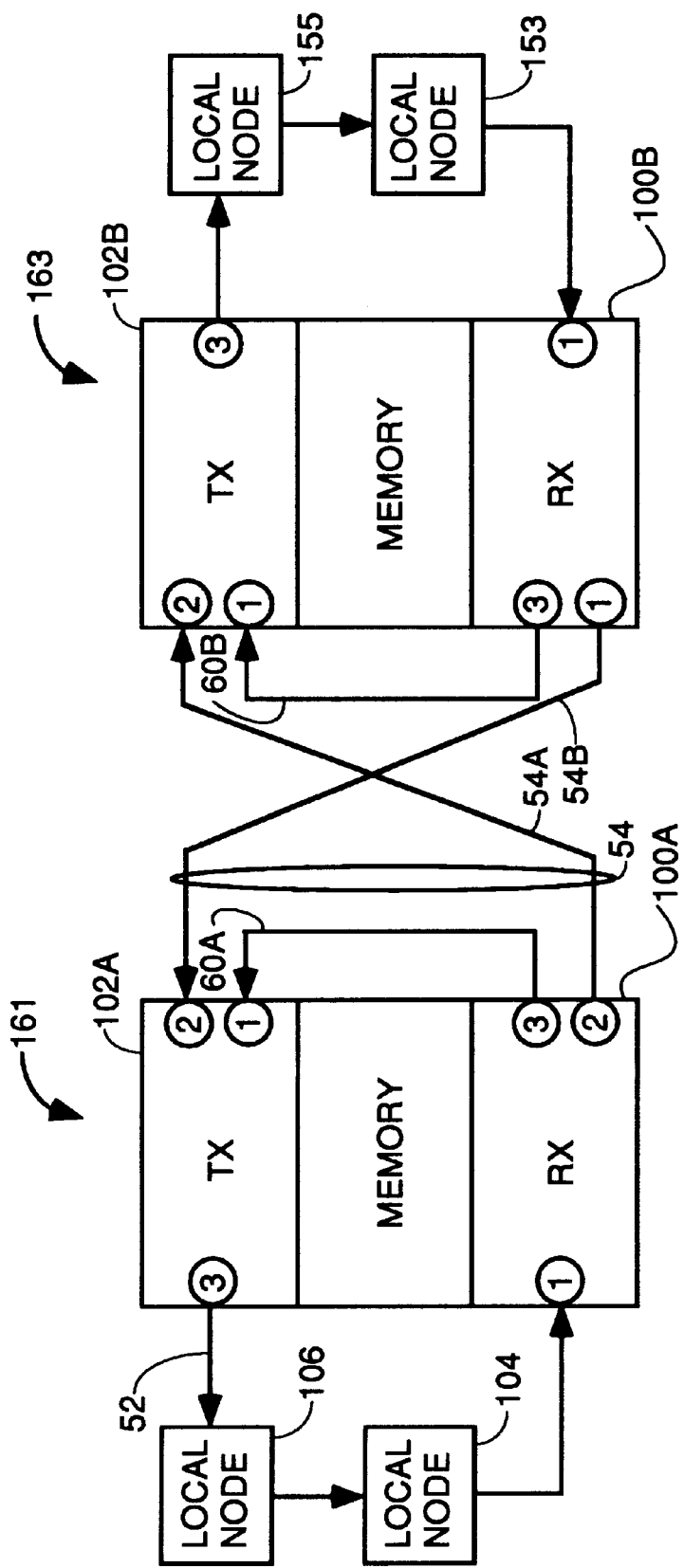

FIG. 14 is a block diagram of a full bridge using the preferred TX and RX port structures of FIGS. 12 and 13.

DETAILED DESCRIPTION OF THE PREFERRED AND ALTERNATIVE EMBODIMENTS

Half Bridge Operation

Referring to FIG. 7, there is shown the structure of a half bridge according to one alternative embodiment of the invention wherein the TX port sets data in the memory during the learning process. FIG. 7 shows how a half bridge can be used to divide a Fibre Channel Arbitrated Loop into two loop segments—a local loop segment 52 and a remote loop segment 54, although half bridges are never used alone to do this and are always coupled to another half bridge. The remote loop segment is comprised of two segments: a TX or transmit segment coupling the RX port of the left half bridge to the TX port of the right half bridge; and an RX or receive segment coupling the TX port of the left half bridge to the RX port of the right half bridge. For purposes of illustrating generally how a half bridge according to the teachings of the invention, FIG. 7 does not show the other half bridge, but represents it by remote loop segment 54. The half bridge, when used in conjunction with another half bridge to form a full bridge, prevents any local loop traffic from being transmitted into the remote loop segment across the full bridge as the half bridges learn the addresses of the nodes on the local loop segment.

The half bridge has a TX port 56 having internal terminals 1, 2 and 3 which are coupled to a state machine (not shown) which implements part of the switching rules of the half bridge. Likewise, the half bridge has a RX port 58 which also has terminals 1, 2 and 3 which are also coupled to a state machine (not shown) which implements the remaining switching rules of the half bridge. The details of the internal construction of the TX and RX ports is not critical to the invention. For example, the structure described below for the preferred embodiment can be used with suitable modification of the control signals that flow between the TX and RX ports. Alternatively, other constructions for the TX and RX ports may also be used such as control by a programmable machine of off-the-shelf FC-AL chipsets to implement the learning and switching rules described herein. The TX and RX ports of FIG. 7 work generally the same as the TX and RX ports 100 and 102 of FIGS. 11 and 12 and in terms of switching rules, learning, handling ARB fill words and RRDY primitives, and resolving concurrent OPN situations. The main difference between the embodiment of FIG. 7 and the preferred embodiment of FIG. 10 is in how the TX and RX ports control and use memory 78. Accordingly, much of the discussion of the specifics of these common operations is deferred until the discussion of FIGS. 11 and 12. The description of the general operation of the half bridge of FIG. 7 will be useful to understand the basic principles of FC-AL bridging before the detailed discussion of implementation of the TX and RX ports of FIGS. 11 and 12 swamp the reader in detail.

Terminal 3 of the TX port 56 is coupled to the outbound segment of local loop segment 52 of the loop and terminal 1 is coupled to the inbound segment of the remote loop segment 54 of the FC-AL. Terminal 1 of the TX port is coupled to a local return segment line 60 which is also coupled to terminal 3 of the RX port 58. The local return segment line 60 is used to route primitives and data which originated from a node on the local segment 52 which are directed to another node on the local segment from the RX port directly back to the TX port so that they need not propagate around the remote segment 54. Also, the RX port 513 contains a latch (not shown but shown in FIG. 10 as latch 200) which is coupled so as to be able to store the source and destination addresses of OPN primitives received at a Local RX Port, i.e., pin 1 of RX port 58 coupled to the inbound portion of the local loop segment 52.

Likewise, the TX port 56 includes a latch 202 (not shown but shown in FIG. 10 as latch 202) which is coupled so as to be able to store OPN primitives received at the Remote RX Port, i.e., pin 2 of the TX port 56 coupled to the inbound portion of the remote loop segment 54. The operation of these latches to support resolution of various concurrent OPN scenarios will be explained further below.

The half bridge 50 is a learning bridge in that it monitors traffic on the loop segments to which it is coupled and uses the destination addresses of OPN primitives in conjunction with the ensuing RRDY and CLS primitives and the terminal on which they arrive to draw conclusions regarding whether a node having a particular address is on the local segment or the remote segment. How this is done will be explained in more detail below, but for completeness here, the half bridge keeps a forwarding table in memory 78 which is consulted by the half bridge when each new OPN primitive arrives. The half bridge uses the destination address of the OPN primitive as an index into a forwarding table stored in a memory 78 to obtain data indicating whether the node having the destination address in the OPN primitive is on the local segment 52 or the remote segment 54.

The half bridge can only short circuit data frames and primitives through the local segment return 60 for the local segment 52 and not for the remote segment 54. Data frames and primitives propagating on the remote segment 54 arrive at TX port 56 and propagate around the local segment and through the RX port 58 as if the half bridge was not really there. However, primitives and commands that are propagating on the remote segment 54 cannot be short circuited by the half bridge and must propagate around the local segment 52 even if the destination node is on the remote segment.

The reason for existence of the half bridge is that it makes local loop segmentation and acceleration possible and is particularly useful in situations where there are two separate concentrations of nodes, each concentration separated from the other by some appreciable distance. In such a situation, symbolized by FIG. 9, the first concentration of nodes are coupled by a segment 1 FC-AL designated 62 which are coupled to a first half bridge 66. The second concentration of nodes are coupled by a segment 2 FC-AL 64 which is also coupled to a second half bridge 68. This situation requires the use of a long fiber optic link represented by fibers 70 and 72. Fiber 70 couples the RX port of half bridge 66 to the TX port of half bridge 68. Fiber 72 couples the RX port of half bridge 68 to the TX port of half bridge 66. The two half bridges in this configuration cooperate to implement a full bridge which learns the locations of each node on the first and second segment FC-ALs by watching the traffic on the loop. As the half bridge 66 becomes smarter, more traffic which is between nodes on the first segment 62 gets short circuited in the half bridge 66 through that bridge's local return segment. This prevents purely local traffic on loop segment 62 from having to incur the propagation delays inherent in propagating across the fiber optic links 70 and 72 and the latency of each node on the second segment 64 in order to get back to the destination node on the first segment. Likewise, as the half bridge 68 becomes smarter , more traffic which is between nodes on the second segment 64 gets short circuited in the half bridge 68 through that bridge's local return segment thereby accelerating purely local operations on the second segment 64 like half bridge 66 accelerates purely local operations on the first segment 62.

The way the half bridge of FIG. 7 functions to carry out its learning process and perform switching to accelerate transactions where possible is as follows. Memory 78 stores a forwarding table. The forwarding table is a 1024×1 memory which has 1 memory location for each of the 1024 different possible destination addresses that could be generated using a 10 bit AL_PD destination address in an OPN primitive. The reader will note an apparent discrepancy in that the Fibre Channel Arbitrated Loop protocol only permits 126 different destination addresses with destination address numbers 0, F0 (hex), F7 (hex) and F8 (hex) reserved whereas 1024 different destination addresses can be generated using 10 bits. The 126 different possible destination addresses which are actually useable represent 128 addresses possible with a 7 bit address after reserved addresses F0 and 0 are removed. The reserved addresses F7 and F8 are used as a preemption tie breaking method in the event of duplicate half-duplex OPNs. Fibre Channel Arbitrated Loops use 8b/10b encoding and decoding.

In operation, there are several different possibilities for the states entered by the TX and RX Port State Machines and the switching and other processing that will be carried out thereby. The switching and other processing which is actually carried out by the state machines in any situation depends upon the relative locations of the source node and destination node on the local and remote loop segments.

The state transitions, switching rules and other processing carried out by the transmit and RX ports 56 and 58 in FIG. 7 for situations other than handling of conflicting OPNs are as follows. Switching rules for handling conflicting OPNs are as given above in the summary of the invention section. The details of the circuitry and/or programming to implement these rules to handle conflicting OPNs and do the switching described herein are not critical to the invention.

The TX port and RX port each initialize such that the TX port makes a 2-3 connection between terminals 2 and 3 therein and the RX port makes a 1-2 connection such that the remote loop segment 54 and the local loop segment 52 are coupled together as one big loop in coordination with the initialization condition that every destination node is assumed to be on the remote loop segment. Memory 78 is cleared to all 0s using the Reset All signal line 500 (1=local, 0=remote). The 2-3 connection terminology will be used herein as a shorthand expression meaning making a connection between terminals 2 and 3 and likewise for any other terminal pair. Suppose now the TX port 56 receives an OPN primitive on terminal 2. The TX port of the half bridge latches the AL-PD (destination address) contained in the OPN primitive in an internal latch (not shown but like latch 202 in FIG. 10), places this destination address on address bus 108 and forwards the OPN primitive out onto the local loop segment 52. The TX port 56 then arms the RX port 58 by activating the Arm signal on line 65. This sets the RX port to a certain state that will cause certain processing to occur if a CLS or RRDY primitive arrives at terminal 1 of the RX port from the local loop segment 52. Arming of the RX port is symbolized in FIG. 7 by activating a signal on line 65 in FIG. 7, although, in the preferred embodiment, the state machines within the TX port 56 and the RX port 58 are the same state machine so all the control signals between the transmit and RX ports shown in FIG. 7 would not be necessary as the data conveyed by these control signals would be known by the state machine by virtue of the state it is in and the transitions between states. In alternative embodiments, the TX Port State Machine can be a separate state machine from the RX Port State Machine. Such embodiments typically use the control signals shown in either FIG. 7 or FIG. 10 flowing between the transmit and RX ports to keep the two different state machines apprised of the conditions encountered by the transmit and RX ports.

If the TX port 56 receives an OPN primitive on terminal 1 from the local segment return 60, it automatically makes a 1-3 connection to forward the OPN primitive out on the local loop segment 52 in case the destination node is there.

If the RX port 58 receives an OPN primitive on terminal 1 from the local loop segment 52, it decides what to do by first deciding whether it has been previously armed. If the RX port 58 has been previously armed, it knows the OPN came from the remote loop segment and its destination node is not on the local loop segment 52 because if it had been local, the destination node would have converted the OPN to and RRDY or CLS for transmission to terminal 1 of the RX port. Thus, the RX port knows that the OPN must be forwarded back to the remote loop segment, so the RX port makes a 1-2 connection to forward the OPN primitive out on the remote loop segment 54. The RX port then writes a logic 0 into the forwarding table address currently latched on the address bus 108 indicating that this particular destination is not on its local segment.

If the RX port 58 in FIG. 7 was not previously armed when the OPN primitive arrives on terminal 1, it knows the OPN was generated by one of its local nodes, but it does not know whether the location of the destination node has been previously stored in the forwarding table. In this situation, the RX port latches the destination address of the OPN primitive and places the destination address on the address bus 108. The RX port then reads the memory location mapped to that destination address by activating the Read signal on line 67. Whatever data is stored at that memory location is then output by memory 78 on data bus 112 and causes the RX Port State Machine to enter one of two possible states. If the data returned by the memory is a logic 1, it means that the destination node is local. In this event, the RX port makes a 1-3 connection to transmit the OPN primitive out on the local segment return 60. The RX port also then activates a Local signal on line 71 thereby, informing the TX Port State Machine to make a 1-3 connection to keep the traffic local and bypass the delays imposed by the nodes on the remote loop segment. If the data returned from the forwarding table was a logic 0, the destination node is not local, so the RX port 58 makes a 1-2 connection to forward the OPN primitive out on the remote loop segment 54. The RX port then deactivates the Local signal on line 71 thereby causing the TX port 56 to resume the 2-3 connection of its initialization state. If the RX port 58 does not receive an OPN primitive on terminal 1 but observes either a CLS or RRDY primitive arriving from the local segment on terminal 1, it knows that the destination node is on the local loop segment 52. Accordingly, the RX port activates the Write One signal on line 73 thereby causing the TX port to activate the Set signal on line 75 so as to set to a logic 1 the memory location mapped to the destination address of the OPN primitive previously received by the TX port from the remote loop segment. Next, the RX port determines whether it has been previously armed. If armed, the RX port knows that an OPN primitive previously received by the TX port from the remote loop segment has been forwarded thereby out onto the local loop segment 52. Therefore, the RX port also knows that the OPN initiator is not local, so it makes a 1-2 connection to forward the RRDY or CLS) primitives received at terminal 1 to the source node on the remote loop segment. The RX port 58 then also deactivates the Local signal on line 71 to cause the TX port 56 to make or maintain a 2-3 connection. This connection by the TX port 56 permits any data frames arriving on terminal 2 from the source node to propagate out to the local destination node on the local loop segment 52 so as to allow the data transfer to be completed. In embodiments where the TX port and RX Port State Machines are combined into one machine, the single state machine will only have one state which is assumed in this source remote, destination local situation and will automatically assume the 1-2 connection for the RX port and the 23 connection for the TX port.

If the RX port 58 had not been previously armed when it received either an RRDY or CLS primitive at terminal 1, it means both the source node and the destination node are on the local loop segment but the destination node is closer to the RX port than the source node such that the OPN primitive issued by the source node arrived at the destination node before it arrived at the RX port 58. The destination node then replied with either an RRDY or CLS primitive which the RX port sees in an unarmed state. In this situation, RX port 58 makes a 1-3 connection and activates the Local signal on line 71 thereby causing the TX port to make a 1-3 connection. In embodiments where the TX port and RX Port State Machines are combined into one machine, the single state machine will only have one state which is assumed in the source local, destination local situation and will automatically assume the 1-3 connection for the RX port and the 1-3 connection for the TX port. Special rules for handling the fatal embrace case of simultaneous or near simultaneous OPNs arriving at a half bridge from both the remote and local loop segments will be described in more detail below in the section heading SIMULTANEOUS OPNs.

Preferred Half Bridge, TX Port and RX Port Structures

Referring to FIG. 10, there is shown a block diagram of the preferred embodiment for a half bridge. In the embodiment of FIG. 10, the RX port 100 does all the setting and resetting of the memory. This differs from the embodiment of FIG. 7 where the TX port sets the forwarding table memory locations to logic 1 and the RX port resets them to logic 0 on system initialization or the reception of a LIP initialization primitive. As is the case for the embodiment of FIG. 7, the LIP primitive will also cause the RX port 100 and TX port 102 to assume their default connections, 1-2 and 2-3, respectively. In the embodiment of FIG. 10, elements having like reference numerals to elements in FIG. 7 are the same and serve the same purpose in the combination.

As in the case of FIG. 7, the preferred half bridge is comprised of a TX port 102, and an RX port 100 coupled by a local segment return 60 and coupled to a memory 78 which stores location data for each FC-AL node address as the location for the node is learned to be local or remote. The half bridge of FIG. 10 includes a comparator 402 which functions to compare source and destination addresses of OPNs to resolve concurrent OPN situations. All of these circuits are coupled together by a plurality of different control signals, the function and activation conditions of each which will become clear during the course of the discussion of the flow charts which describe the switching and learning operations carried out by the TX port and RX port.

FIG. 11 is a block diagram of the preferred internal structure of the half bridge TX port 102. The TX port comprises: a state machine 602 (which can be a programmed microprocessor) which functions to provide the logic which implements the switching and concurrent OPN resolution rules, count RRDYs and controls the switch 608 and insertion/substitution/deletion FIFO circuit 610 to do the operations detailed in the flow charts; an AL_PA latch 202 which functions to store the source and destination addresses of OPNs and to automatically substitute hex F7 or hex F8 into the source address field of any half-duplex OPNs; a remote decode circuit 604 which functions to recognize the primitives that arrive at pin 2 from the remote half bridge and advise the state machine 602; a local decode circuit 606 which functions to recognize primitives that arrive at pin 1 via the local bypass and advise the state machine 602; a switch 608 which controls routing of primitives and data arriving at either pin 2 from the remote half bridge or pin 1 via the local bypass onto the local loop segment 52 connected to pin 3; and insertion/substitution/deletion FIFO circuit 610 which functions to block OPNs and trailing RRDYS until concurrent OPN situations can be resolved, regenerate and forward winning OPNs, regenerate and forward RRDYs that trailed OPNs, generate and transmit preemptive CLSs, generate fill words such as ARB(0) to arbitrate for control of the local loop and substitute ARB(0) for any incoming fill words during the arbitration process or forward them unchanged when the TX port is not arbitrating, and enter a transparent mode where incoming data frames and primitives are passed therethrough unaltered.

FIG. 12 is a block diagram of the preferred structure for an RX port 100. The RX port is comprised of a state machine 612 (which can be a programmed microprocessor) which functions to control memory 78 and a switch 614 and an insertion/substitution FIFO circuit 616 as well as receive and send various control signals to implement the switching, learning and concurrent OPN resolution rules detailed below; an AL_PA latch 200 which latches the source and destination addresses of incoming local OPNs from local loop segment 52 and supplies the AL_PA address via bus 201 to the data input of an Insertion/Substitution/Deletion FIFO circuit when an OPN is generated; a decoder circuit 620 which functions to recognize various primitives arriving on the local loop segment 52 and advise the state machine as well as recognizing when a half-duplex OPN arrives thereby causing the state machine to cause conversion thereof in latch 200 to a pseudo-full-duplex OPN; an insertion/substitution FIFO circuit 616 which serves to block OPNs and trailing RRDYs until possible preemption situations can be resolved, generate and transmit OPNs, preemptive CLSs and RRDYs out to the remote half bridge via pin 2 under control of the state machine 612 and enter a transparent mode where incoming data frames and primitives are passed therethrough unaltered; and switch 614 which serves to route incoming primitives and data at pin 1 and primitives generated by the insertion and substitution FIFO circuit 616 out on either pin 2 to the remote half bridge or pin 3 to the local bypass.

Before discussing the detailed operation of the preferred embodiment for the half bridge, a short discussion of full bridge operation is in order so as to set the context for the discussion of the half bridge process flow charts.

Full Bridge Operation

Referring to FIG. 8, there is shown a full bridge formed using two half bridges according to the embodiment of FIG. 7. FIG. 14 shows a full bridge formed using two half bridges according to the embodiment of FIG. 10. This full bridge is comprised of two half bridges which have the structure of the half bridge of FIG. 10 and function the way described in the flow charts of FIGS. 13A through 13G. The full bridge of FIG. 8 is two half bridges connected together to filter traffic from two loop segments 52A and 52B and allow two concurrent loop tenancies, i.e., two local transactions may be occurring simultaneously. The two half bridges 149 and 151 shown in the embodiment of FIG. 8 have identical structures and work identically to the above description of the half bridge embodiment of FIG. 7.

In the bridges of either FIG. 8 or FIG. 14, traffic arriving on terminal 2 of the TX port of either half bridge is minimized. In other words, after the learning process, only OPNs destined to nodes not on a local segment connected to one of the half bridges get forwarded to the other half bridge. For example, in the embodiment of FIG. 14, if the source node is node 153 and the destination node is node 155, all data frames traveling between these two nodes are shunted across local return segment 60B and never reaches left half bridge 161. Likewise, if the source node is node 104 and the destination node is node 106, all data frames traveling between these nodes are shunted across local return segment 60A and never reach right half bridge 163. An advantage of this structure is that concurrent conversations can simultaneously occur between nodes 153 and 155 as one conversation and nodes 106 and 104 as another concurrent conversation. However, if the source node is 153 and the destination node is 106, the OPN primitive from node 153 will be forwarded on line 54B from terminal 2 of RX port 100B to terminal 2 of TX port 102A in accordance with the switching rules defined above. After TX port 102A wins arbitration with ARB(0), the OPN propagates to destination node 106 which responds with an RRDY or CLS primitive. The response primitive arrives at terminal 1 of RX port 100A and is forwarded via a 1-2 connection and line 54A from terminal 2 of RX port 100A to terminal 2 of TX port 102B where it propagates to the source node 153.

Similarly, as shown in FIG. 9, two half-bridges can be used to connect two groups of nodes that are physically separated by long distances. The two half bridges 66 and 68 can be of the design of FIG. 7 or the design of FIG. 10 or any other design within the teachings of the invention. The two half bridges are connected together by long fiber-optic segments 70 and 72. Since the speed of light through a fiber optic cable is roughly 5 ns/meter, a 200 meter full-duplex link line fibers 70 and 72 between two loop segments results in 5–9×(2×200)=2 microseconds of additional latency over a short link, which is the equivalent of 9 nodes on the link (40 bits per FC word, 6 FC words per node, 941 picoseconds per bit at 1.0625 Gb/sec). On a conventional loop, all transfers would incur this additional 9 node equivalent delay. With additional 200 m fiber optic links, additional delay is incurred. For example, with two 200 m links the additional delay would be equivalent to 18 nodes, with three links 27 nodes, etc. On a bridged segment such as is shown in FIG. 9, only the traffic flowing across the bridge would incur these delays.

The operation of the half bridge embodiment shown in FIG. 10 and the TX and RX ports shown in FIGS. 12 and 13 will be described by reference to the flow charts of FIG. 13 comprised of FIGS. 13A through 13G.

Concurrent half-duplex OPNs present a difficult concurrent OPN resolution problem since the normal preemption rules described below do not work since a half-duplex OPN only has two destination addresses and no source address so an ambiguity is created as to whether they are the same OPN (same source and destination address) or not. This is resolved as follows. First, a rule is adopted that no half duplex OPN can be forwarded from one half bridge to another. Instead, any half duplex OPN received at the RX port is recognized and automatically converted to a pseudo-full-duplex OPN when it is stored in latch 200 as follows. In a half-duplex OPN where no source address is provided, the half bridge RX port decode circuit 620 will recognize the arrival of a half duplex OPN at pin 1 and activate the Half Duplex control signal to alert state machine 612 of the event. The state machine 612 then asserts RX Convert to cause latch circuit 200 to insert either hex F7 or hex F8 for the source address in the AL_PA latch 200 in place of the destination address that was originally there. The choice between F7 and F8 depends upon how the bridge was configured upon installation. This permits easy preemption resolution using the full duplex rules described herein in the event of concurrent OPNs with the same AL_PD. The OPNs are then compared by the preemption process described below and one or the other of them is preempted. One of the full or pseudo-full-duplex OPNs will survive and will be forwarded by the RX port of the half bridge which received it to the other half bridge or over the local bypass path. When a winning OPN is forwarded by the RX port to the remote half bridge, if it was originally a half-duplex OPN, it is not converted back to its original half duplex form. When a winning OPN is forwarded by the RX port over the local bypass, it is converted back to its original half-duplex form by assertion of the RX Convert Back signal by state machine 612. This causes the Insertion/Substitution circuit 616 to substitute the AL_PD of the OPN for its F7 or F8 in the source address field. When a winning OPN is forwarded onto the local loop by the TX port, if it was originally a half-duplex OPN, it is converted back to its original half-duplex form by assertion of a Convert Back signal by TX Port State Machine 602. This causes the Insertion/Substitution/Deletion FIFO circuit 610 to substitute the AL_PD of an OPN for the F7 or F8 source address thereby converting it back to its original form.

Switching Rules and States for the Transmit and RX Ports of the Preferred Embodiment of the Half Bridge of FIG. 10

There is given below the port state machine state transition and switching rules implemented by the state machines in the RX and TX ports, 100 and 102, respectively, in the embodiment of FIG. 10. The rules are given in the form of flow charts. The section of this specification entitled RULES FOR HANDLING OF ARB PRIMITIVES BY BOTH HALF BRIDGE: AND FULL BRIDGE contains arbitration primitive handling rules for both the RX ports and the TX ports of the embodiments of FIGS. 7 and 11, and is incorporated by reference into the following port state transition and switching rules.

Rules for Handling of ARB Primitives By Both Half Bridge and Full Bridge

ARB primitives are output by any node or TX port or RX port desiring to obtain control of a loop segment prior to transmission. The ARB primitive includes a priority designator therein which indicates the priority of the node or TX port or RX port that issued it. Each node or TX port or RX port which receives an ARB primitive fill word examines the priority thereof. If that node or TX port or RX port desires to transmit, the ARB priority designator of the incoming ARB is changed to the priority designator of the node or TX port or RX port which desired to transmit if the priority thereof is higher than the priority of the incoming ARB primitive and the ARB is forwarded. If the priority of the incoming ARB is higher than the priority of the node, TX port or RX port which desires to transmit, the incoming ARB is forwarded without change. If a TX port, RX port or node sees its own ARB comes back to it, it knows it has won the arbitration and has permission to transmit. After a node or a TX port or an RX port sees its own ARB come back to it, it thereafter "swallows" all incoming ARBs, regardless of their priority, by substituting the highest priority address, F0, for the priority designator of all incoming ARBs until the node, TX port or RX port has relinquished the loop. At that time, the ARB handling rules defined above for the time before the node saw its own ARB come back are resumed.

In the case where the TX port 102 receives a remote OPN on pin 2, it begins to arbitrate for control of the local loop segment. It can happen that a node on the local loop segment decides that it needs to transmit. That local node will also begin to arbitrate for the local loop segment. If the local node's ARB comes back to it before the remote OPN arrives, the TX port's ARBs will all be swallowed, and the TX port will block the remote OPN from transmission onto the local loop and latch the source and destination addresses thereof. Meanwhile, the local node will generate an OPN which arrives at the Local RX Port, pin 1 of the RX port 100. This will trigger the preemption rules above to decide which OPN to preempt. If the local node begins to arbitrate for the local loop segment after the TX port has arbitrated for and won control of the local loop, no preemption situation arises. This is because the local node's ARBs will be swallowed by the TX port so it will never gain control of the local loop segment and transmit a local OPN to the RX port that would cause a concurrent OPN situation to arise.

On a half bridge, the ARBs from the local nodes arriving at the Local RX Port, all remain local, i.e., are transmitted out pin 3 of the RX port to pin 1 of the TX port. The TX port then just forwards the ARB primitive out on pin 3, the Local TX Port. On a full bridge, the same thing happens. Specifically, the ARB primitives arriving at the Local RX Port of the RX port are not forwarded to the other half bridge but are sent only to the TX port of the half bridge which received the ARB primitive. Consequently, on a full bridge, no ARBs flow between the local and remote loop seqments coupled to the two half bridges. Instead, ARBs arrive at the Local RX Port and are forwarded to terminal 1 of the local TX port without ever being transmitted on terminal 2 of the local RX port (see FIG. 8) to the remote loop segment.

Half bridges cannot stand alone. They must be connected to another half bridge either locally to make a full bridge or remotely as in the configuration of FIG. 9.

Referring to FIG. 13, which is comprised of multiple pages of flow charts labelled FIG. 13A, 13B etc., there is shown a flow chart graphically illustrating the half-to-pseudo-full-duplex conversion processing, learning, preemption and switching rules which are followed concurrently by the TX port 102 and the RX port 100 in each half bridge of a full bridge. The reader should read the flowcharts of FIG. 13A et seq. in conjunction with study of FIGS. 11, 12 and 13 for a full understanding of the functions and relationships between the circuit elements and control signal activations. Below there are reiterated 6 possible scenarios some of which require preemption and some of which do not. Processing of the various cases on the flowcharts of FIGS. 13A et seq. is indicated by labels at appropriate branches of the flowchart.

Case 1: a local OPN at the left half bridge is forwarded to the right half bridge followed by receipt at the left half bridge of a different remote OPN. In this case, conflicting OPNs make preemption of one of them necessary. The preemption decision is based upon a comparison of the addresses of the conflicting OPNs. Half duplex OPNs are converted to pseudo-full duplex OPNs before the preemption address comparison is done. If the address comparison indicates that the local OPN of the left half bridge is higher priority than the remote OPN received at the left half bridge, the remote OPN is discarded by the left bridge and the right half bridge sends out a preemptive CLS to close the source node which generated the lower priority remote OPN. If the remote OPN at the left half bridge is higher priority, the left half bridge transmits a preemptive CLS on it local loop to close the node which generated the lower priority local OPN. The left half bridge then arbitrates for control of the left half bridge local loop using ARB(0). Any ARB fill words coming in from the right half bridge are converted to ARB(0) by the left half bridge during this process. Arbitration is won by the left half bridge when it sees ARB(0) return to it. When arbitration is won by the left half bridge, the remote OPN is transmitted by the left half bridge out onto the left half bridge local loop. The right half bridge, which independently does its own comparison, concludes that the lower priority OPN forwarded to it by the left half bridge must be discarded.

Case 2: a local OPN for the left half bridge has been forwarded across the local bypass to the left half bridge TX port when, later, a different remote OPN arrives at the TX port of the left half bridge. This situation is resolved by an automatic preemption of the remote OPN by the left half bridge sending out a preemptive CLS to the right half bridge since the local loop is busy.

Case 3: a remote OPN is received at the left half bridge simultaneously with receipt at the left half bridge of a local OPN. This situation is resolved by examining the addresses of the two OPNs and sending a preemptive CLS to close the source node of the lower priority OPN, the preemptive CLS being transmitted by the half bridge coupled to the local loop coupled to the source node of the lower priority OPN. Following the preemption, if the local OPN is higher priority, the memory is accessed to determine whether the destination address of the winning local OPN is local or remote, and the local OPN is forwarded via the appropriate path to its destination.

Case 4: a remote OPN is received by the left half bridge followed by receipt of a different local OPN. When the remote OPN is received, the TX port starts to arbitrate for the local loop. If a local OPN is received before arbitration is won by the TX port, the remote OPN is too late because the local loop is considered to be busy as soon as arbitration is won by the source node which generated the local OPN. Therefore, the remote OPN is preempted by transmission of a preemptive CLS from the left half bridge to the right half bridge, and the left half bridge then discards the remote OPN.

Case 5 (no preemption necessary): a local OPN is received at the left half bridge and is forwarded to the right half bridge, whereupon it is returned to the left half bridge. When a local OPN is returned from the right half bridge, the left half bridge must identify the fact that the remote OPN just received is the same OPN as the local OPN previously forwarded to the right half bridge. This is done by comparing addresses. When case 5 arises, the returning remote OPN is forwarded transparently onto the local loop without arbitration and all subsequent traffic is forwarded by the left half bridge transparently onto the local loop until the loop tenancy is done, and a new local or remote OPN is detected.

Case 6 (no preemption necessary): a remote OPN is received, forwarded locally and returns. Upon detection of the identical OPN, the arbitration process started by the left half bridge TX port is stopped, and the left half bridge goes into a transparent mode where all fill words, data and primitives coming from the right half bridge are passed transparently through the local loop and forwarded back to the right half bridge where they either reach a destination node or are forwarded to the source node. If the destination node is present on the local loop of the right half bridge, it responds with an RRDY or CLS which is forwarded to the source node on the same local loop. If an RRDY was sent, the source node responds with a frame of data which is then forwarded to the left half bridge and transparently passed therethrough, through the left half bridge local loop and back to the right half bridge where it is transparently forwarded to the destination node. This process is continued until the loop tenancy is completed. The right half bridge learns the location of the destination node, so the next time a right half bridge trys to open the same destination node, the local bypass path will be used and the left half bridge will be omitted from the loop tenancy.

Processing starts in FIG. 13A with block 101 wherein the system is initialized by carrying out the following operations to initialize. When the loop initializes (any Loop Initialization Primitive or LIP detected by the TX or RX ports of the half bridge), the half bridges connects both local loop segments together as one large loop. Accordingly, TX port 102 makes 2-3 connection, and RX port 100 makes 1-2 connection. This is done by TX Port State Machine 602 setting the state of a Switch Control signal on line 620 so as to set switch 608 to connect pins 2 and 3, and similarly for the Switch Control signal on line 622 generated by RX Port State Machine 612. Also, the memory 78 is cleared to all logic 0s indicating there are no local ports yet and all traffic is to flow through both half bridges. This is done by the RX Port State Machine 612 asserting the Clear All signal on line 120.

After initialization, test 103 is performed to determine if the TX port has received a remote OPN primitive at the Remote RX Port, terminal 2. If not, processing proceeds to step 818 to determine if the RX port has received a local OPN on pin 1. If not processing proceeds back to Start in block 99.

If the RX port has received a local OPN, processing proceeds to step 822 wherein this Decode circuit 620 in FIG. 12 activates an OPN signal on line 654 to inform the RX Port State Machine that an OPN has arrived. The Decode circuit 620 also activates a TX Arm signal on line 644 to tell the TX port that it has received an OPN. The Decode circuit 620 also activates a Latch [0:1] signal on line 656 causing the AL_PA addresses of the local OPN to be stored in latch 200. In response to the activation of the OPN signal on line 654, the RX Port State Machine activates a Del OPN signal on line 727 which causes the Insertion/Substitution/Deletion FIFO 616 to delete the first 20 bits of the header and OPN from the FIFO pipeline thereby blocking the local OPN from being forwarded to the remote half bridge or on the local segment return 60 until such time as the state machine allows it to be forwarded. If any following RRDYs were received, the Decode Circuit 620 in FIG. 12 also activates the RRDY signal on line 730 once for each received RRDY. This causes an RRDY counter in RX Port State Machine 612 to be incremented once for each received RRDY. It also cause the state machine 612 to activate a DEL RRDY signal on line 858 in FIG. 12 once for each received RRDY. This causes the FIFO circuit 616 to delete the RRDYs from the FIFO pipeline to block their transmission. Both the OPN and RRDYs can be reconstructed later for forwarding by the state machine by activation of the Insert OPN and Insert RRDY signals on lines 774 and 786, respectively. These processes of storing the AL_PA and blocking the OPN and any following RRDYs from being forwarded caused by activation of the various signals in step 822 are symbolized by step 824. The RX Port State Machine also activates an Enable Compare signal on line 638 to compare the AL_PA address of the local OPN with the the Default AL_PA Address stored in latch 202 of the TX port (the default AL_PA will be stored in both latches 200 and 202 whenever a CLR is received by either RX or TX port).

Step 822 also represents the process of detecting if the incoming local OPN was half-duplex and converting it to pseudo-full-duplex if it was. This is process is carried out by the RX port if the Decode circuit 620 activates the Half Duplex signal on line 658 when the OPN signal on line 654 is activated. This causes the RX Port State Machine to activate an RX Convert signal on line 660 in FIG. 12 to cause the AL_PA latch circuitry 200 to replace the source address with either hex F7 of hex F8 depending upon the configuration data for the half bridge.

If a remote OPN arrives later after the local OPN, the address comparison and preemption processing is described below in the description of the processing for preemption cases 1, 2 and 3. The purpose of steps 818 and 822 et seq. is to simply describe the processing which follows when a local OPN arrives alone at the RX port.

Continuing with the discussion of step 822 in FIG. 13A, if the local OPN was half-duplex, the Decode circuit 620 also activates a Half Duplex signal on line 658 in FIG. 12.

This causes the RX Port State Machine to activate an RX Convert signal on line 660 to cause the source address stored in latch circuit 200 to be converted to either hex F7 or hex F8 depending upon the configuration data of the half bridge.

Further, if the local OPN was trailed with any RRDYs, the Decode circuit 620 activates an RRDY signal for each one. Each time RRDY is activated, an RRDY counter in the RX Port State Machine is incremented.

Finally, after step 824, processing proceeds along path 820 to step 816 in FIG. 18E.

Returning to the consideration of step 103 on FIG. 13A, the arrival of a remote OPN is detected by the Remote Decode circuit 604 which is coupled by line 630 to pin 2 in FIG. 11. As soon as the TX port has received a remote OPN, the Remote Decode circuit 604 activates the OPN control signal on line 632. This tells the state machine that a remote OPN has arrived. When this happens, step 111 is performed to arm the RX port to aid in the learning process, as will be explained below. The TX Port State Machine arms the RX port by activating the RX Arm signal on line 634. Step 111 also represents the process whereby the Remote Decode circuit 604 activates the OPN signal on line 632 which causes the TX Port State Machine to activate the Del OPN signal on line 691 in FIG. 11. This causes the blocking of further transmission of the OPN as symbolized by block 105 by causing the Insertion/Substitution/Deletion FIFO circuit 610 to remove the OPN from the FIFO pipeline. The Remote Decode circuit 604 also activates the Latch [0:1] signal on line 636 which causes the AL_PA latch 202 to latch the AL_PA address of the OPN just received as symbolized by block 105. If the OPN was followed by any RRDYs, the Remote Decode circuit 604 activates the RRDY signal on line 696 for each one. Each such activation causes the TX Port State Machine 602 to increment an RRDY count, and to activate a Del RRDY signal on line 856 for each activation of the RRDY signal on line 696. This removes the RRDYs from the FIFO pipeline to block their transmission. These RRDYs can be later regenerated and transmitted by activation of the Insert RRDY signal on line 686 if the OPN just received wins the AL_PA comparison. This process of blocking the OPN any following RRDYs from transmission through the FIFO is performed by each TX and RX port in both the left half and right half bridges whenever an OPN is received alone or in combination with following RRDYs and should be understood as the process performed whenever blocking of further transmission of OPNs and RRDYs is required by the flow charts of FIG. 13A et seq.

Also, if the received OPN was pseudo-full-duplex, the Pseudo Full Duplex signal on line 710 in FIG. 11 is activated by the Remote Decode circuit 604. This informs the state machine 602 to activate the Convert Back signal on line 712 if the OPN is forwarded onto the local loop. This causes the Insertion/Substitution/Deletion FIFO to substitute a copy the destination address for the hex F7 of F8 source address to convert the pseudo-full-duplex OPN back to half duplex before forwarding out onto the local loop segment.

Activation of Enable Compare on line 638 by Remote Decode circuit 604 causes an address comparison of the AL_PA of the remote OPN from latch 202 with whatever AL_PA address is latched in latch 200 of the RX port. If there is no conflicting OPN, latch 200 will store an AL_PA which will always lose against the AL_PA of the remote OPN. Note that in the steps of the process symbolized by FIG. 13A et seq., any step that requires activation of Enable Compare enables this signal only if it is not already enabled.

After arming the RX port, step 105 is performed to latch the source and destination addresses of the remote OPN. Step 105 is accomplished as a result of the activation by the Remote Decode circuit 604 of the Latch (0:1) control signal on line 636 successively when the destination and source addresses arrive at pin 2. This signal is activated once as the destination address arrives to latch the 10 bit AL_PD destination address in latch 202 and then is activated again as the AL_PS address arrives to latch the 10 bit source address in latch 202. Step 105 also blocks transmission of the remote OPN until its destination can be determined and it is clear there are no conflicting OPNs. This blocking of the remote OPN is accomplished automatically as the Remote Decode circuit 604 in FIG. 11 recognizes the OPN and activates an OPN signal on line 632. As noted above, this causes TX Port State Machine 602 to activate a Del OPN signal on line 691 which causes the Insertion/Substitution/Deletion FIFO circuit 610 to strip off the 20 bits that comprise the header and OPN primitive. The OPN can be regenerated later if it needs to be forwarded onto the local loop by asserting an Insert OPN signal on line 694.

Test 103 essentially can be a continuous sampling of the OPN signal on line 632, or it can simply be a change of state by TX Port State Machine 602 when the OPN signal on line 632 changes states.

If test 103 determines that a remote OPN has been received, it may mean that the source node is somewhere on the remote loop segment 54. However, it may also means that the source node and destination node are both on the local loop segment 52 but the source node is closer to the RX port 100 than the destination node and the location of the destination node is as yet unlearned resulting in the OPN being forwarded by the RX port 100 out onto the remote loop segment 54 whereupon it eventually returns to the Remote RX Port, terminal 2 of the TX port via remote loop segment 167. This is the reason the RX port is armed in step 111. By arming the RX port, the half bridge can learn the location of the destination node of the remote OPN by watching the traffic that results at the local RX port as a result of receipt of the remote OPN. For example, if the source node was node 104 in FIG. 10 and the destination node was node 106, source node 104 could transmit an OPN primitive to terminal 1 of the RX port 100 which would then forward the OPN primitive by making a 1-2 connection if it had not yet learned that node 106 was on its local loop segment 52. This OPN would propagate around the remote loop segment and return to terminal 2 of the TX port. The TX port 102 would react to the arrival of the OPN primitive by storing the OPN addresses in latch 202, and comparing the address fields of the remote OPN latched in latch 202 to the address fields of the latched local OPN stored in latch 200 in the RX Port. This comparison is done by activation of the Enable Compare signal on line 638 in FIG. 10 and transmission of the AL_PA address fields of the OPN latched in RX port via a 20 bit data bus 108 and the AL_PA address field of the OPN latch in the TX port 102 via a 20 bit bus 109 to a comparator 402. If the remote OPN was the same as the local OPN, the comparator 402 would activate the Equal signal on line 640 which would cause both the TX and RX ports to go into transparent mode wherein all primitives and data are passed therethrough without change. Since any local half-duplex OPNs (characterized by the third and fourth address characters being identical) are converted to pseudo full-duplex OPNs in the RX port latch prior to transmission to the other half bridge, if the above situation arose where a local half-duplex OPN was forwarded to the remote half bridge and came back therefrom, the comparison would occur on the pseudo full-duplex OPNs and the Equal signal would be activated causing transparent mode to be entered. The conversion of any local half-duplex OPNs to pseudo full-duplex OPNs is done by setting the AL_PS (source address) field to F7 or F8, depending on whether the half bridge was configured to be the high priority or low priority half bridge at the time of initial configuration of the system. This conversion happens either before the address fields are latched in the internal OPN latches in the TX or RX ports or after the latching process and before any process of shipping the OPN on bus 108 from the RX port to the comparator 402 and before any comparison process. Note that if both the local OPN received by the RX port and the remote OPN received by the TX port of the same half bridge were pseudo-full-duplex, the source address of each of the local OPN and the remote OPN would both have been changed to F7 or F8, depending upon which way the RX port of the half bridge was configured. In the normal case however when a remote OPN arrives which is pseudo full-duplex, the F7 or F8 source address is stripped and the OPN is converted back to half duplex before transmission out on the local loop. If a remote pseudo full-duplex OPN is involved in a preemption comparison, if the winning OPN is the remote pseudo-full-duplex OPN, it is converted back to half-duplex before being forwarded to the local loop segment. If the winning OPN is either a local full duplex OPN or a local pseudo full-duplex OPN, no change is made to the full-duplex or pseudo full-duplex OPN prior to transmission to the remote half bridge.

After latching the source and destination addresses in step 105, processing proceeds via path 642 to test 652 on FIG. 13B. That test checks the TX Arm signal on line 644 in FIG. 10 to determine if it has been recently activated. The TX Arm signal is set active bit the RX port whenever decoder 620 in FIG. 12 detects a local OPN at pin 1. The TX Port State Machine notes this fact and sets an internal flag or enters an internal state that can be checked when step 662 is reached to determine which preemptive processing state is necessary.

When a local OPN has been received at pin 1 in FIG. 12, Decoder 20 activates the OPN signal on line 654 which causes the RX Port State Machine to activate the TX Arm signal for the one clock cycle needed to access memory and then resets TX Arm on the next clock cycle. Activation of OPN on line 654 also causes the RX Port State Machine to activate the Latch [0:1] signal on line 656 which causes the addresses of the local OPN to be stored in latch 200. If the local OPN was half-duplex, Decoder 620 detects this and activates the Half Duplex signal on line 658. This causes the RX Port State Machine to activate the RX Convert signal on line 660 which causes the AL_PA latch circuit 200 to convert the source address of the local OPN to hex F7 or F8 depending upon the RX port's configuration data.

Activation of TX Arm is done so that if a concurrent remote OPN arrives during the time the local OPN is being dealt with or just after it is forwarded, the conflict can be resolved. The TX Arm signal is activated as soon as the local OPN is detected, and remains active for the single clock cycle during which the memory 78 is checked to determine from the local OPN's destination address where to send the local OPN. During the clock cycle when the local OPN was received, its addresses are latched, its destination address is used to access memory, and, if it is half-duplex, its source address is converted to hex F7 or F8 in the address latch 200. The TX Arm signal is kept active true for the one clock cycle during which the memory access occurs, and is automatically reset on the next clock cycle.

If test 652 in FIG. 13B determines that TX Arm is active when the remote OPN arrived, it means a possible conflicting OPN situation has arisen. Cases 1–4 in the preemption rule processing detailed above in the summary of the invention can result depending upon where, if anywhere, the local OPN has been sent. To determine which preemption case processing is necessary, step 662 is performed to determine where the local OPN was sent or if simultaneous local and remote OPNs have been detected. This is done by determining if TX Arm is still active or is false. If TX Arm is false, but has been recently activated, step 662 checks the status of the RX Switch Pos. signal on line 664 in FIG. 10. This signal is set by the RX Port State Machine to a logic state which corresponds with the position of switch 614 when the TX Arm signal is deactivated after the memory access has been completed and the switch moved to the position necessary to forward the local OPN to its destination.

Case 2 arises if step 662 determines that the local OPN has been previously forwarded on the local bypass to the TX port prior to the time the remote OPN arrives. The TX port determines where the local OPN was sent on the local bypass by determining if the TX Arm signal is still true, and, if not, by checking the status of an RX Switch Pos. signal on line 664 to see if switch 614 in FIG. 12 is set to the 1-3 position. When TX Arm is false, it means that the memory access has been completed and the RX Switch Pos. Signal will indicate whether the local OPN was sent on the local bypass or forwarded to the remote half bridge.

When a case 2 preemption situation arises, step 666 is performed to carry out an automatic first-come, first-served preemption. Case 2 involves the local loop being busy at the time the remote OPN arrives. This will be the case when step 662 discovers that the local OPN has been previously forwarded on the local bypass when the remote OPN arrives. Step 666 carries out this automatic preemption by the TX Port State Machine activating the Auto Preemption signal on line 646 in FIG. 10. This causes the RX Port State Machine to set the Switch Control signal on line 622 in FIG. 12 to set the switch 614 to a 1-2 connection and to activate the Insert CLS signal on line 650 in FIG. 12. This causes the Insertion/Substitution FIFO circuit 616 to generate a CLS primitive and send it out to the remote half bridge where it is forwarded to the source node which generated the remote OPN thereby closing it.

If step 662 determines that the local OPN just received has been previously forwarded to the remote half bridge at the time the remote OPN arrived, a case 1 preemption situation has arisen. In this case, step 668 is performed wherein the TX Port State Machine activates Enable Compare signal on line 638 in FIG. 10. This causes the Comparator 402 to compare the AL_PA addresses of the local and remote OPNs latched in latches 200 and 202 and activate either the Preempt Local Source signal on line 670 or the Prempt Remote Source on line 672.

Next, step 674 is performed to determine which of these two result signals from the comparator have been activated. The two half bridges that together comprise the full bridge each simultaneously perform the processes depicted in the flow chart of FIGS. 13A et seq. However, the flow charts have been written from the viewpoint that the process depicted is occurring in the left half bridge as the local half bridge such that the right half bridge may be referred to as the remote half bridge. That being said, path 676 out of step 674 represents the branch taken if the remote OPN at pin 2 of the left half bridge TX port won the address priority comparison. Path 678 represents the branch taken if the left half bridge local OPN won.

Referring to FIG. 13C, the processing along path 678 will be described. When the left half bridge local OPN won and has already been forwarded to the right half bridge (the reader is also referred to FIG. 8 for context), the right half bridge must close the source node on its local loop segment before transmitting the local OPN received from the left half bridge onto its local loop. This is done by step 688 in FIG. 13C. In this step, the right half bridge first blocks the remote OPN received at pin 2 (the forwarded local OPN received from the left half bridge). This blocking is done when the Remote Decode circuit 604 (see FIG. 11) in the right half bridge (identical circuits to circuits in the left half bridge are referred to by the same reference numbers) detects a remote OPN at pin 2 and activates the OPN signal on line 632. This causes the Latch [0:1] signal on line 636 to be activated which causes AL_PA latch to latch the source and destination addresses. Activation of the OPN signal on line 632 also causes the TX Port State Machine to follow the same processing that the left half bridge TX port does when it receives an OPN, said processing being described by the flow chart of FIGS. 13A et seq. In this case, since step 652 performed by the right half bridge would find that TX Arm had been recently activated when the right half bridge local OPN was received and forwarded to the left half bridge, processing would proceed through step 662 to step 668 and following. This processing would result in activation of the Enable Compare signal on line 638 to start an address comparison and causes the state machine to simultaneously activate the Delete OPN signal on line 691 in FIG. 11. Activation of Delete OPN causes the Insertion/Substitution/Deletion FIFO circuit 610 to strip off the 20 bits of the OPN primitive.

The comparison in the right half bridge comparator 402 occurs between the address of the right half bridge local OPN previously transmitted to the left half bridge (which was a remote OPN there and found to be of lower priority) on bus 108 and the address of the remote OPN received from the left half bridge on bus 109. This comparison will yield the same result as it did in the left half bridge, i.e., the right half bridge remote OPN will be indicated as higher priority meaning the local source that generated the remote OPN received by the left half bridge must be closed. The right half bridge comparator 402 will activate the Preempt Local Source signal on line 670. This will cause the right half bridge TX Port State Machine to activate the Insert CLS signal on line 684 to generate and send out a CLS on the local loop segment. This closes the local loop source node which generated the losing remote OPN at the left half bridge.

Next, the right half bridge must forward or unblock the remote OPN and any RRDYs, but before it can do that, it must arbitrate for and win control the local loop segment. Step 690 represents this process. First, the right half bridge TX Port State Machine activates the Start ARB signal on line 700. This causes the FIFO circuit 610 to change any incoming CFW to ARB(0) and send them out onto the local loop segment. The local node which generated the losing OPN will have been closed so it will no longer be swallowing ARBs. When the ARB(0) arrives at each node, it is forwarded as the highest priority ARB by each node. Eventually the ARB(0) arrives at pin 1 of the right half bridge RX port 100 and is recognized by Decode circuit 620 which then activates the ARB(0) control signal on line 702 of FIG. 12 which tells the RX Port State Machine 612 that the TX port has just won arbitration. The RX Port State Machine then activates the ARB Won signal on line 704. This fact is detected by the TX Port State Machine 602 which then activates the Stop ARB signal on line 706 in FIG. 11. This causes the Insertion/Substitution/Deletion FIFO 610C to stop substituting ARB(0) for incoming ARB CFWs. Then the right half bridge TX Port State Machine activates the Insert OPN signal on line 694 which causes the FIFO circuits 610 to generate and transmit an OPN primitive. This is followed by transmission by the Insertion/Substitution/Deletion FIFO of the addresses latched in AL_PA latch 202. These addresses are always available to the FIFO circuit via bus 109 and are automatically transmitted out pin 3 in sequence following generation of an OPN.

If the remote OPN at pin 2 of the right half bridge had been followed by any RRDYs indicating the source node on the local loop of the left half bridge was issuing buffer credit, each RRDY would be detected by Remote Decode circuit 604 and would cause activation of the RRDY signal on line 696. The number of time RRDY was activated is counted by the right half bridge TX Port State Machine in an internal RRDY counter. When the state machine activates the Insert OPN signal on line 694 and sends out the addresses in sequence, it will also activate the Insert RRDY signal on line 686 a number of times equal to the number of RRDYs received and decrement the internal RRDY counter as each RRDY is sent out. This causes FIFO circuit 610 to generate and send a number of RRDY primitives after the OPN transmission equal to the number of RRDYs received from the left half bridge. This transmission of the remote OPN and any RRDYs by the right half bridge is symbolized by step 690 in FIG. 13C.

If the winning remote OPN arriving at pin 2 of the right half bridge TX Port was a pseudo-full-duplex OPN, the Remote Decode circuit 604 in FIG. 11 of the right half bridge detects the F7 or F8 source address and activates the Pseudo Full Duplex control signal on line 710. This causes the right half bridge TX Port State Machine to activate the Convert Back signal on line 712 when it activates the Insert OPN signal on line 694. This causes the Insertion/Substitution/Deletion FIFO circuit 610 of the right half bridge to delete the F7 or F8 source address and copy the destination address into the source address field to convert the pseudo-full-duplex OPN back to its original half duplex state before forwarding it onto the local loop.

Note that the losing local OPN of the right half bridge is automatically discarded by the left half bridge because both half bridges automatically store OPN AL-PA addresses but delete OPN primitives when they arrive and then just regenerate the OPN if it turns out that it needs to be forwarded after winning a priority comparison. The stored addresses of a losing OPN are simply overwritten the next time another OPN arrives.

Finally, as represented by steps 699 and 701, the TX and RX ports of the left and right half bridges go into transparent mode until a CLS is received indicating that the loop tenancy is finished. Transparent mode is explained elsewhere herein, but basically it involves passing primitive, fill words and data frames straight through the TX or RX port unchanged. Transparent mode is triggered automatically by a TX or RX port state machine when an RRDY, data frame or CLS is received which is not immediately preceded by an OPN. These events are recognized by the Remote Decode circuit 604 and the Local Decode circuit 606 in the TX port and the Decode circuit 620 in the RX ports. These decoders activate signals that tell the state machines what was received and cause the state machines to enter cause transparent mode by failing to activate any control signal to the FIFOs so no changes are made when data flows therethrough and to set the state of Switches 614 and 608 so that the appropriate data path is made. After completion of step 701, processing returns to Start block 99 on FIG. 13A.

Returning to the consideration of step 674 in FIG. 13B, suppose the left half bridge remote OPN won the address priority comparison. In this case path 676 is taken to step 698 in FIG. 13C. Step 698 represents the process of blocking the remote OPN until a preemptive CLS can be generated and sent, arbitrating for the local loop, and, after winning arbitration, sending out the remote OPN onto the local loop along with any RRDYs received with the winning remote OPN. More specifically, this process is as follows. The remote OPN arriving at TX port pin 2 is blocked when Remote Decode circuit 604 detects the OPN and activates the OPN signal on line 632 and activates the Latch [0:1] signal on line 636. The OPN signal causes the TX Port State Machine 602 to activate the Del OPN signal on line 691 which causes the Insertion/Substitution/Deletion FIFO circuit 610 to strip off the 20 bits comprising the OPN. The Latch [0:1] signal causes the AL_PA latch 202 to store the source and destination addresses. Next, the TX Port State Machine activates the Insert CLS signal on line 684 which causes the Insertion/Substitution/Deletion FIFO circuit 610 to generate a CLS primitive and transmit it out onto the local loop segment to close the source node which generated the losing OPN. Next, the TX Port State Machine activates the Start ARB signal on line 700 which causes the Insertion/Substitution/Deletion FIFO circuit 610 to start substituting ARB(0) for any incoming CFW to gain control of the loop. When the ARB(0) CFW reaches the RX port, the Decode circuit 620 detects it and activates ARB(0) on line 702. This cause RX Port State Machine 612 to activate ARB Won on line 704 which causes TX Port State Machine to activate Stop ARB on line 706. This causes the Insertion/Substitution/Deletion FIFO circuit 610 to stop substituting ARB(0). The TX Port State Machine then activates Insert OPN on line 694 to generate an OPN and send out to the local loop via pin 3 followed by the AL-PA addresses from latch 202. If the RRDY counter in the TX Port State Machine counted any RRDYs which arrived behind the remote OPN, then the Insert RRDY signal is activated and the RRDY count is decremented and this process is repeated until the RRDY count reaches 0.

If the winning remote OPN arriving at pin 2 of the TX Port was a pseudo-full-duplex OPN, the Remote Decode circuit 604 in FIG. 11 detects the F7 or F8 source address and activates the Pseudo Full Duplex control signal on line 710. This causes the TX Port State Machine to activate the Convert Back signal on line 712 when it activates the Insert OPN signal on line 694. This causes the Insertion/Substitution/Deletion FIFO circuit 610 to delete the F7 or F8 source address and copy the destination address into the source address field to convert the pseudo-full-duplex OPN back to its original half duplex state before forwarding it onto the local loop.

Note that the losing local OPN of the left half bridge is automatically discarded by the right half bridge because both half bridges automatically store OPN AL-PA addresses but delete OPN primitives when they arrive and then just regenerate the OPN if it turns out that it needs to be forwarded. The stored addresses of a losing OPN are simply overwritten the next time another OPN arrives.

Returning to the consideration of step 662 in FIG. 13B, step 714 represents the process of detecting that a case 3 preemption situation has arisen. This situation is detected by the fact that the TX Arm signal on line 644 and the RX Arm signal on line 634 are both active during the same clock cycle. Each of these arming signals is activated for the clock cycle when an OPN arrives and then reset the next clock cycle. One clock cycle is all that is necessary for an address comparison or a memory access or both. When a case 3 preemption situation arises, an address comparison is performed to determine the winning OPN, and then the source node that generated the losing OPN is closed, and, if the winning OPN is a local OPN, memory is accessed to determine whether to forward the winning local OPN to the remote half bridge or over the local bypass. The TX Port State Machine 602 does the determination of whether the case 3 situation exists by examining the states of the TX and RX Arm signals.

When a case 3 situation is found, the local and remot OPNs must be temporarily blocked, and an address comparison is started in step 716. This process starts with the TX Port State Machine activating the Enable Compare signal on line 638. This signal is also coupled to the RX Port State Machine. Activation of the Enable Compare signal on line 638 causes the TX Port State Machine to activate the Del OPN signal on line 691 in FIG. 11 to cause FIFO circuit 610 to block the remote OPN from transmission until the comparison is done. In an alternative embodiment, activation of Enable Compare also causes the RX Port State Machine to activate the Del OPN signal on line 727 to cause the FIFO 616 in FIG. 12 to strip the OPN primitive bits and temporarily block transmission thereof. The local OPN is automatically blocked and its address latched and converted to pseudo-full-duplex if necessary when it arrives in the preferred embodiment, as discussed elsewhere herein.

Enable Compare also causes the comparator 402 to compare the AL_PA addresses and activate one of the signals on lines 670 or 672. Step 71 a represents the process of reading these comparison result signals by the RX and TX Port State Machines and branching along path 680 if the left half bridge local OPN is higher priority, and branching along path 682 if the left half bridge local OPN is lower priority.

Referring to FIG. 13C, the processing for the situation where the left half bridge local OPN having a lower priority will be described. The first thing that must be done is close the local source node that generated the losing OPN. This is done in step 720 where the TX Port State Machine of the left half bridge preempts the local source node by activating the Insert CLS signal and the Start ARB signal. As a result, the Insertion/Substitution/Deletion FIFO 610 in FIG. 11 generates a preemptive CLS and transmits it out pin 3 to close the node that generated the losing local OPN. In order to forward the winning remote OPN, the left half bridge must arbitrate for its local loop, so the Start ARB signal causes the FIFO circuit 610 to start substituting ARB(0) for incoming CFW at pin 2.

Eventually, as symbolized by step 724 in FIG. 13C, these ARB(0) CFW reach the RX port and are recognized by Decode Circuit 620, as symbolized by step 722. This causes the ARB(0) signal on line 702 to be activated which causes the RX Port State Machine to activate Arb Won on line 704. The TX Port State Machine sees Arb Won and activates the Stop ARB signal on line 706 to stop the substitution of ARB(0)s, and then activates Insert OPN on line 694, and, if necessary, activates the Convert Back signal on line 712. Convert Back is only activated if the remote OPN was pseudo-full-duplex when it arrived at pin 2 thereby causing Remote Decode circuit 604 to activate the Pseudo Full Duplex signal on line 710 in addition to the OPN and Latch [0:1} signals on lines 632 and 636. Activation of Insert OPN and Convert Back causes FIFO circuit 610 in FIG. 11 to generate an OPN, and convert it back to half duplex as the AL-PA addresses come by from latch 202. Alternatively, the state machine can change the F7 or F8 source address of any pseudo-full-duplex OPN back to a copy of the destination address in the latch 202 after the address comparison and before activation of the Insert OPN signal.

After forwarding the OPN and conversion back to half duplex, if the RRDY counter in the TX Port State Machine is nonzero, the TX Port State Machine activates the Insert RRDY signal on line 686 and decrements the count. This process is repeated until the RRDY count reaches zero, as symbolized by step 726. Path 728 is then taken to step 744 on FIG. 13D to begin processing to enter transparent mode.

In step 744, the destination node on the local loop of the left half bridge receives the remote OPN and responds with either an RRDY or CLS. One of these primitives propagates to pin 1 of the RX port 100 of the left half bridge.

Step 746 represents the process of recognizing the need for transparent mode and entering it. First Decode circuit 620 in FIG. 12 sees the RRDY or CLS primitive without a preceding OPN and activates either the RRDY or CLS signal on line 730 or 732, as appropriate. This causes the RX Port State Machine to control the Switch Control signal on line 622 to set Switch 614 to a 1-2 connection. Since no signal to the Insertion/Deletion/Substitution FIFO circcuit 616 is activated, it acts as a transparent pipeline allowing the RRDY or CLS to propagate therethrough unchanged and pass from pin 1 to pin 2 and from there over line 54 to the remote half bridge.

Step 748 represents the start of the process of the RX and TX ports in the right half bridge going into transparent mode to support the loop tenancy. In step 748, the RRDY or CLS primitive transferred from the left half bridge arrive at the right half bridge TX Port without a preceding OPN. The Remote Decode circuit 604 recognizes the RRDY or CLS and activates the RRDY signal on line 696 or the CLS signal on line 734. Either one of these events causes the TX Port State Machine to set Switch 608 to a 2-3 connection and control FIFO circuit 610 in FIG. 11 to not alter the RRDY or CLS primitives as they pass from pin 2 to pin 3 and onto the right half bridge local loop. The source node that originated the winning OPN sees the RRDY or CLS and responds either with a data frame or relinquishes the loop tenancy.

If a data frame is sent, the Decode circuit 620 of the RX port 100 of the right half bridge recognizes the data frame and activates the Data Fr. signal on line 752. This causes the RX Port State Machine to set Switch 614 to a 1-2 connection because it knows that the OPN it previously sent to the left half bridge resulted in a loop tenancy since no other OPN has been received since. The RX Port State Machine also controls FIFO circuit 616 to pass all data and primitives therethrough without change.

The data or RRDY or CLS primitives pass through the RX port of the right half bridge and arrive at pin 2 of the left half bridge TX port. If the arriving bits are a data frame, the Remote Decode circuit 604 activates a Data Fr. signal on line 756. If the arriving bits are an RRDY or CLS, this is recognized and the corresponding control signal is activated by the Remote Decode circuit 604. Any one of these events, not preceded by an OPN, causes the TX Port State Machine of the left half bridge to control Switch 608 to set a 2-3 connection and control the FIFO 610 to go into transparent mode. All of the FIFO circuits 610 and 616 pass any input bits through as output bits unchanged unless one of the control signals to the FIFO is activated by the corresponding state machine. The process of the right half bridge RX port and the left half bridge TX port going transparent in support of the loop tenancy is symbolized by step 758 in FIG. 13D. The process of going transparent by the RX and TX ports described above with reference to steps 744, 746, 748 and 758 happens whenever an OPN is forwarded and a loop tenancy is established in any of the 6 preemption rule cases described above (summarized in the Summary of the Invention section hereof) and in any case where concurrent OPNs do not occur and a normal loop tenancy is established across the a two half bridges.

A similar process of going into transparent mode occurs when an OPN establishes a purely local tenancy. In such a case after a local OPN has been forwarded to a local destination which responds with an RRDY or CLS or a data frame, the Local Decode circuit 606 sees the RRDY or CLS or data frame on pin 1 in FIG. 11 coupled to the local bypass and activates one of an RRDY, CLS or Data signals on 3-conductor bus 762, activation of any one of which causes the TX Port State Machine to control Switch 608 to make a 1-3 connection and to control FIFO 610 to go into transparent mode. The transparent state of the RX and TX ports in the left and/or right half bridges is not altered until another OPN is received either on pin 1 of the RX port or pins 1 or 2 of the TX port.

After step 758 in FIG. 13D is completed, processing returns to Start block 99 on FIG. 13A.

Returning to the consideration of step 718 in FIG. 13B, suppose the left half bridge local OPN was found to be of higher priority. In this case, it is necessary to close the remote source, look up the location of the destination node of the winning local OPN, possibly convert the winning OPN back to half duplex if it is pseudo-full-duplex and its destination is local, and forward the winning OPN on the appropriate path. This process is started in step 740 on FIG. 13C. This step represents the process of accessing the memory 78 in FIG. 10 to determine if the destination node of the winning OPN. This is done by the RX Port State Machine by activating the Read signal on line 110 in FIG. 12. When the local OPN arrived at pin 1 of the RX port, Decode circuit 620 recognized it as an OPN and activated the OPN signal on line 654 and activated the Latch [0:1] signal on line 656. The Latch [0:1] signal caused the AL__PA latch 200 to latch the source and destination addresses. If the incoming OPN was a half-duplex, Decode circuit 620 also activated the Half Duplex signal on line 658. The activation of OPN and Half Duplex causes RX Port State Machine to activate the RX Convert signal on line 660. This causes the AL__PA latch circuit 200 to substitute hex F7 or F8 for the source address in the AL__PA address stored therein. The address stored in latch 200 is presented on bus 108 to both memory 78 and comparator 402 in FIG. 10.. When the Read signal on line 110 is activated, the memory 78 accesses the memory location corresponding to the destination address in the AL__PA address on bus 108 and supplies the data there to the RX Port State Machine via Data bus 112. This data is a 1 if the destination is local and is a 0 if the destination is remote. This data causes RX Port State Machine to control the Switch Control signal on line 622 so as to set Switch 614 to a 1-3 connection if the destination is local, as represented by path 742 out of step 740 on FIG. 13C, or a 1-2 connection if the destination is remote, as represented by path 744.

Suppose memory access step 740 concludes that the wining left half bridge's local OPN is addressed to a local destination. In such a case, path 742 in FIG. 13C leads to step 770 in FIG. 13D. This step represents the process of preemptively closing the remote source node in case 3 which initiated the losing remote OPN. This is accomplished by the left half bridge RX Port State Machine activating an Insert CLS signal on line 650 in FIG. 12. This causes FIFO 616 to send a CLS primitive to the right half bridge TX port. The right half bridge TX port sees this CLS not preceded by an OPN and goes transparent in the manner described above in connection with the discussion of step 748. The CLS propagates to the remote source node and closes it thereby causing the remote source node to relinquish the remote loop segment by stopping substituting its own ARB for incoming ARB fill words. This frees up the right half bridge local loop segment to have a concurrent local loop tenancy with the left half bridge local loop. Since the step of blocking the remote OPN at the left half bridge accomplished in step 105 in FIG. 13A automatically deleted the remote OPN, the process of discarding the remote OPN symbolized by step 770 in FIG. 13D is only a failure by the TX Port State Machine of the left half bridge to activate the Insert OPN signal on line 694 to regenerate the OPN.

Next, in step 772, the RX Port State Machine sets Switch Control signal on line 622 to cause Switch 614 to make a 1-3 local bypass connection. Although not discussed so far, the local OPN was blocked, had its AL_PA latched and automatically converted to pseudo-full-duplex if it was half-duplex when it arrived at pin 1 in FIG. 12. This was done by the process of Decode circuit 620 recognizing the OPN, activating the OPN signal on line 654 and the Latch [0:1] signal on line 656 to latch the AL_PA address and activating the Half Duplex signal on line 658 if it was half duplex. This causes the RX Port State Machine to activate Del OPN on line 727 to strip the OPN bits and to activate the RX Convert signal on line 660 to automatically convert the OPN to pseudo-full-duplex if it was half-duplex when it arrived.

Because it is desirable to not send pseudo-full-duplex OPNs locally, step 776 represents the process of converting the local OPN back to half-duplex if it was half-duplex when it arrived. This is accomplished by the RX Port State Machine asserting an RX Convert Back signal on line 778. This causes the Insertion/Substitution/Deletion FIFO 616 to substitute the AL_PD destination address for the hex F7 or F8 of the pseudo-full-duplex OPN when it is regenerated. Next, the RX Port State Machine activates the Insert OPN signal on line 774 to regenerate the winning local OPN and forward it on the local segment return bypass path 60.

The winning local OPN arrives at pin 1 of the TX port from the local segment return 60 and causes the TX port to make a 1-3 connection to couple it onto the local loop segment 52 and to go into transparent mode, as symbolized by step 780 in FIG. 13D. This occurs because the arrival of the OPN causes Local Decode circuit 606 to activate a Local OPN signal on line 782. Activation of Local OPN causes the TX Port State Machine to control Switch 608 to make a 1-3 connection and to not activate any signal to FIFO 610 thereby causing it to pass all input data therethrough unchanged in a transparent mode. The TX Port State Machine knows that transparent mode and a 1-3 connection is required when Local OPN is activated because this will only happen in case 3 when the local OPN has won the preemption comparison or when a local OPN is received alone with no conflicting OPN and is forwarded on the local segment return 60 after a memory access. Local OPN will be activated in case 3 only after a preemption comparison is made, the local OPN has won, a memory access is made, the remote OPN has been discarded, and the local OPN has been forwarded on the local segment return 60.

Step 780 also represents the process of the left half bridge going into transparent mode. This happens when the winning local OPN is forwarded onto the local loop and the destination node replies with an RRDY or CLS. The RRDY or CLS arrives at pin 1 of the left half bridge RX port not preceded by an OPN. This causes the left half bridge to go into transparent mode by a process similar to the process previously explained in connection with the discussion of step 758. This transparent state continues for the TX and RX ports of the left half bridge until the loop tenancy is terminated by the source node being closed and stopping substitution of its ARB for incoming ARBs and another OPN arrives at the TX port or RX port.

Returning to the consideration of step 740 in FIG. 13C, suppose that path 744 is taken. This means that a remote OPN has been received and then a local OPN was simultaneously received during the same clock cycle making a case 3 situation, and the local OPN won the address comparison and memory access indicates that the local OPN has a remote destination. In this case, step 784 is performed next to forward the winning local OPN to the right half bridge. This is done by the left half bridge RX port activating the Insert OPN signal on line 774. If the winning local OPN was half-duplex when it arrived and has been converted to a pseudo-full-duplex AL_PA in latch 200, no change is made as the OPN is forwarded. If the RRDY counter in RX Port State Machine is nonzero, the state machine 612 activates an Insert RRDY signal on line 786 to send out an RRDY following the OPN. The RRDY counter is then incremented, and this process is repeated to send out more RRDYs until the count reaches zero, as symbolized by step 788.

Step 790 represents the start of processing by the right half bridge after receiving the winning OPN in case 3 from the left half bridge. When the OPN arrives at pin 2 of the right half bridge TX port, the Remote Decode circuit 604 activates the OPN signal on line 632 and the Latch[0:1] signal so as to store the AL_PA in latch 202. The TX port of the right half bridge will perform the same processing as the left half bridge when the remote OPN arrives from the left half bridge. That process is described in FIGS. 13A and 13B, steps 103, 111, 105, 652, 662 and 668 and will result in the TX port of the right half bridge doing an address comparison. Latch 200 in the RX port of the right half bridge will still store the address of the OPN previously forwarded from the right half bridge to the left half bridge. The address comparison performed by the comparator 402 of the right half bridge will compare the addresses in latches 200 and 202 which will yield the same result as the address comparison done by the comparator 402 of the left half bridge. The comparator of the right half bridge will activate the Preempt Local Source signal on line 670. This will cause the TX Port State Machine to activate the Insert CLS signal on line 684 which will send a preemptive CLS out onto the right half bridge local loop. This closes the source node which originated the losing OPN thereby causing it to relinquish the local loop and stop substituting its own ARB for incoming ARB(0). Next, the TX Port State Machine activates the Start ARB signal on line 700 to cause FIFO circuit 610 to start arbitrating for control of the local loop by substituting ARB(0) for incoming CFW. These ARB(0)s reach the RX port, are recognized by Decode circuit 620 which activates ARB(0) which causes state machine 612 to activate Arb Won on line 704. This causes TX port state machine to activate Stop Arb on line 706 and to activate Insert OPN on line 694 to forward the OPN and send out the AL_PA address stored in latch 202. If the incoming winning OPN was pseudo-full-duplex, the Remote Decode circuit 604 will activate the Pseudo-Full-Duplex signal on line 710. This will cause the state machine 602 to activate the Convert Back signal on line 712 so that when the pseudo-full-duplex AL_PA is forwarded with the OPN, it will be converted back to half duplex.

Step 794 represents the process of activation of the Insert RRDY signal on line 686 in the right half bridge TX port a sufficient number of times to send out on the local loop of the right half bridge the number of RRDYs received and reduce the RRDY count to zero.

Referring to FIG. 13E, step 796 represents the process which happens when the winning OPN is received by the destination node on the local loop of the right half bridge. The destination node, when it receives an OPN will either respond with an RRDY or CLS. If the OPN is followed by RRDYs, the destination node may reply with a data frame. When the RRDY, CLS or data frame reaches the RX port, Decode circuit 620 recognizes the event and activates the appropriate signal on one of lines 752, 730 or 732. This causes the RX Port State Machine of the right half bridge to realize that a loop tenancy has started and go into transparent mode, as symbolized by step 798 in FIG. 13E. Transparent mode is entered by not activating any signal to FIFO circuit 616 and controlling switch 614 to make a 1-2 connection to connect the two since it knows from its own address comparison that the remote source node's OPN won the priority determination and the destination node is on its local loop so the two local loops have to be connected together as one large loop. Transparent mode allows the RRDY, CLS or data frame from the destination node to be forwarded from the right half bridge RX port to the TX port of the left half bridge. There the RRDY, CLS or data frame causes a similar set of events causing the left half bridge TX port to go into transparent mode. When the RRDY, data frame or CLS reaches the source node, the source node replies with another RRDY, data frame or a CLS. These are received by the RX port of the left half bridge and force it to go into transparent mode by a similar process as described above.

Receipt of a CLS by any of the TX or RX ports causes the port to go into transparent mode to forward the CLS but also signals that the loop tenancy is over so the next thing that the port can expect to receive is another OPN. To insure that when a new OPN is received, it is not automatically address compared to an old AL_PA address of an OPN from a previous loop tenancy, any TX or RX port that receives a CLS activates a Clear signal on line 800 in the case of a TX port and line 802 in the case of an RX port. Thus, whenever an OPN arrives at any RX or TX port, an address comparison can be done even if there is no conflicting OPN without fear of an incorrect result.

Returning to the consideration of step 652 in FIG. 13B, suppose this test determines that TX Arm has not been recently activated. This means that a remote OPN has been received at a bridge and no local OPN has as yet been received. This can lead to a case 4 or case 6 preemption resolution situation or a nonconflict situation where the only OPN received was the remote OPN. In such a case, path 806 is followed to step 808 in FIG. 13E. Step 808 is a test to determine if the TX Arm signal on line 644 has been activated just after the remote OPN was received and arbitration has been started. If so, it means that the RX port has just received a local OPN which means that a local node has just won arbitration before the TX port ARB(0) got all the way around the local loop to the RX port. This means that the local loop is busy, so the remote OPN must be preempted. This process of closing the source on the local loop of the remote half bridge is accomplished by step 810. The left half bridge RX Port State Machine activates the Insert CLS signal on line 650 and insures that Switch 614 is set to a 1-2 connection. This transmits a CLS primitive to the right half bridge TX port. This CLS primitive, not immediately preceded by an OPN, causes the TX port of the right half bridge to go into transparent mode thereby passing the CLS to the remote source node thereby closing it and releasing the local loop of the right half bridge for a concurrent loop tenancy, as symbolized by step 812. The CLS also causes the TX port of the right half bridge to reset the contents of AL_PA latch 202 to an AL_PA address which will always lose in a comparison with any AL-PA of any real node in the system. This AL_PA address which will always lose in a comparison with any AL_PA of any real node in the system will hereafter be referred to as the Default AL_PA. When the TX port 102 receives the preemptive CLS not immediately preceded by an OPN, it also activates a Clr RX Latch signal on line 854 in FIG. 11. Activation of this signal causes RX Port State Machine 612 in FIG. 12 to clear latch 200 to the Default AL PA by activation of the Clear signal on line 802. A Clr TX Latch signal on line 856 is activated by the RX Port State Machine any time the RX port receives a CLS to tell the TX port to clear its latch 202 to the default AL_PA by activation of the Clear signal on line 800. Any CLS not immediately preceded by an OPN will cause any RX port or TX port receiving same to clear its AL_PA latch to this default AL_PA such that any OPN that arrives alone and is not in a conflicting OPN situation will have its AL_PA compared against the Default AL_PA and will always win.

Step 816 represents the process carried out by the RX port of beginning to handle the local OPN which either won the address priority comparison with the remote OPN or which was received alone at the RX port and was compared against the default AL_PA in latch 202. Step 816 uses the AL_PD destination address of the local OPN stored in latch 200 to access memory 78 in FIG. 10 to determine the destination of the local OPN just received. This is done by supplying the latched AL_PA as the address on bus 108 to memory 78 and activating a Read signal on line 110. This causes the memory 78 to read the memory location corresponding to the address on bus 108 and return the data stored there on Data bus 112. The returned data will cause the RX Port State Machine to set Switch 614 properly in steps 825 or 826 to forward the OPN on the proper data path.

Step 825 is performed if the destination of the local OPN is remote, as determined by step 816. Step 825 represents the process performed by the RX Port State Machine 612 in FIG. 12 of setting the Switch Control signal on line 622 to a state to control switch 614 to make a 1-2 connection to forward the OPN to be synthesized to the remote half bridge. The state machine 612 then activates the Insert OPN signal on line 774 to cause the FIFO circuit 616 to synthesize and transmit the first 20 bits of an OPN out pin 2 to the right half bridge. The address stored in lath 200 is transmitted out pin 2 after the OPN is transmitted. If the address stored in latch 200 is pseudo-full-duplex, then it is not changed in step 825 as no half duplex OPNs are allowed to be transmitted between half bridges. If the RRDY counter in the RX Port State Machine has a nonzero count, the Insert RRDY signal on line 786 in FIG. 12 is activated once for each RRDY. This causes the FIFO circuit 616 to insert an RRDY into the data stream being transmitted out pin 2 for each activation of the Insert RRDY signal. Each activation of Insert RRDY decrements the RRDY count. The Insert RRDY signal is repetitively activated until the RRDY count is zero. Processing then proceeds via path 814 to step 852 on FIG. 13F.

Referring to FIG. 13F, step 852 represents the process performed by the right half bridge TX port when the OPN forwarded in step 825 arrives. In step 852, the forwarded OPN is blocked from further transmission by the FIFO circuit 610 and the AL_PA address thereof is stored in latch 202 by processes previously described. The AL_PA of the OPN just received is also compared to the AL_PA stored in latch 200 of the RX port. Since latch 200 was cleared to the default AL_PA in step 812, the AL_PA of the OPN received from the left half bridge wins the comparison. As a result, the comparator activates the Preempt Remote Source signal on line 672 in FIG. 10 to notify the RX port 100 of the right half bridge that the OPN received from the left half bridge won the comparison. The RX Port State Machine ignores the activation of Preempt Remote Source and does not generate a preemptive CLS since its latch 200 has been previously cleared to the Default AL_PA which would never be the case in a preemption situation where two conflicting OPNs are still in contention. Since the only time a preemptive CLS needs to be generated is when there are still two conflicting OPNs in contention, the activation of Preempt Remote Source in this situation is ignored. The TX port 102 then starts arbitration, and if arbitration is won, forwards the OPN out onto the local loop segment after conversion back to half duplex if necessary. All this is done by processes previously described. Also, any RRDYs that followed the forwarded OPN are regenerated and transmitted out onto the local loop segment by processes previously described until the RRDY count reaches zero.

At this point, several things can happen. It is possible that the destination node of the OPN forwarded to the right half bridge is at yet unlearned, and the OPN was forwarded because the memory 78 did not have any data indicating the destination node was on the local loop of the left half bridge. If that is the case, the OPN will be forwarded by the left half bridge to the right half bridge, but the OPN will not find its destination node there. When this happens, the OPN will return to the left half bridge. The other possibility is that the destination node will be found on the local loop of the right half bridge. If this happens, the destination node will reply with either an RRDY, a CLS or a data frame if the OPN was followed by RRDYs issued from the source node. Which case exists is detected by step 870 in FIG. 13F.

Step 870 symbolizes the process of determining whether an RRDY, CLS or a data frame has been received by the RX port or whether the same OPN forwarded onto the local loop by the TX port has been received by the RX port. Receipt of an RRDY, CLS or data frame is detected by activation by the Decode circuit 620 in FIG. 12 of the RRDY, CLS or Data Fr. signals on lines 730, 732 or 752, respectively. Receipt at the RX port of the same OPN that was forwarded by the TX port is determined when Decode Circuit 620 activates the OPN signal on line 654. If this signal is activated, the OPN is known to be the same OPN as was previously forwarded because when the TX port won arbitration for the local loop, no other node on that local loop is allowed to send an OPN.

If an RRDY, CLS or data frame is received by the RX port, the process symbolized by step 872 is performed. In this process, the RX port goes transparent by processes previously described. This forwards the RRDY, CLS or data frame through the RX port to the TX port of the left half bridge. If a CLS is received, the RX port clears its latch 200 to the Default AL_PA and activates the Clr Tx Latch signal on line 860 to cause the TX port to also clear latch 202 to the Default AL_PA.

When the RRDY, CLS or data frame reaches the left half bridge TX port, it goes transparent and forwards the received entity onto the local loop segment, as symbolized by step 874 in FIG. 13F. If the left half bridge TX port receives a CLS, it forwards it, and activates the Clear signal on line 800 to clear latch 202 to the Default AL_PA. The TX Port State Machine also activates the Clr Rx Latch signal on line 854 to cause the RX port to clear latch 200 to the Default AL_PA. Step 874 also represents the process of learning that the location of the destination node of the local OPN forwarded to the right half bridge in step 825 of FIG. 13E is remote, i.e., located on the local loop of the right half bridge. The left half bridge TX port draws this conclusion when the TX Arm signal on line 644 in FIG. 12 has been activated indicating the RX port has received a local OPN and the RX Switch Pos. signal on line 664 indicates that the local OPN was forwarded to the right half bridge. If both of these conditions are true, and the left half bridge TX Port receives an RRDY, a CLS or a data frame on pin 2 from the right half bridge, then the TX Port State Machine concludes that the destination node of the local OPN just forwarded is remote. Receipt of an RRDY, CLS or data frame by the TX port is detected by activation of the RRDY, CLS or Data Fr. signals on line 696, 734 or 756, respectively. When one of these signals is activated in the circumstances defined above, the TX Port State Machine activates the Clr Mem signal on line 960 in FIG. 11. Activation of Clr Mem causes the RX Port State Machine to activate the Clear signal on line 930. This clears the memory location associated with the destination address portion of the address on bus 108. Since a Select TX signal on line 950 is not activated, an internal multiplexer inside memory 78 remains in the default condition connecting the address on bus 950 to the address port of the memory array in memory 78 or FIG. 10. This causes a logic 0 to be written into the forwarding table location associated with the local OPN's destination node indicating it is remote relative to the left half bridge.

As symbolized by step 876 in FIG. 13F, the entity passed through the TX port of the left half bridge will cause the source node to respond with another RRDY, a data frame or a CLS. This RRDY, data frame or CLS arrives at the left half bridge RX port and causes it to go transparent and pass the entity to the TX port of the right half bridge. The TX port of the right half bridge then goes transparent and passes the received entity through onto the local loop segment of the right half bridge. Of course, if the source node receives a CLS, it stops substituting it's arb primitive for incoming arb primitives and relinquishes the loop tenancy. If the source node responds with an RRDY, CLS or data frame, the RX port of the left half bridge forwards them to the TX port of the right half bridge which goes transparent by processes previously explained and forwards the entity received to the destination node. The loop tenancy continues in this manner until either the source node or destination node transmits a CLS causing the source node to relinquish the loop tenancy. Processing then proceeds via path 877 to step 879 on FIG. 13G which vectors processing back to Start on FIG. 13A.

Returning to the consideration of step 870 in FIG. 13F, if the RX port of the right half bridge receives an OPN after the local OPN was forwarded from the left half bridge to the right half bridge and forwarded onto the right half bridge local loop, a case 5 situation has arisen. In a case 5 situation, a local OPN was received, forwarded to the other half bridge and is returned to the half bridge which forwarded it. This means that the destination node is not on the local loop of the half bridge to which the OPN was forwarded or does not exist. In this situation, step 870 vectors processing to step 880. Step 880 symbolizes the process of the right half bridge going transparent and forwarding the OPN back to the left half bridge by processes previously described. The RX port determines that the OPN it just received is the same OPN that the right half bridge TX port previously received by checking the status of the RX Arm signal on line 634 in FIG. 12 and the status of the Equal signal on line 850 in FIG. 12 when the OPN signal on line 654 goes active. When the OPN was received by the TX port, its AL_PA was latched into latch 202. When the OPN is received by the RX port, its AL_PA is latched in latch 200, and the TX Arm signal on line 644 in FIG. 12 is activated. This causes the TX Port State Machine to activate the Enable Compare signal on line 638. This causes the comparator 402 in FIG. 10 to compare the addresses in latches 202 and 200 and activate the Equal signal on line 850. When the RX port finds that the RX Arm and Equal signals are both active when OPN on line 654 goes active, the RX port knows that the OPN just received has the same AL_PA as the OPN previously received by the TX port and must be forwarded back to the left half bridge. The RX Port State Machine in this case implements the required transparency by not activating the Del OPN signal on line 727 in FIG. 12 in response to activation of the OPN signal on line 654 in FIG. 12. This allows the OPN to pass through the FIFO pipeline and propagate back to the left half bridge. The same is true for any following RRDYs.

Step 882 represents the process which happens when the OPN forwarded by the right half bridge RX port arrives as a remote OPN at the left half bridge TX port. In step 882, the left half bridge TX port detects the arrival of the remote OPN, stores its AL_PA in latch 202 and activates the Del OPN signal on line 691 in FIG. 11 to block the transmission of the OPN until the possible preemption situation is resolved. The possible preemption situation is signalled by an active TX_Arm signal on line 644. This signal was activated by the RX port when it received the local OPN which was forwarded to the right half bridge and which later returned. To resolve the possible preemption situation, the TX Port State Machine activates the Enable Compare signal on line 638 in FIG. 11. This causes comparision of the AL_PA of the OPN just received and stored in latch 202 against the AL_PA stored in latch 200. The AL_PA stored in latch 200 represents the AL_PA of the OPN previously forwarded to the right half bridge from the left half bridge RX port. This comparison results in activation of the Equal signal on line 640 in FIG. 11. This causes the TX Port State Machine to conclude the remote OPN just received is the same local OPN which was previously forwarded to the right half bridge. As a result, the TX Port State Machine activates the Start Arb signal on line 700. This causes the Insertion/Substitution/Deletion FIFO circuit 610 to start substituting ARB(0)s for incoming fill words. Since these are the highest priority arb primitives, they pass through all the nodes on the local loop of the left half bridge and arrive at the left half bridge RX port. When the ARB(0) arrives at the RX port, the Decode circuit 620 activates the ARB(0) signal on line 702 in FIG. 12. This causes the RX Port State Machine 612 to activate the Arb Won signal on line 704. This causes the TX Port State Machine 602 to activate the Insert OPN signal on line 694 thereby causing an OPN to be generated and to propagate onto the local loop segment of the left half bridge. Then the TX Port State Machine activates the Insert RRDY signal on line 686 enough times to cause the number of trailing RRDYs received to be forwarded and the RRDY count reduced to zero. The TX port also activates the RX Arm signal when the remote OPN is received to tell the RX port that is has received an OPN. Processing then proceeds via path 884 to step 886 on FIG. 13G.

There is a possibility that the destination node of the OPN just forwarded is not on the local loop of the left half bridge either. In this case the OPN forwarded by the left half bridge TX port will propagate through the local loop of the left half bridge and arrive at the left half bridge RX port. Step 888 determines if an OPN has been received by the RX port. If so, the RX Port State Machine activates the Auto-Preempt signal on line 646. This causes the TX Port State Machine to activate the Insert CLS signal on line 684. This sends a CLS out onto the local loop of the left half bridge to close the source node to relinquish the loop tenancy. This process is symbolized by step 900 in FIG. 13G. Processing then returns to Start on FIG. 13A.

Returning to the consideration of test 886 in FIG. 13G, assuming the destination node is located on the local loop of the left half bridge, the OPN forwarded by the TX port arrives at this destination node. As symbolized by step 888, the destination node receives the OPN and any following RRDYs and responds by transmitting an RRDY, a CLS or a data frame. Step 890 represents the process performed by the left half bridge RX port when this RRDY, CLS or data frame arrives there. The RX port recognizes the arrival of an RRDY, CLS or data frame by activation of one of the RRDY, CLS or Data Fr. signals on lines 730, 732 or 752, respectively, in FIG. 12. When the RX Port State Machine 612 sees activation of one of these signals coupled with an active Equal signal on line 640 and an active RX Arm signal on line 634, it concludes that the destination node of the OPN it previously forwarded to the right half bridge must be on the local loop of the left half bridge. Therefore, in step 890, the RX Port State Machine activates the Set signal on line 116 which causes the memory location in memory 78 in FIG. 10 corresponding to the destination node address of the OPN just received by the TX port to be written with data indicating this destination node is on the local loop of the left half bridge. The RX port then set switch 614 to a 1-3 connection to bypass the right half bridge, and goes into transparent mode to pass whatever entity was received from the destination node therethrough. By setting the 1-3 connection, the RX port passes the entity received from the destination node to the TX port via the local segment return 60. Also, if a CLS was received, the RX port activates the Clear signal on line 802 and the Clr Tx Latch signal on line 860 to cause both latches 202 and 200 to be cleared. Processing then proceeds back to Start on FIG. 13A.

Returning to the consideration of FIG. 13E, if step 816 finds that the destination of the local OPN is local, step 826 on FIG. 13E is performed. This step represents the process wherein the RX Port State Machine controls Switch 614 to make a 1-3 connection and to activate the Insert OPN signal on line 774. This causes an OPN to be generated and sent out on the local segment return 60. Whatever address is stored in latch 200 is sent out behind the OPN. The RX Port State Machine also activates a Bypass signal on line 114 to tell the TX port that the OPN that it is sending on the Local Segment Return 60 is destined for a local node and the TX port should go transparent. If the address stored in the latch 200 is pseudo-full-duplex, the RX Port State Machine activates an RX Convert Back signal on line 778. This causes the Insertion/Substitution/Deletion FIFO circuit 616 to alter the AL_PA read out of the latch 200 as it streams by and convert the hex F7 or hex F8 source address to a copy of the AL_PD destination address so as to convert the OPN back to its original half-duplex form. If the RRDY counter in the RX Port State Machine has a nonzero count stored therein, the state machine 612 activates the Insert RRDY signal on line 786 so as to cause the FIFO circuit 616 to generate an RRDY and send it out behind the OPN. This process is repeated until the RRDY count reaches zero.

After the local OPN has been forwarded, processing proceeds via path 813 to step 830 on FIG. 13F. In this step, the TX port receives the OPN on the local segment return. The TX Port State Machine learns of the arrival of this OPN when a Local Decode circuit 606 detects the OPN and activates a Local OPN signal on line 782. This causes the TX Port State Machine to check the status of the Bypass signal on line 114. If Bypass is active, the TX port goes into transparent mode, controls Switch 608 to make a 1-3 connection, and passes the OPN onto the local loop without arbitrating or blocking the transmission therethrough. In an alternative embodiment, no Bypass signal is used, and whenever the Local OPN signal on line 782 is activated, the TX Port State Machine assumes that the RX port has verified the destination is local and automatically goes into transparent mode and makes a 1-3 connection.

At this point, the OPN may reach the destination node and cause it to issue an RRDY, a data frame or a CLS. In addition, the destination node may have been unplugged or failed therebycausing the OPN to return to pin 1 of the RX port. Further, the destination node may respond with an RRDY which travels along the local loop segment and then reaches the source node which originated the OPN and which is closer to the RX port than the destination node. This source node may itself respond with a CLS. Test 832 determines which is the case. If the RX port receives an RRDY or CLS or a data frame, processing vectors to step 834. Receipt of an RRDY or CLS or Data is detected by activation of the RRDY signal on line 730 or activation of the CLS signal on line 732 or activation of the Data FR signal on line 752 in FIG. 12 by Decode circuit 620. If any of these signals is activated, step 834 symbolizes the process wherein the RX port goes transparent on the 1-3 connection and passes the primitive or data through to the local segment return 60. In addition, if a CLS is received, the RX Port State Machine clears latch 200 to the Default AL_PA by activating the Clear signal on line 802. Either the RRDY or CLS or data frame is passed to the TX port. This is detected by the Local Decode circuit 606 which activates either the RRDY, CLS or Data signal, as appropriate, on 3-conductor bus 762. Since the TX port went into transparent mode in step 820, the primitive or data frame passes straight through to the destination node. If the CLS signal on bus 762 is activated, the TX Port State Machine activates the Clear signal on line 800 to clear latch 202 to the Default AL_PA address, as symbolized by step 836. Finally, processing returns to Start on FIG. 13A.

If step 832 determines that the RX port received an OPN, that OPN could only be the same OPN that was previously transmitted over the local segment return by the left half bridge RX port to the left half bridge TX port. This is because the remote OPN from the right half bridge was previously preempted and no other node could win arbitration and gain permission to send until the source node that originated the local OPN relinquishes the loop. Receipt of the same OPN previously forwarded on the local bypass 60 by the RX port also means that the destination node was either removed from the left half bridge local loop or has failed or the memory contains incorrect data and the destination node is actually remote. This is true because the RX port would not have forwarded the local OPN onto the local segment return 60 unless the data in memory 78 indicated that the destination was local. RX port 100 will know that it received the same OPN back by virtue of activation of the OPN signal on line 654 in FIG. 12 immediatly after forwarding the OPN onto local segment return 60. In alternative embodiments, the Local Decode circuit 606 could activate a signal similar to the Latch [0:1] signal and the AL_PA latch 202 would also be connected to the local return segment 60 so as to latch the AL_PA address of the OPN received on the local segment return 60. In such a case, the receipt of the OPN by the RX port would cause the comparator to compare the address in the latch 200 in FIG. 12 to the address in latch 202 in FIG. 11. This comparison would cause activation of an Equal signal on line 850. When the same local OPN is received back at the RX port, step 838 in FIG. 13F is performed to update the memory to reflect the fact that the destination node is now no longer local and is either remote or unknown. The left half bridge RX port then activates the Insert CLS signal on line 650 so as to send a CLS to the local source node and close it thereby extinguishing the loop tenancy. Processing then returns to Start on FIG. 13A.

Returning to the consideration of step 808 in FIG. 13E, if TX Arm did not go active just after the remote OPN was detected, then path 910 is taken to step 912. In this step, the TX port starts substituting ARB(0) for incoming arb fill words so as to obtain control of the local loop. When the ARB(0) primitive reaches the RX port, arbitration has been won, and the RX port activates the Arb Won signal on line 704. This causes the TX Port State Machine to activate the Insert OPN signal on line 694 so as to regenerate the OPN and to place the AL_PA of the remote OPN into FIFO 610 for transmission onto the local loop segment 52 behind the OPN. Also, if the RRDY count is nonzero, the TX port state machine activates the Insert RRDY signal on line 686 in FIG. 11 a sufficient number of times to insert the number of RRDYs received behind the OPN and reduce the RRDY count to zero.

The OPN then propagates through the local loop and may or may not find its destination node there. If the destination node is found, it will reply with an RRDY, CLS or data frame which will propagate to the RX port. If the destination node is not found, the OPN L will propagate to the RX port. Test 914 determines whether the RX port has received an OPN, an RRDY, a CLS or a data frame.

If test 914 detects an OPN, a case 6 situation has arisen where a remote OPN arrives, is forwarded onto the local loop and returns to the RX port. In this case, the arbitration process started by the TX port must be stopped, the OPN must be forwarded to the right half bridge, and the left half bridge TX and RX ports must go into transparent mode and the memory must be updated to indicate the destination node is either remote or unknown relative to the left half bridge. Accordingly, processing is vectored to step 916 where the memory 78 is updated to indicate the destination node is either remote or unknown. This is done by the RX Port State Machine when the OPN signal on line 654 in FIG. 12 and the Equal signal on line 640 and the RX Arm signal on line 634 are all active. This results in activation of the Clear signal on line 930. This causes the memory location in memory 78 corresponding to the address of the OPN in latch 200 to be cleared indicating the destination address is either remote or unknown. In some embodiments, the OPN received by the RX port will be blocked in step 916 by processes previously described and then forwarded to the right half bridge later when all of the above identified signals have been activated.

Processing is then vectored to step 918 where the OPN is forwarded to the right half bridge and the left half bridge transitions to transparent mode. In the preferred embodiment, the RX Port State Machine detects activation of the OPN signal on line 654 in FIG. 12 and the Equal signal on line 640 and the RX Arm signal on line 634 all in the same clock cycle and automatically transitions into transparent mode. When these signals are all active, it means that the same OPN forwarded from the left half bridge TX port has arrived at the RX port not having found its destination node. This means that the OPN must be forwarded to the right half bridge. Thus, step 918 represents the process wherein the RX Port State Machine set Switch Control signal on line 622 to set Switch 614 to make a 1-2 connection, and fails to activate the Del OPN signal on line 727. This causes the OPN to pass through FIFO circuit 616 unhindered and be transmitted out pin 2 to the right half bridge. In this situation, step 918 also represents the process carried out by the RX Port State Machine of activating a Go Transparent signal on line 922. This is detected by the TX Port State Machine which responds by not activating any signal coupled to the Insertion/Substitution/Deletion FIFO circuit 610. This causes any primitive or data frame entering the TX port at pin 2 to pass through the FIFO unhindered. Step 918 also represents the process carried out by the Insertion/Substitution/Deletion FIFO circuit 610 of continuing to substitute ARB(0)s for incoming fill words thereby preventing nodes on the left half bridge local loop from winning arbitration. This reserves the local loop of the left half bridge for use in communication of primitives between the source node and destination node even if both nodes are on the local loop of the right half bridge. Note that the Case 6 situation typically arises in only one situation: where both the source node and destination node are on the right half bridge local loop (or the left half bridge local loop for the mirror image situation) but the source node is closer to the RX port than the destination node and the location of the destination node is as yet unlearned.

Processing of the forwarded OPN by the right half bridge in Case 6 is started by performing steps 103, 111 and 105 in FIG. 13A and steps 652, 662, 668 and 674 in FIG. 13B. In test 674, the comparison by comparator 402 in FIG. 10 in the right half bridge results in activation of the Equal signal on line 640. This results in vectoring of processing via path 936 to step 938 on FIG. 13G.

Step 938 represents the process performed by the TX port of the right half bridge in blocking the remote OPN and any following RRDYs by processes previously described. Step 938 also represents the process performed by the right half bridge of detecting that the remote OPN just received is the same OPN as the local OPN previously forwarded to the left half bridge by the RX port. This recognition happens when OPN on line 654 in FIG. 11 goes active while the TX Arm signal on line 644 is active followed by activation of the Equal signal on line 640. The TX port automatically activates the Enable Compare signal on line 638 in FIG. 11 when the remote OPN arrives. This causes comparison between the AL_PA addresses in the latches 200 and 202, and, since the RX port latch contains the AL_PA of the local OPN previously forwarded to the left half bridge, the Equal signal is activated by the comparator. Activation of Equal causes the TX Port State Machine to activate the Start Arb signal on line 700. This causes the FIFO circuit 610 to start substituting ARB(0) for incoming fill words. When an ARB(0) reaches the RX port of the right half bridge, the RX Port State Machine sees activation of ARB(0) on line 702 in FIG. 12 which causes activation of the Arb Won signal on line 704. This activation of Arb Won causes the TX Port State Machine to activate the Stop Arb signal on line 706 to stop the arbitration process followed by activation of the Insert OPN and Insert RRDY signals on lines 694 and 686, respectively to transmit the OPN and any following RRDYs out onto the local loop segment.

Next, step 940 on FIG. 13G is performed which represents the process wherein 745 the destination node receives the forwarded OPN and any following RRDYs and replies with an RRDY, a data frame or a CLS.

Step 942 represents the process of the source node receiving the RRDY, CLS or data frame and reacting appropriately. The source node may send a data frame if it receives an RRDY, or may transmit another RRDY if it receives a data frame and has sufficient buffer capacity to receive another frame. Or, if the source node receives a CLS, it will stop substituting its arb fill word for incoming fill words thereby relinquishing the loop. The RX port watches the fill words during a loop tenancy and clears its AL_PA latch to the Default AL_PA when the fill word changes indicating that the loop tenancy is finished thereby preparing itself for receipt of the next OPN and comparison of the AL_PA of the OPN against either the Default AL_PA or the AL_PA of a conflicting OPN.

If the source node responds with either an RRDY or data frame, the RX port detects this fact in step 944 when either the RRDY signal on line 730 in FIG. 12 or the Data Fr. signal on line 752 is activated by the Decode circuit 620. When either one of these signals is activated with the RX Arm signal active on line 634 and the Arb Won signal having been previously activated, the RX Port State Machine concludes that the destination and source nodes of the current loop tenancy are both on the right half bridge local loop. The RX Port State Machine then writes data to memory 78 to memorize this fact by activating the Set signal on line 116 thereby causing the memory location in memory 78 corresponding to the AL_PA of the OPN stored in latch 200 to be written with a logic 1. The RX Port State Machine then sets Switch 614 to a 1-3 bypass connection to keep the loop tenancy local and goes into transparent mode so that incoming primitives, data frame and fill words pass therethrough on the 1-3 path unchanged and undelayed except for the FIFO delay. The RX Port State Machine then also activates the Go Transparent signal on line 922 and the Bypass signal on line 114 to cause the TX port to set Switch 608 to a 1-3 connection to connect the local segment return 60 to the local loop segment 52 and also enter the transparent mode, as symbolized by step 946. Processing then returns to Start on FIG. 13A.

After step 918 is performed, processing returns to Start on FIG. 13A.

Referring again to test 914 in FIG. 13E, if the RX port receives an RRDY or CLS or data frame, processing vectors to step 948. Step 914 is reached when a remote OPN has been received, no previous local OPN has been received and TX arm does not go active just after the remote OPN has been received and before the TX port won arbitration in response to receiving the local OPN. In this situation, the remote OPN is forwarded out onto the local at loop segment in step 912, and when the RRDY or CLS or data frame is received, the RX port knows that the destination node of the remote OPN is on the local loop. Accordingly, step 948 represents the process of learning that the location of the destination node of the remote OPN is on the local loop by writing data into the memory location of memory 78 in FIG. 10 that corresponds to the AL_PA of the remote OPN, said data indicating that the destination node is local. The way this is done is by activating a Select TX signal on line 950 whenever the RX Arm signal is active and the Decode circuit 620 in FIG. 12 activates the RRDY or CLS or Data Fr. signals on lines 730 or 732 or 752, respectively. The TX Arm signal is active only for the clock cycle in which the remote OPN is received since the conflicting OPN preemption comparisons and generation of preemptive CLSs and synthesis of the winning OPN for forwarding takes only one clock cycle. The memory 78 has an address multiplexer internal thereto which has two inputs and one output coupled to the address port of the memory array (not shown). One input is the default input and is coupled to bus 108 to supply the AL_PA address from the RX port latch 200 to the multiplexer output whenever the Select TX signal is not active. The other input is coupled to bus 109. When Select TX is active, the address from the TX port latch 202 on bus 109 is coupled to the multiplexer output and the memory array address port. Step 948 represents the process of activating the Select TX signal and activating the Set signal on line 116. This causes the memory location corresponding to the destination address portion of the AL_PA address of the remote OPN on bus 109 to be set to logic 1 indicating that this destination address is local.

Processing next proceeds to step 952 which represents the process of the RX port going into transparent mode and forwarding the RRDY or CLS to the right half bridge. This is implemented by the RX Port State Machine not activating any control signal to the FIFO circuit 616 and controlling the Switch Control signal on line 622 to set Switch 614 to a 12 connection. These two actions cause any data entering the RX port at pin 1 to pass through the FIFO unchanged and be transmitted out pin 2. The forwarded RRDY or CLS arrive at the TX port of the right half bridge unpreceded by an OPN and cause it to go into transparent mode thereby forwarding these primitives to the source node which responds with another RRDY, data frame or CLS. The data or primitive transmitted by the souce node causes the RX port to go transparent and pass the data or primitive to the TX port of the left half bridge which goes transparent and passes them to the destination node. This process continues until a CLS is transmitted which causes the loop to be relinquished and the latch of any RX or TX port is passes through to be cleared to the Default AL_PA. Processing then returns to Start on FIG. 13A. in step 954.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A bridge for a Fibre Channel Arbitrated Loop, comprising:

a first half bridge comprising a transmit port, a receive port and a memory coupled at least to said receive port, said memory for storing data of a forwarding table, said transmit and receive ports each coupled to each other by a plurality of control signals and having local TX and RX ports for coupling to a first local fibre channel arbitrated loop, hereafter referred to as said first FC-AL loop segment, and said transmit and receive ports each coupled to a local FC-AL return segment such that loop tenancies where the source and destination node are both on said first local FC-AL loop segment can be kept local to said first half bridge by routing primitives and data frames of said loop tenancy through said local FC-AL return segment;

a second half bridge comprising a transmit port, a receive port and a memory coupled at least to said receive port, said memory for storing data of a forwarding table, said transmit and receive ports for coupling to a second fibre channel arbitrated loop, hereafter referred to as said second FC-AL loop segment, and said transmit and receive ports each coupled to a local FC-AL return segment such that loop tenancies where the source and destination node are both on said second FC-AL loop segment can be kept local to said second half bridge by routing primitives and data frames of said loop tenancy through said local FC-AL return segment; and wherein said first and second half bridges each have a remote TX FC-AL output and a remote RX FC-AL input for coupling each half bridge to the FC-AL loop segment coupled to the other half bridge through the other half bridge, said remote RX FC-AL input of said first half bride coupled to said remote TX FC-AL output of said second half bridge, and said remote TX FC-AL output of said first half bridge coupled to said remote RX FC-AL input of said second half bridge;

and wherein each of said first and second half bridges includes control circuitry including at least one state machine or programmed microprocessor to do the necessary switching to carry out arbitration and flow control protocols to implement purely local loop tenancies involving the transmission of FC-AL primitives and data frames around said first and second FC-AL loop segments and said local FC-AL return segment and bridged loop tenancies involving transmission of FC-AL primitives and data frames between said first and second FC-AL loop segments via said first and second half bridges such that two purely local loop tenancies may simultaneously occur, but to couple said first and second FC-AL loop segments together as one larger FC-AL loop segment when source and destination nodes are located on different ones of said first and second FC-AL loop segments, said control circuitry also functioning to learn addresses of nodes on said first and second FC-AL loop segments by watching the sequence of FC-AL primitives that arrive at said ports and draw inferences therefrom as to the locations of said nodes on said first and second FC-AL loop segments coupled to either said first half bridge or said second half bridge and update forwarding table data in said memory, and said control circuitry further functioning to detect situations involving conflicting OPN primitives from different source nodes or the same source node arriving within a short time of each other at different ports of either said first or second half bridge and resolve said conflicting OPN situations using predetermined rules of resolution and an address comparator having first and second address inputs coupled to said transmit and receive ports of said half bridge experiencing said conflicting OPN situation.

2. The apparatus of claim 1 wherein said transmit port of each half bridge comprises:

a local TX port output for coupling to an input of said local FC-AL loop segment;

an Insertion/Substitution/Deletion FIFO Circuit having a data input and an address input and a data output coupled to said local TX port output, and having a plurality of control signal inputs;

a TX Port State Machine forming part of said control circuitry and coupled to said plurality of control signal inputs of said Insertion/Substitution/Deletion FIFO Circuit and having a plurality of control inputs at which a plurality of control signals are received from said receive port and said address comparator, said collection of control signals appearing at said plurality of control inputs controlling the state entered by said state machine, and having a plurality of control outputs at which a plurality of control signals are generated by said state machine in response to the states entered thereby to control operations of said bridge, said TX Port State Machine for generating said plurality of control signals at said plurality of control outputs in response to control signals received at said plurality of control inputs to cooperate with said receive port, said address comparator, said Insertion/Substitution/Deletion FIFO Circuit and said memory to control said half bridge to implement predetermined rules of switching, learning and resolution of situations where conflicting FC-AL OPN primitives are received;

a remote RX port input;

an FC-AL local segment return input coupled to said local FC-AL return segment;

a switch having one output and first and second inputs, said output coupled to said data input of said Insertion/Substitution/Deletion FIFO, said first input coupled to said FC-AL local segment return input, said second input coupled to said remote RX FC-AL input, and having a switch control input coupled to receive a switch control signals from said TX Port State Machine which controls whether said first or second input is coupled to said output;

an AL_PA latch having a data input coupled to said remote RX FC-AL input and having an address output coupled to said address input of said Insertion/Substitution/Deletion FIFO Circuit, and coupled to said first address input of said address comparator for using address data stored in said AL-PA latch in resolving conflicting OPN situations, and having a control input coupled to said TX Port State Machine for receiving a Clear signal to clear any address stored in said AL_PA latch at predetermined times;

a Remote Decode Circuit having an input coupled to said remote RX FC-AL input and having a plurality of control outputs coupled to some of said plurality of control signal inputs of said TX Port State Machine, said remote decode circuit functioning to determine the type of FC-AL primitive received and generate one or more control signals at said control outputs telling said TX Port State Machine which types of FC-AL primitives have appeared at said remote RX FC-AL input as each said primitive arrives, and having a control signal output coupled to said control input of said AL_PA latch for controlling when said AL_PA latch latches AL-PA address data which arrives with an FC-AL OPN primitive arriving at said remote RX FC-AL input; and a Local Decode Circuit having an input coupled to said FC-AL local segment return input and having a plurality of control outputs coupled to said TX Port State Machine, and having a control input coupled to one of said plurality of control outputs of said TX Port State Machine for receiving said Clear signal, said Local Decode Circuit functioning to detect the type of FC-AL primitives that arrive at said FC-AL local segment return input and generate one or more control signals at said control outputs to tell said TX Port State Machine the type of FC-AL primitive that arrived as each said primitive arrives.

3. The apparatus of claim 1 wherein said receive port of each half bridge comprises:

a remote TX port output coupled to said remote TX FC-AL output of said half bridge;

an Insertion/Substitution/Deletion FIFO Circuit having a data input and a data output and having a plurality of control signal inputs;

an RX Port State Machine forming part of said control circuitry and having a first plurality of control outputs coupled to said plurality of control signal inputs of said Insertion/Substitution/Deletion FIFO Circuit, and having a second plurality of control signals ouputs coupled to said memory for carrying control signals to said memory to control operation thereof, and having a plurality of control inputs at which a plurality of control signals and data are received from said transmit port, said memory and said address comparator, said collection of control signals appearing at said plurality of control inputs controlling the state entered by said state machine, and having a plurality of control signal outputs at which a plurality of control signals outputs are generated by said state machine in the various states entered thereby, said RX Port State Machine for generating said plurality of control signals at said plurality of control outputs in response to control signals received at said plurality of control inputs to cooperate with said transmit port, said address comparator, said Insertion/Substitution /Deletion FIFO Circuit in said receive port and said memory to control said half bridge to implement predetermined rules of switching, learning and resolution of situations where conflicting FC-AL OPN primitives are received;

a local RX port input coupled to said input of said Insertion/Substitution/Deletion FIFO Circuit, for coupling to an output of said local FC-AL loop segment;

an FC-AL local segment return output coupled to an input of said local FC-AL return segment;

a switch having one input and first and second outputs, said input coupled to said data output of said Insertion/Substitution/Deletion FIFO, said first output coupled to said FC-AL local segment return output, said second output coupled to said remote TX port output, and having a control input coupled to said RX Port State Machine for receiving a switch control signal which controls whether said first or second output is coupled to said input;

an AL_PA latch having a data input coupled to said local RX port input for receiving data and primitives and having an output coupled to said data input of said Insertion/Substitution /Deletion FIFO Circuit, and having an address output coupled to and address input of said memory and to said second address input of said address comparator for providing address data stored in said AL-PA latch in resolving conflicting OPN situations and for assisting in the process of writing data into said forwarding table, and having a plurality of control inputs coupled to said RX Port State Machine for receiving a Clear signal at predetermined times to clear address data stored in said AL_PA latch and an RX Convert signal which causes said AL_PA latch to substitute predetermined address data for the source address of a half-duplex OPN primitive source address stored in said AL_PA latch to convert said OPN primitive to a pseudo-full-duplex OPN primitive to assist in the process of resolving any conflicting OPN situations, and having a control signal input for receiving a latch control input signal to cause said AL_PA latch to latch the AL_PA address of an OPN primitive arriving at said local RX port input; and a Decode Circuit having an input coupled to said local RX port input and having a plurality of control outputs coupled to said control inputs of said RX Port State Machine at which said Decode Circuit generates one or more control signals in response to receipt of various FC-AL primitives at said local RX port input, said control signals telling said RX Port State Machine what types of FC-AL primitives have arrived at said local RX port input as each said primitive arrives, and having a control signal ouput coupled to said control input of said AL__PA latch to generate said latch control input signal to control when said AL__PA latch latches address data appearing at said local RX port input.

4. The apparatus of claim 2 wherein said receive port of each half bridge comprises:

a remote TX port output coupled to said remote TX FC-AL output of said half bridge;

an Insertion/Substitution/Deletion FIFO Circuit having a data input and a data output and having a plurality of control signal inputs;

an RX Port State Machine forming part of said control circuitry and having a first plurality of control outputs coupled to said plurality of control signal inputs of said Insertion/Substitution/Deletion FIFO Circuit, and having a second plurality of control signals ouputs coupled to said memory for carrying control signals to said memory to control operation thereof, and having a plurality of control inputs at which a plurality of control signals and data are received from said transmit port, said memory and said address comparator, said collection of control signals appearing at said plurality of control inputs controlling the state entered by said state machine, and having a plurality of control signal outputs at which a plurality of control signals outputs are generated by said state machine in the various states entered thereby, said RX Port State Machine for generating said plurality of control signals at said plurality of control outputs in response to control signals received at said plurality of control inputs to cooperate with said transmit port, said address comparator, said Insertion/Substitution/Deletion FIFO Circuit in said receive port and said memory to control said half bridge to implement predetermined rules of switching, learning and resolution of situations where conflicting FC-AL OPN primitives are received;

a local RX port input coupled to said input of said Insertion/Substitution/Deletion FIFO Circuit, for coupling to an output of said local FC-AL loop segment;

an FC-AL local segment return output coupled to an input of said local FC-AL return segment;

a switch having one input and first and second outputs, said input coupled to said data output of said Insertion/Substitution/Deletion FIFO, said first output coupled to said FC-AL local segment return output, said second output coupled to said remote TX port output, and having a control input coupled to said RX Port State Machine for receiving a switch control signal which controls whether said first or second output is coupled to said input;

an AL__PA latch having a data input coupled to said local RX port input for receiving data and primitives and having an output coupled to said data input of said Insertion/Substitution/Deletion FIFO Circuit, and having an address output coupled to and address input of said memory and to said second address input of said address comparator for providing address data stored in said AL-PA latch in resolving conflicting OPN situations and for assisting in the process of writing data into said forwarding table, and having a plurality of control inputs coupled to said RX Port State Machine for receiving a Clear signal at predetermined times to clear address data stored in said AL__PA latch and an RX Convert signal which causes said AL__PA latch to substitute predetermined address data for the source address of a half-duplex OPN primitive source address stored in said AL__PA latch to convert said OPN primitive to a pseudofull-duplex OPN primitive to assist in the process of resolving any conflicting OPN situations, and having a control signal input for receiving a latch control input signal to cause said AL__PA latch to latch the AL__PA address of an OPN primitive arriving at said local RX port input; and a Decode Circuit having an input coupled to said local RX port input and having a plurality of control outputs coupled to said control inputs of said RX Port State Machine at which said Decode Circuit generates one or more control signals in response to receipt of various FC-AL primitives at said local RX port input, said control signals telling said RX Port State Machine what types of FC-AL primitives have arrived at said local RX port input as each said primitive arrives, and having a control signal ouput coupled to said control input of said AL__PA latch to generate said latch control input signal to control when said AL__PA latch latches address data appearing at said local RX port input.

5. An apparatus as defined in claim 1 further comprising:

a first FC-AL loop segment coupled to said local TX and RX ports of said first half bridge;

a second FC-AL loop segment coupled to said local TX and RX ports of said second half bridge; and a plurality of NL__nodes coupled to each of said first and second FC-AL loop segments, each said NL__node having an address and a priority for purposes of arbitration.

6. A Fibre Channel Arbitrated Loop network including a bridge, comprising:

a local loop segment for carrying FC-AL traffic and having a plurality of nodes thereon and having first and second ends;

a remote loop segment for carrying FC-AL traffic and having a plurality of nodes thereon and having first and second ends;

a first half bridge having a TX port coupled to said first end of said local loop segment and an RX port coupled to said second end of said local loop segment and having a local segment return data path coupling said RX port to said TX port, said TX port having a Remote RX Port, and said RX port having a Remote TX Port;

a second half bridge having a TX port coupled to said first end of said remote loop segment and an RX port coupled to said second end of said remote loop segment and having a local segment return data path coupling said RX port to said TX port, said TX port having a Remote RX Port which is coupled to said Remote TX Port of said left half bridge by a first FC-AL data path, and said RX port having a Remote TX Port coupled to said Remote RX Port of said left half bridge by a second FC-AL data path;

and wherein each of said first and second half bridges includes means for learning the locations of the nodes on said local and remote loop segments by monitoring FC-AL traffic and destination addresses included in OPN primitives in said FC-AL traffic on said loop segments and data paths to which each bridge is coupled and drawing conclusions from the sequence of primitives and data frames in said traffic and the loop segments or data paths on which various primitives or data frames were seen in sequence and building a table of forwarding data in a memory, and for using said forwarding data to control switching of FC-AL traffic through said local segment return data paths whenever a half bridge knows both the source and destination nodes are on the loop segment to which the half bridge is coupled;

and wherein each of said first and second half bridges includes means for resolving conflicts where two FC-AL OPN primitives are received at different ports of the same half bridge simultaneously or within a short time of each other.

7. A method of controlling the flow of primitives and data frames in a Fibre Channel Arbitrated Loop (hereafter FCAL) network, said bridge comprising a first half bridge having local TX and RX ports and remote RX and TX ports and a second half bridge having local TX and RX ports and remote RX and TX ports, said remote RX and TX ports of said second half bridge coupled to said remote TX and RX ports, respectively, of said first half bridge by transmit and receive FCAL segments, each half bridge also being coupled to a local FCAL loop segment having one or more NL_nodes thereon via said local RX and TX ports and each half bridge coupled to a local FCAL segment return which said half bridge can couple to said local FCAL loop segment to complete the loop thereof when necessary to carry the primitives and data frames of a purely local loop tenancy, comprising:

in each half bridge, receiving FCAL OPN primitives from nodes located on said local FCAL loop segment and FCAL OPN primitives arriving from the other half bridge via said remote RX ports;

resolving any conflicting OPN situations where two FCAL OPN primitives arrive at different ports of the same half bridge simultaneously or within a short time of each other by preempting one of said OPNs according to predetermined rules and taking predetermined action, including, if necessary, arbitration for control of any FCAL loop segment onto which said FCAL OPN is to be transmitted, and carrying out predetermined steps to establish a loop tenancy, or resolving said conflicting OPN situation by determining that the FCAL OPN primitive arriving second in time is the same FCAL OPN as an FCAL OPN previously transmitted out another port of the same half bridge and carrying out predetermined steps to establish a loop tenancy depending upon whether the first FCAL OPN which arrived at said half bridge arrived at said local RX port or at said remote RX port; and if there is no conflicting OPN situation, using a destination address identifying the NL_node to which said FCAL OPN is bound included in said FCAL OPN to look up in a forwarding table the location of said destination NL_node, and arbitrating for control of the FCAL loop segment coupled to said other half bridge and forwarding the FCAL OPN primitive to the destination NL_node node on the local FCAL loop segment coupled to said other half bridge if the location of the destination NL_node identified in said FCAL OPN primitive is known to be on the local loop of the other half bridge from data in said forwarding table or forwarding said FCAL OPN if the location of said destination NL_node is unknown because there is no data giving the location of the destination NL_node in said forwarding table, or, if the destination node is shown from data in said forwarding table to be on the local FCAL loop segment of the half bridge that received the FCAL OPN primitive and said FCAL OPN primitive was received at said local RX port of said half bridge, forwarding said FCAL OPN onto the local FCAL loop segment coupled to said half bridge which received said FCAL OPN primitive at its local RX port via the local FCAL segment return coupled to that half bridge, or, if the destination node of said FCAL OPN primitive is shown from data in said forwarding table to be on the local FCAL loop segment of the half bridge that received the FCAL OPN primitive at its remote RX port, arbitrating for control of said local FCAL loop segment coupled to said half bridge which received said FCAL OPN primitive at its remote RX port, and, after control is won, forwarding said FCAL OPN primitive onto the local FCAL loop segment.

8. The method of claim 7 wherein said step of resolving any conflicting OPN situation is carried out in any of the following ways:

(1) if a local FCAL OPN is received at said local RX port of either said first or second half bridges which is directed to an NLport on the local FCAL loop segment coupled to the other half bridge and is forwarded to the other half bridge followed by receipt of a remote FCAL OPN primitive at said remote RX port of the same half bridge which previously received said local FCAL OPN, converting any said FCAL OPN that is half-duplex to pseudo-full duplex and comparing AL_PA addresses of said local and remote OPNs and sending out a preemptive FCAL CLS primitive to the source NL_node which generated the lower priority FCAL OPN primitive;

(2) if a local FCAL OPN is received at said local RX port of either said first or second half bridges and is forwarded across said local FCAL segment return, followed by receipt of a remote FCAL OPN primitive at the remote RX port of said half bridge which previously received said local FCAL OPN, sending a preemptive FCAL CLS primitive to the source NL_node which generated said remote FCAL OPN primitive;

(3) if a remote FCAL OPN primitive is received at the remote RX port of either half bridge simultaneously with receipt at the same half bridge of a local FCAL OPN primitive at its local RX port, converting either FCAL OPN primitive that is half-duplex to pseudo-full-duplex, and comparing the AL_PA addresses in the local and remote FCAL OPN primitives, and sending a preemptive CLS to the source NL_node which generated the FCAL OPN of lower priority;

(4) if a remote FCAL OPN primitive is received at the remote RX port of either half bridge followed by receipt at the same half bridge of a local FCAL OPN primitive at its local RX port, sending a preemptive FCAL CLS primitive to the source NL_node which generated said remote FCAL OPN primitive;

(5) if a local FCAL OPN primitive is received at the local RX port of either half bridge and is forwarded to the other half bridge because the destination address of said FCAL OPN primitive is not found in said forwarding table, and the same said local FCAL OPN primitive is returned to the remote RX port of the half bridge which forwarded it, determining the that FCAL OPN primitive just received at said remote RX port is the same FCAL OPN primitive that was previously forwarded by comparing at least the source addresses of said FCAL OPNs, and forwarding said FCAL OPN received at said remote RX port onto said local FCAL loop segment coupled to said local RX and TX ports of said half bridge which previously forwarded said local FCAL OPN to the other half bridge; and (6) if a remote FCAL OPN primitive is received at the remote RX port of either half bridge and, is forwarded onto the local FCAL loop segment of that half bridge after arbitration for control of said local FCAL loop segment, and shortly thereafter an FCAL OPN primitive arrives at said local RX port of said half bridge which forwarded said remote FCAL OPN primitive onto its local FCAL loop segment, determining if the FCAL OPN that arrived at said local RX port is the same FCAL OPN previously forwarded onto said local FCAL loop segment by comparing at least the source addresses of said remote FCAL OPN primitive and the FCAL OPN primitive that arrived at said local RX port, and if they are not the same, resolving the conflict as in step (4) above, but if said FCAL OPN primitives are the same FCAL OPN primitive, switching the bridge which received said remote FCAL OPN primitive into transparent mode such that all FCAL primitives, fill words and data frames received at said remote RX port are passed unchanged directly through said bridge and back to the other half bridge via said remote TX port.

9. A method of forwarding data between nodes on a Fibre Channel Arbitrated Loop divided into first and second local loop segments coupled by a bridge comprised of a first half bridge coupled to said first local loop segment and a second half bridge coupled to said first half bridge and coupled to said second local loop segment, each half bridge having a local return segment which can be switched by said half bridge so as to be coupled to the local loop segment coupled to that bridge so as to convert each local loop segment into a complete Fibre Channel Arbitrated Loop, each local loop segment having a plurality of nodes each of which has a unique address which is a destination address when data is being transmitted to that node and which is a source address when data is being transmitted from that node to some other node, comprising:

watching propagation of OPN, RRDY and CLS primitives between said first and second local loop segments and drawing conclusions as to on which of said first and second local loop segments various destination addresses and source addresses the locations of which have been learned can be found by examining which primitives arrived from which local loop segment and in what order and recording data in a forwarding table which indicates on which local loop segment destination addresses whose locations have been learned can be found;

switching said local return segments in said first half bridge appropriately such that when both the source address and destination address of a transaction are on the first local loop segment, said local return segment of said first half bridge is coupled to said first local loop segment so as to convert it to a complete Fibre Channel Arbitrated Loop;

switching said local return segments in said second half bridge appropriately such that when both the source address and destination address of a transaction are on the second local loop segment, said local return segment of said second half bridge is coupled to said second local loop segment so as to convert it to a complete Fibre Channel Arbitrated Loop; and resolving any conflicting OPN situations where two OPNs are received at different ports of the same half bridge simultaneously or within a short time of each other by preempting one OPN if the OPNs are from different source nodes or, if the OPNs are from the same source node, taking appropriate steps to establish a loop tenancy.

* * * * *